United States Patent
Easton et al.

(10) Patent No.: US 10,486,345 B2
(45) Date of Patent: Nov. 26, 2019

(54) DYNAMIC BLOCK PRESS, AND ASSOCIATED METHODS AND SYSTEMS

(71) Applicant: WATERSHED MATERIALS, LLC, Napa, CA (US)

(72) Inventors: David Carr Easton, Napa, CA (US); Khyber J. Easton, Wilseyville, CA (US)

(73) Assignee: WATERSHED MATERIALS, LLC, Napa, CA (US)

( * ) Notice: Subject to any disclaimer, the term of this patent is extended or adjusted under 35 U.S.C. 154(b) by 382 days.

(21) Appl. No.: 14/634,672

(22) Filed: Feb. 27, 2015

(65) Prior Publication Data
US 2016/0250780 A1    Sep. 1, 2016

(51) Int. Cl.
*B29C 43/02* (2006.01)
*B28B 1/093* (2006.01)
(Continued)

(52) U.S. Cl.
CPC .......... *B29C 43/021* (2013.01); *B01F 3/1221* (2013.01); *B01F 3/1228* (2013.01);
(Continued)

(58) Field of Classification Search
CPC ............. B29C 43/021; B29L 2031/102; B28B 1/0935; B28B 7/007; B28B 7/28;
(Continued)

(56) References Cited

U.S. PATENT DOCUMENTS 1,327,721 A * 1/1920 Mattison, Jr. ............. B28B 1/52
264/148
1,652,805 A * 12/1927 Williams .................. B28B 1/04
425/219
(Continued)

FOREIGN PATENT DOCUMENTS

WO    2011127493 A1    10/2011

OTHER PUBLICATIONS

University of Virginia, School of Architecture. "Production of Concrete Block." Available on Jan. 4, 2013. Retrieved on May 24, 2017. <www.arch.virginia.edu/build/concrete/block_graphical>.*
(Continued)

*Primary Examiner* — Robert C Dye
*Assistant Examiner* — Hana C Page
(74) *Attorney, Agent, or Firm* — Perkins Coie LLP

(57) ABSTRACT

Disclosed is a block press and associated process, for dynamically forming a block mold, to produce a masonry block. In some embodiments, the block mold includes a plurality of mold elements, such as a lower impact plate, an upper impact plate, and a plurality of side plates, and can further include one or more block cores. In operation, one or more of the mold elements are moved to dynamically forming a block mold, which is then filled with product formula. The product formula is then compressed, to form a masonry block. One or more of the mold elements are then released, such as to release pressure on the formed masonry block, and to allow removal of the formed masonry block
(Continued)

from the block press, wherein the formed masonry block can be moved to a curing area, and the block press can reform the block mold for subsequent production.

27 Claims, 43 Drawing Sheets

(51) Int. Cl.
| | |
|---|---|
| *B28B 3/08* | (2006.01) |
| *B28B 7/00* | (2006.01) |
| *B28B 7/18* | (2006.01) |
| *B28B 7/28* | (2006.01) |
| *B28C 5/14* | (2006.01) |
| *B28C 5/16* | (2006.01) |
| *B01F 7/00* | (2006.01) |
| *B01F 7/08* | (2006.01) |
| *B01F 7/16* | (2006.01) |
| *B01F 13/10* | (2006.01) |
| *B01F 3/12* | (2006.01) |
| *B29L 31/10* | (2006.01) |

(52) U.S. Cl.
 CPC .......... *B01F 7/00558* (2013.01); *B01F 7/086* (2013.01); *B01F 7/16* (2013.01); *B01F 13/1027* (2013.01); *B28B 1/0935* (2013.01); *B28B 3/086* (2013.01); *B28B 7/007* (2013.01); *B28B 7/183* (2013.01); *B28B 7/28* (2013.01); *B28C 5/143* (2013.01); *B28C 5/16* (2013.01); *B29L 2031/102* (2013.01)

(58) Field of Classification Search
 CPC ..... B28B 7/183; B28B 3/086; B01F 7/00558; B01F 7/16; B01F 3/1221; B01F 3/1228; B01F 7/086; B01F 13/1027; B28C 5/143; B28C 5/16
 See application file for complete search history.

(56) References Cited

U.S. PATENT DOCUMENTS

| | | |
|---|---|---|
| 1,850,308 A | 3/1932 | Saunders |
| 1,963,588 A | 6/1934 | Maust |
| 2,116,473 A | 5/1938 | Ball |
| 2,121,450 A | 6/1938 | Sentrop |
| 2,332,701 A | 10/1943 | Dowsett |
| 2,341,012 A | 2/1944 | Billman et al. |
| 2,616,147 A | 11/1952 | Dudley |
| 2,706,320 A | 4/1955 | Davies et al. |
| 3,081,509 A | 3/1963 | Thornton |
| 3,279,021 A | 10/1966 | Pratt et al. |
| 3,342,426 A | 9/1967 | Sackett, Sr. |
| 4,098,562 A | 7/1978 | Levin |
| 4,802,836 A | 2/1989 | Whissell |
| 5,005,980 A | 4/1991 | Zimmerman |
| 5,017,049 A | 5/1991 | Sievert |
| 5,035,364 A | 7/1991 | Escallon |
| 5,062,610 A | 11/1991 | Woolford et al. |
| 5,392,998 A | 2/1995 | Suessegger et al. |
| 5,697,563 A | 12/1997 | Fujimoto et al. |
| 5,699,969 A | 12/1997 | Isaji |
| 5,817,248 A | 10/1998 | Forlini |
| 6,039,277 A | 3/2000 | Hamm et al. |
| 6,113,379 A | 9/2000 | Lacroix et al. |
| 7,458,800 B2 | 12/2008 | Scherer et al. |
| 8,252,221 B2 | 8/2012 | Davies et al. |
| 8,974,593 B2 | 3/2015 | Guynn et al. |
| 9,481,105 B2 | 11/2016 | Easton et al. |
| 2003/0113397 A1 | 6/2003 | Bald |
| 2003/0214069 A1 | 11/2003 | Suto et al. |
| 2006/0070553 A1* | 4/2006 | Guinot ................ C04B 40/0039 106/692 |
| 2006/0287197 A1 | 12/2006 | Maslanka et al. |
| 2009/0071374 A1 | 3/2009 | Van Deventer et al. |
| 2009/0077920 A1 | 3/2009 | Korman et al. |
| 2010/0213640 A1* | 8/2010 | Piazzesi ................ B28B 3/086 264/333 |
| 2012/0024196 A1 | 2/2012 | Gong et al. |
| 2012/0139163 A1* | 6/2012 | Garfinkel ............. B28B 7/0044 264/336 |
| 2012/0153526 A1 | 6/2012 | Ko et al. |
| 2015/0165645 A1* | 6/2015 | Easton ..................... B28B 3/02 264/333 |
| 2017/0190074 A1 | 7/2017 | Easton et al. |

OTHER PUBLICATIONS

Costigan. "Effect of mortar water content in the properties of masonry." 9th International Masonry Conference, Guimarães 2014 (Year: 2014).*

* cited by examiner

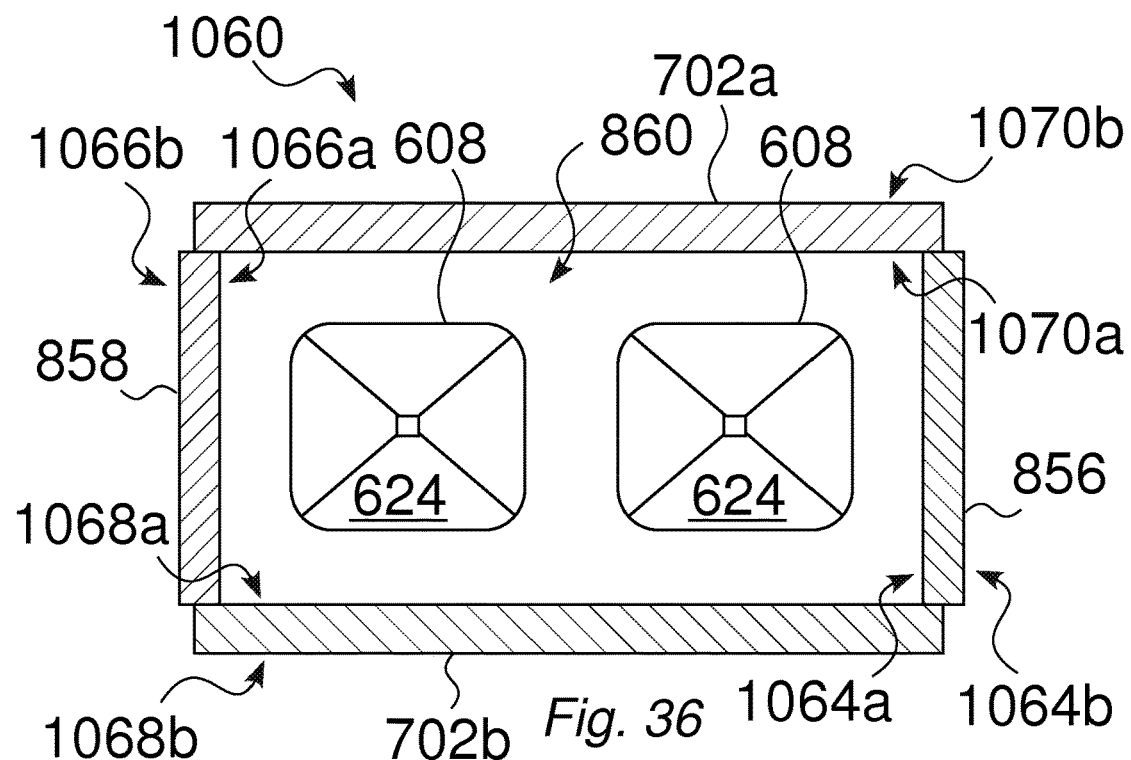
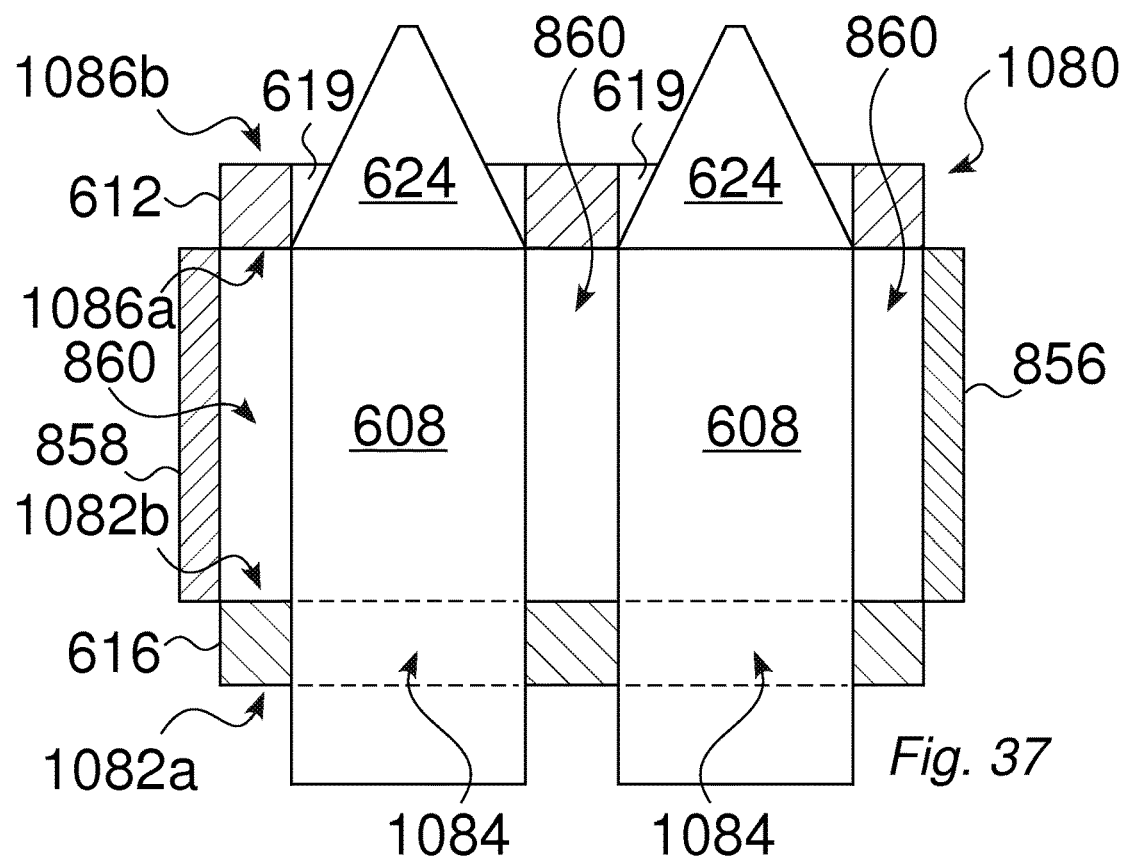

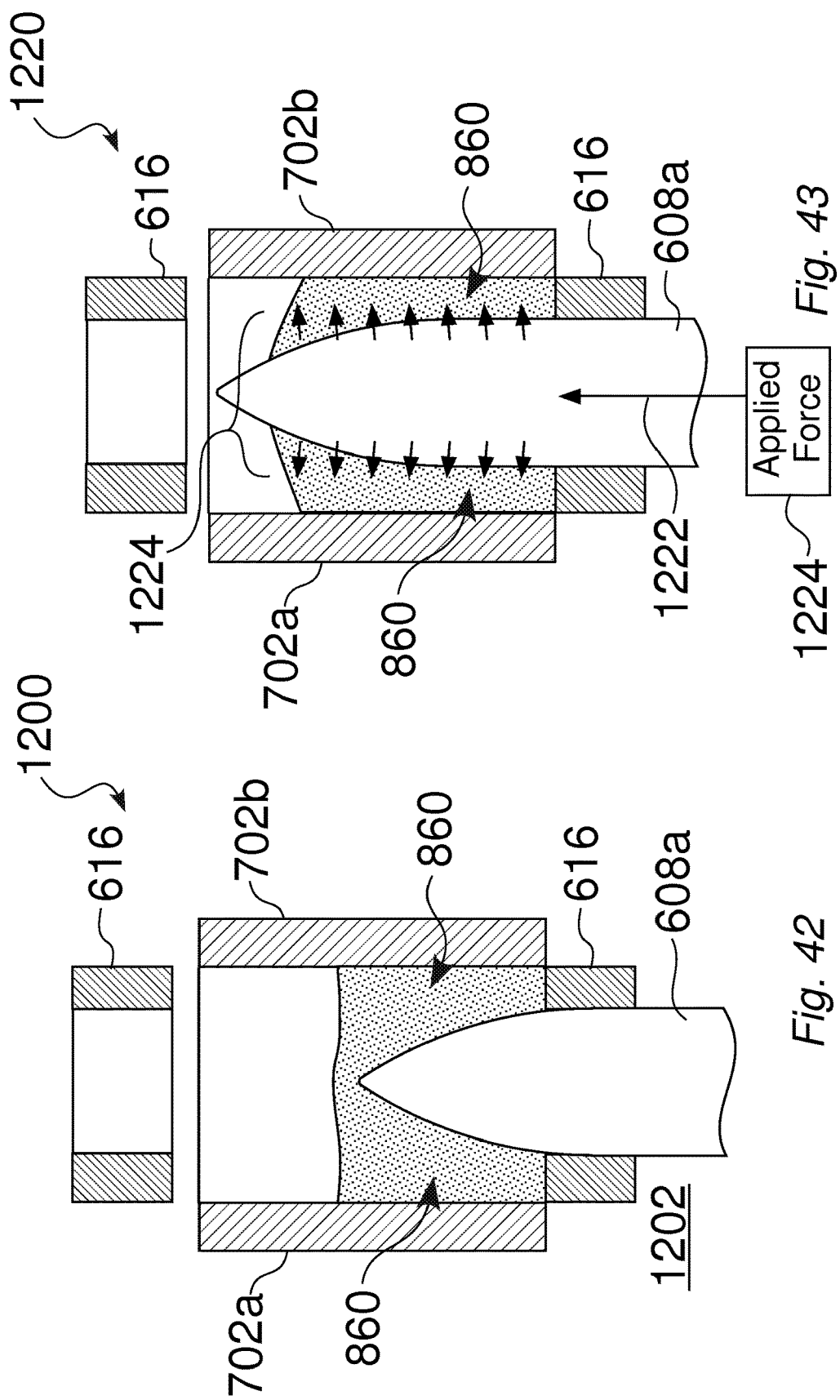

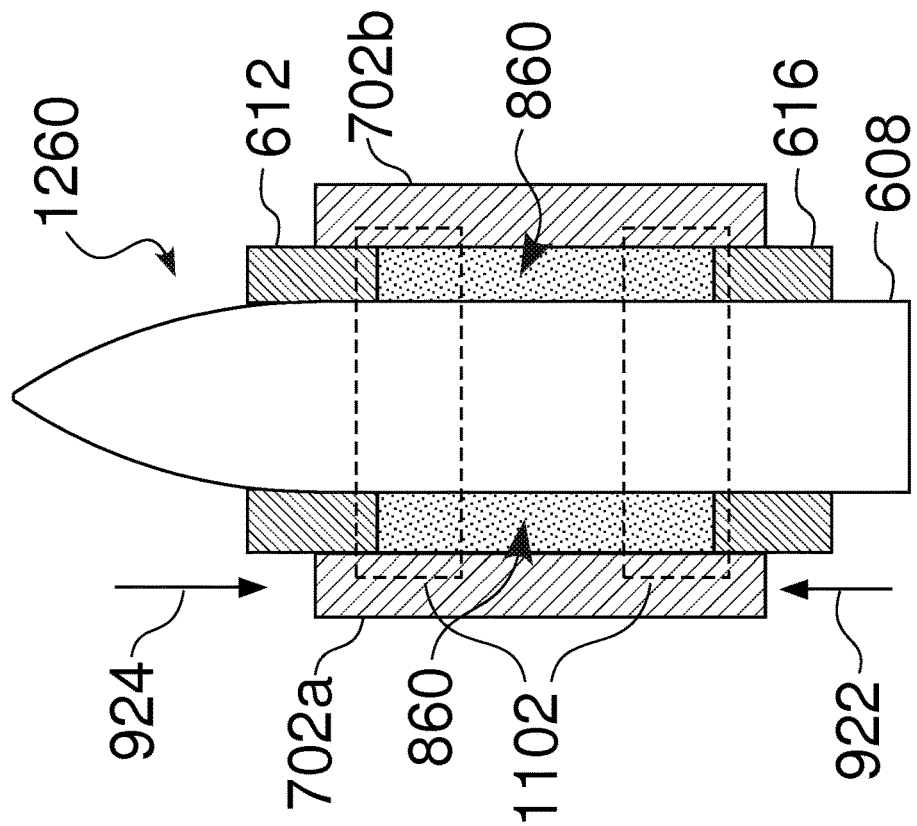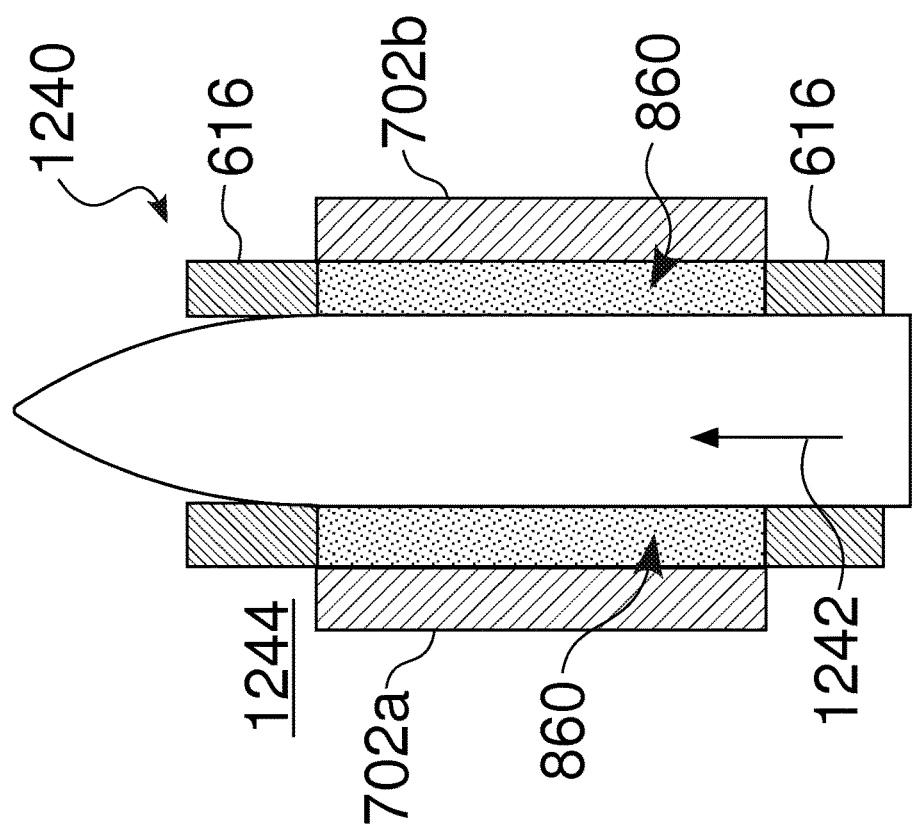

|  |  |  | 28-Days Compressive Strength (psi) | | |
|---|---|---|---|---|---|
| Mix Identifier (1604) | Supplementary Cementitious Materials (SCM) (1606) | Replacement (%) (1608) | Agglomerated (1612) | De-Agglomerated (1614) | Strength Increase (%) (1616) |
| SRN3-OPC | N/A | 0 | 1802 | 2638 | 46.39 |
| SRN3-FA15 | Fly Ash | 15 | 1427 | 2453 | 71.90 |
| SRN3-FA30 | Fly Ash | 30 | 1448 | 1912 | 32.04 |
| SRRC-OPC | Recycled Concrete | 25 | 1189 | 1680 | 41.30 |

Fig. 50 ial decline.
DYNAMIC BLOCK PRESS, AND ASSOCIATED METHODS AND SYSTEMS

FIELD OF THE INVENTION

At least one embodiment of the present invention pertains to a masonry manufacturing system, including a high-shear mixer and de-agglomeration apparatus, for mixing a masonry formula before forming masonry products, an enhanced masonry forming apparatus, and enhanced masonry compositions.

BACKGROUND

Masonry is one of the most common construction materials globally. Tens of billions of ordinary concrete blocks are used on construction sites every year, to create durable, cost-effective buildings.

However, this durability comes at a high cost to the environment. Most masonry products, including conventional gray concrete blocks, are made by mixing sand and gravel together, with Portland cement. The worldwide use of Portland cement contributes significantly to greenhouse gas emissions, currently accounting for about 6 to 7 percent of all greenhouse gas emissions globally, due largely to the amount of energy required to produce it. In addition, the energy required to blast and crush virgin rock into gravel and sand, which are then used to make the blocks, further contributes to the carbon footprint that results from the extensive use of ordinary masonry materials. Therefore, the widespread use of concrete products for buildings is currently accelerating environmental decline.

Conventional concrete blocks are rarely manufactured close to where they are used. This means that such concrete blocks are typically transported, often at great distances, at a further economic and environmental cost.

BRIEF DESCRIPTION OF THE DRAWINGS

One or more embodiments of the present invention are illustrated by way of example and not limitation in the figures of the accompanying drawings, in which like references indicate similar elements.

FIG. 36 is a top view of a block mold formed within an illustrative dynamic block press.

FIG. 37 is a partial side cutaway view of a block mold formed within an illustrative dynamic block press.

FIG. 42 is a partial cutaway view of a filling operation for an illustrative embodiment of a dynamic block press that includes one or more block cores that can be configured to provide compression of a product formula while dynamically forming a dynamic block mold.

FIG. 43 is a partial cutaway view of compression of product formula within a dynamic block mold using a tapered block core.

FIG. 44 is a partial cutaway view of an operational state for an illustrative dynamic block press, wherein a tapered block core can be positioned to fully define a dynamic block mold.

FIG. 45 is a partial cutaway view that shows illustrative vertical compression to improve the quality and/or performance of an enhanced masonry block.

FIG. 50 is a table that shows the influence of enhanced mixing and de-agglomeration on resultant compressive strength, for cured enhanced masonry blocks manufactured using different product formulas.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are systems, structures, processes, and other technologies that enable the fabrication of enhanced masonry products.

In certain embodiments, a deagglomerator comprises a vertical shaft high-shear mixer, wherein a rotational force (hydraulic or electric) is mounted to a vertical shaft onto which are mounted chains and/or knives, housed within a flexible rubber "boot" or tube. The deagglomerator is configured to be controllably powered, to rotate the shaft and the attached tools. Partially mixed formula is introduced to a top region of the deagglomerator, and falls downwardly past the rotating tools wherein the formula is pulverized and mixed, before exiting the lower area of the mixing region as a product formula.

In some embodiments, a block mold includes a plurality of mold elements, such as a lower impact plate, an upper impact plate, and a plurality of side plates, and can further include one or more block cores. In operation, one or more of the mold elements are moved to dynamically form a block mold, which is then filled with product formula. The product formula is then compressed, to form a masonry block. One or more of the mold elements are then released, such as to release pressure on the formed masonry block, and to allow removal of the formed masonry block from the block press, wherein the formed masonry block can be moved to a curing area, and the block press can reform the block mold for subsequent production.

In certain embodiments, a process introduced here involves the following sequence of actions, as described more fully below. A masonry formula is premixed to include a desired blend of constituents. The masonry formula is further processed, through a high-shear mixer, which can act as a de-agglomerator, such as to break down the constituents and improve the homogeneity of the mixture, thus producing a product formula. A dynamic block press receives the product formula and fills a dynamically formed mold, such as with a predetermined weight of the product formula. The dynamic block press compresses the product formula to form a masonry block (also called a "masonry unit" or "masonry product"), and then releases the dynamically formed mold, whereby the formed masonry block can be removed from the dynamic block press.

Figure 1:
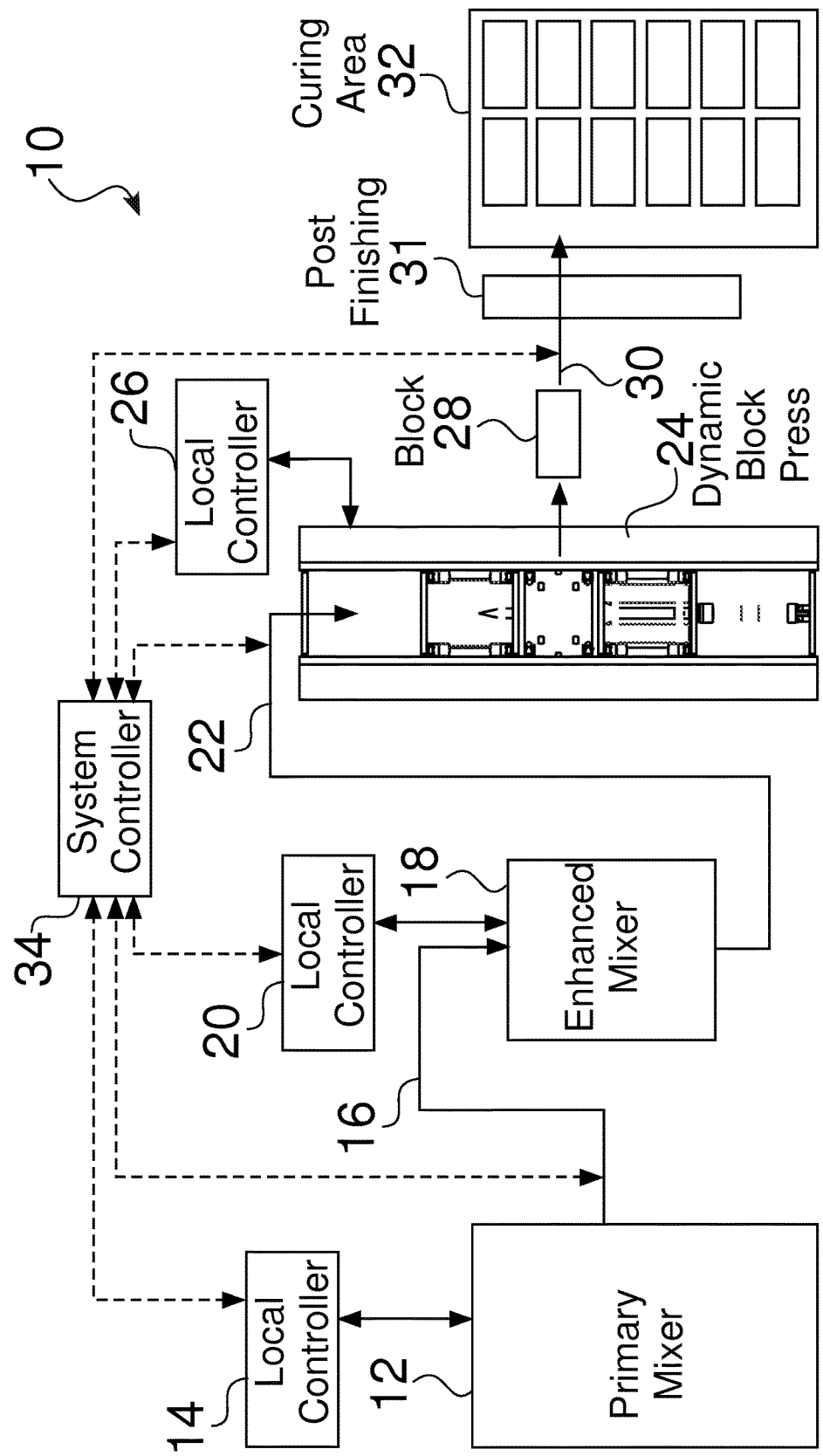
FIG. 1 illustrates a system for manufacturing enhanced masonry products, including a high-shear mixer for enhanced mixing and de-agglomeration of a moistened partially mixed formula, and a dynamic block press for in situ formation of enhanced masonry blocks.

FIG. 1 illustrates a system 10 for manufacturing enhanced masonry products 28, including a high-shear mixer 18 for enhanced mixing and de-agglomeration of a moistened partially mixed formula, and a dynamic block press 24 that is configured to form enhanced masonry blocks 28.

As seen in FIG. 1, a primary mixer 12 can be used to premix a desired masonry formula 130 (FIG. 4), wherein the mixer 12 can be operated either manually, by a local controller 14, by a system controller 34, or by any combination thereof. Water is also added to the masonry formula during the premixing, such as to achieve a predetermined moisture content for the manufacture of the enhanced masonry blocks 28.

The pre-moistened and mixed masonry formula 130 is transferred 16 to the enhanced mixer 18, which can be configured for any of further mixing, pulverizing or otherwise breaking down constituents, and/or de-agglomerating the pre-moistened formula 130. The enhanced processing of the pre-moistened formula 130 produces a product formula 170 (FIG. 5), which is significantly more homogeneous than the initial pre-moistened formula 130, and substantially improves the resultant quality of the enhanced masonry blocks 28. The enhanced mixer 12 can be operated either manually, by a local controller 20, by the system controller 34, or by any combination thereof.

As also seen in FIG. 1, the product formula 170 is transferred 22 to the dynamic block press 24, wherein the product formula 170 is controllably loaded into a dynamically formed block mold 860 (FIG. 25), to produce one or more enhanced masonry blocks 28. The dynamic block press 24 can be operated either manually, by a local controller 26, by the system controller 34, or by any combination thereof.

The enhanced masonry blocks 28 are removed from the dynamic block press 28, and can be transferred to a curing area, 32, such as a curing rack 32, pallets 28 or a similar structure. In some embodiments, one or more post-production finishing operations 1402, e.g. 1402a-1402g, can be provided for the enhanced masonry blocks 28, such as at a post-production finishing area 31 which can include one or more stations, before the enhanced masonry blocks 28 are moved to the curing area 36.

In some embodiments, the curing area 36 can control one or more environmental factors, such as temperature and/or humidity. As will be described in greater detail below, the constituents and moisture content of the enhanced masonry blocks can be significantly different than conventional concrete blocks, thus producing blocks that can readily be removed from the dynamic block press 24 and handled, after formation.

Figure 2:
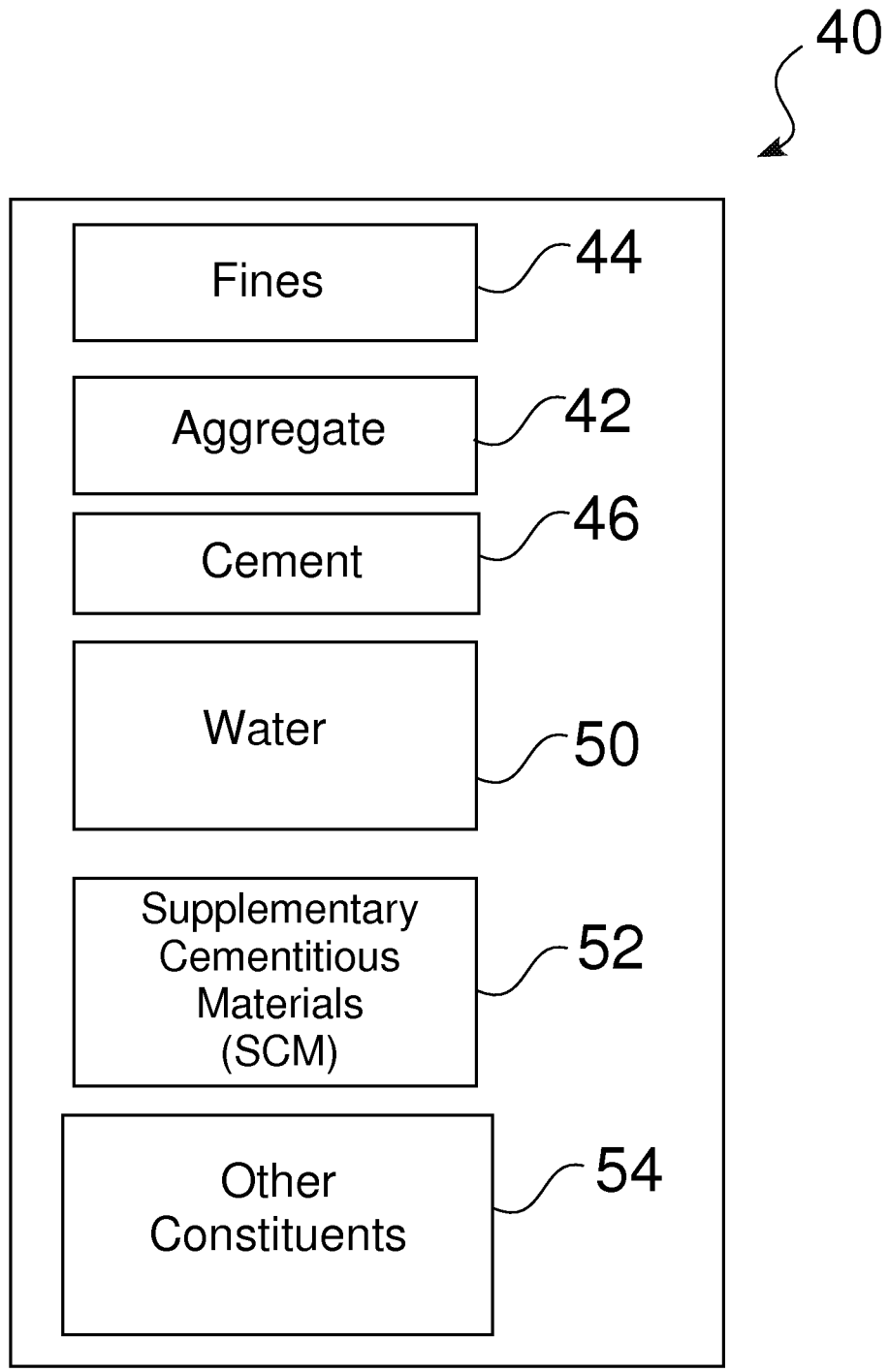
FIG. 2 is a schematic block diagram of illustrative constituents that can be included in some embodiments of an enhanced masonry formula.
Figure 4:
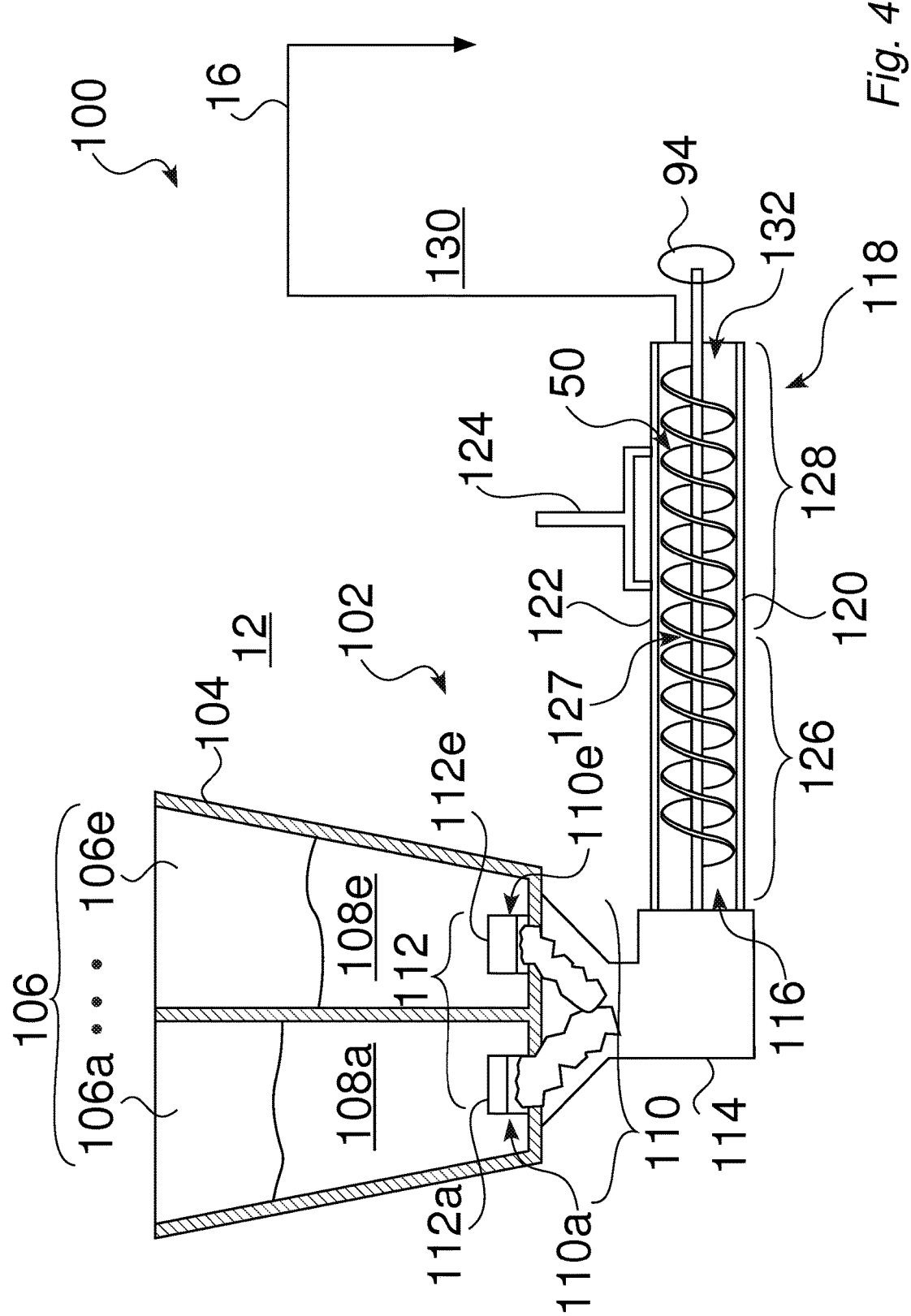
FIG. 4 illustrates an apparatus that is configured to premix and moisten a formula for the manufacture of enhanced masonry products.

FIG. 2 is a schematic block diagram 40 of illustrative constituents that can be included in some embodiments of the enhanced masonry formula 130 (FIG. 4). The enhanced mixer 18 and/or dynamic block press 24 can be used for a wide variety of masonry formulas, and can readily be adapted for available local materials. The illustrative formula 130 seen in FIG. 2 can comprise any of aggregate 42, fines 44, cement 46, and water 50, and can further comprise supplementary cementitious material 52 and/or other constituents 54. Some embodiments of the enhanced masonry formula 130 have a moisture content of less than or equal to 12 percent, e.g. 6 to 12 percent, or less than 12 percent, e.g. 6 to 11.75 percent water.

In some embodiments, the enhanced masonry formula 130 can include a mixture of aggregates 42 and cementitious binder 52, such as with optimized gradation from greater than 0.25 in. down to nano scale. When properly activated, and followed by dynamic compression 810 (FIG. 24), the enhanced masonry formula 130 can produce a wide variety of high strength and durable enhanced masonry units 28, such as rammed-earth masonry units 28.

In some embodiments, the aggregates 42 can include any of soils, by-products of aggregate productions, mill tailings, granular recycled products, and commercially produced aggregates.

In some embodiments, the supplementary cementitious material, i.e. binder 52 can include any of hydraulic cements, fly ash, metallurgic slags, silica fume, metakaolin, kaolin, and rice husk ash.

In some embodiments, in addition to water 50, other constituents 54 can include activators such as any of sodium silicates, sodium and potassium hydroxide, chemical admixtures, and their combinations.

In some embodiments, constituents 54 can include nano-additives, such as any of amorphous silica and boehmite, zeolitic precursors, and precipitates such as calcium silica hydrated (C-S-H) and calcium aluminum silica hydrated (C-A-S-H).

In some embodiments, the mixture proportions of the masonry formula 130 are calculated to produce enhanced masonry blocks 28 for a specific product or application. In an illustrative embodiment, for aggregates 42 and cementitious binder mixtures 130, the mix proportions can be determined by the Fuller equation: $P=100 (d/D)^n$, where P is the proportion of grains of a given diameter, d is the diameter of grains for a given value of P, D is the largest grain diameter, and n is the grading coefficient. The proportions are calculated based on n values ranging from 0.45 to 0.75. In some embodiments, nano-additives can be added in the range of 1 to 10 percent by binder mass. As well, in some embodiments, the cementitious binder content 52 is determined according to the $MA_{200W}$ index value, calculated as PI*(% mass/100), where PI is the plasticity index of the aggregate mixture, and % mass is the percentage of the total aggregate passing sieve 200 collected by wet sieving. In some embodiments, the total water content 50 of the masonry formula 130 is calculated as the sum of the optimal moisture content of the aggregate 42 and the water 50 necessary for chemical reaction of the binder 52.

Figure 35:
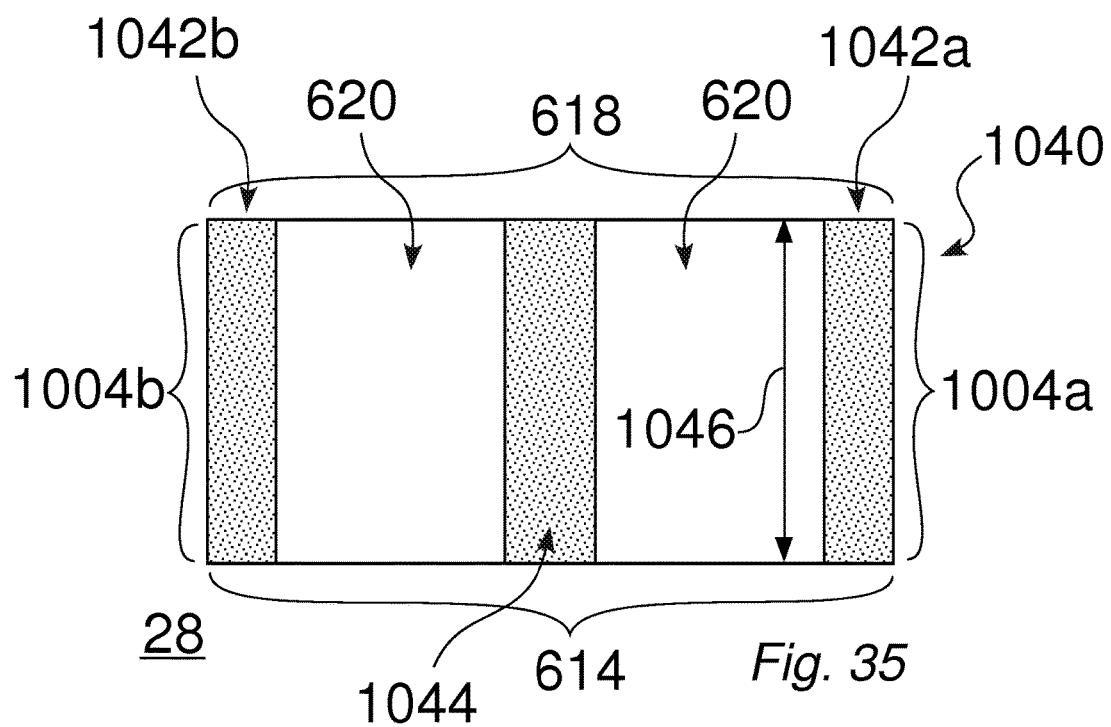
FIG. 35 is a side cutaway view of an illustrative enhanced masonry block.

In some embodiments, the composition of the masonry formula 130 can be chosen based on the intended compression, e.g. 80 (FIG. 3), 810 (FIG. 24), and can also be chosen based on the block press 24 used to form the masonry blocks 28. In some embodiments, the applied compression, i.e. compaction effort, can range from 1500 to 2500 pounds of force per square inch of unit face. In some embodiments of the block press 24, consolidation can accomplished through static forces, dynamic forces, or any combination thereof. The impact component of a dynamically applied force can be measured in blows per minute. In masonry units 28 with depths greater than 4", for some masonry formulas 130, a dynamic compressive action can be applied in multiple lifts, such as to achieve 98% density for a desired finished height dimension 1046 (FIG. 35).

The following provides illustrative non-limiting embodiments of some of the compositions of the masonry formula 130 that can be used to produce enhanced masonry blocks:

RN3 PS7 AC575 1

Dry/Solid Constituents
- 79%—Syar rhyolite (post-industrial recycled, well-graded dark brown sandy clay, plasticity index—5,)
- 14%—Nun's rhyolite fines (post-industrial recycled, tan silty-clay)
- 5%—Portland cement (conforming to ASTM C150/C150M-11)
- 2%—Blast-furnace slag (conforming to ASTM C989/C989M-11)

Liquid Constituents
- Potable water—9% (OMC), 0.22-0.28 w/c ratio
- Adva-Cast 575 water reducer—56 ml/kg of cement Mixing/Production/Curing Requirements
- The mixing equipment 18 processes 74 are configured to eliminate clay/silt aggregations greater than 1/16", and fully disperse cementitious materials and liquid constituents throughout the product formula 170;
- the block press is configured to compress the product formula 170 to a dry density greater than 120 pounds per cubic foot (pcf); and
- the formed masonry blocks 28 are stored in RH 70-90%, 50-75 F for at least 5 days.

SRN3 GFA7 NaSi NaOH 1
Dry/Solid Constituents
  77%—Syar rhyolite (post-industrial recycled, well-graded dark brown sandy clay)
  13.6%—Nun's rhyolite fines (post-industrial recycled, tan silty-clay)
  6.8%—Class F fly ash (conforming to ASTM C618-08a)
  2.35%—NaOH (purity >96%)
  235%—NaSi
Liquid Constituents
Potable water—9% (OMC), 0.22-0.28 w/c ratio
Mixing/Production/Curing Requirements (Option A)
  The activators (NaSi and NaOH) pre-mixed 24-48 hours prior to hatching;
  the activators are thoroughly mixed with batch water 50 prior to hatching;
  the mixing equipment 18 and processes 74 are configured to eliminate clay/silt aggregations greater than 1/32", and fully disperse cementitious materials and liquid constituents throughout the product formula 170;
  the block press 24 is configured to compress the product formula 170 to a dry density greater than 120 pcf (or two within 5% of maximum achievable dry density as determined by modified proctor testing);
  the masonry products 28 are pre-cured at 50-70 F, RH 70-85% for 2 hours after pressing;
  following the pre-curing period, the masonry products 28 are sealed in containers to prevent moisture loss and cured at 150-170 F for 48 hours; and
  following the elevated temperature curing period, the masonry products 28 are stored at 50-70 F, RH 70-85% for at least 2 days.
Mixing/Production/Curing Requirements (Option B)
  The mixing equipment 18 and processes 74 are configured to eliminate clay and silt aggregations greater than 1/32", and fully disperse cementitious materials and liquid constituents throughout the product formula 170;
  The block press 24 is configured to compress the product formula 170 to a dry density greater than 120 pcf (or two within 5% of maximum achievable dry density as determined by modified proctor testing); and
  the masonry products 28 are stored in RH 70-90%, 50-75 F for at least 5 days.
RCN CSFSIO pf 2 AC575 MX1800 1
Dry/Solid Constituents
  69.6% Recycled concrete (post-consumer recycled, 5-7% P200, 8-12% passing #50, 37-43% passing #8, non-plastic)
  17.4% Nun's rhyolite fines (post-industrial recycled, tan silty-clay, plasticity index—8, ~40% passing #50, ~14% passing #200 by dry sieving, ~40% passing #200 by P200 wash)
  6% Portland cement 52 (conforming to ASTM C150/C150M-11)
  3% Blast-furnace slag (conforming ASTM C989/C989M-11)
  1% Silica fume (conforming ASTM C1240-11)
  1% Kaolin clay (~90% passing #200)
  2% Polymer fibers (conforming to ASTM A820)
Liquid Constituents
potable water—9% (OMC), 0.22-0.28 w/c ratio
Adva-Cast 575 water reducer—56 ml/kg of cement
Moxie 1800 admixture—28 ml/kg of cement
Mixing/Production/Curing Requirements
  The cementitious and pozzolanic materials are blended thoroughly prior to hatching;
  the aggregate materials 42 are blended with polymer fibers prior to mixing with cement 52;
  the mixing equipment 18 and processes 74 are configured to eliminate clay/silt aggregations greater than 1/32", and fully disperse cementitious materials 52, fibers and liquid constituents throughout the product formula 170;
  the block press 24 is configured to compress the product formula 170 to a dry density greater than 120 pcf (or two within 5% of maximum achievable dry density as determined by modified proctor testing);
  the masonry block products 28 are handled minimally and with extreme care for 24 hours after pressing;
  the masonry block products 28 are stored in RH 70-90%, 50-75 F for at least 5 days after pressing, and the curing procedure commences not more than 2 hours after pressing; and
  the masonry block products 28 are sprayed with one thorough coating of Glaze n' Seal multi-purpose masonry sealer to minimize dusting and water absorption.

Figure 3:
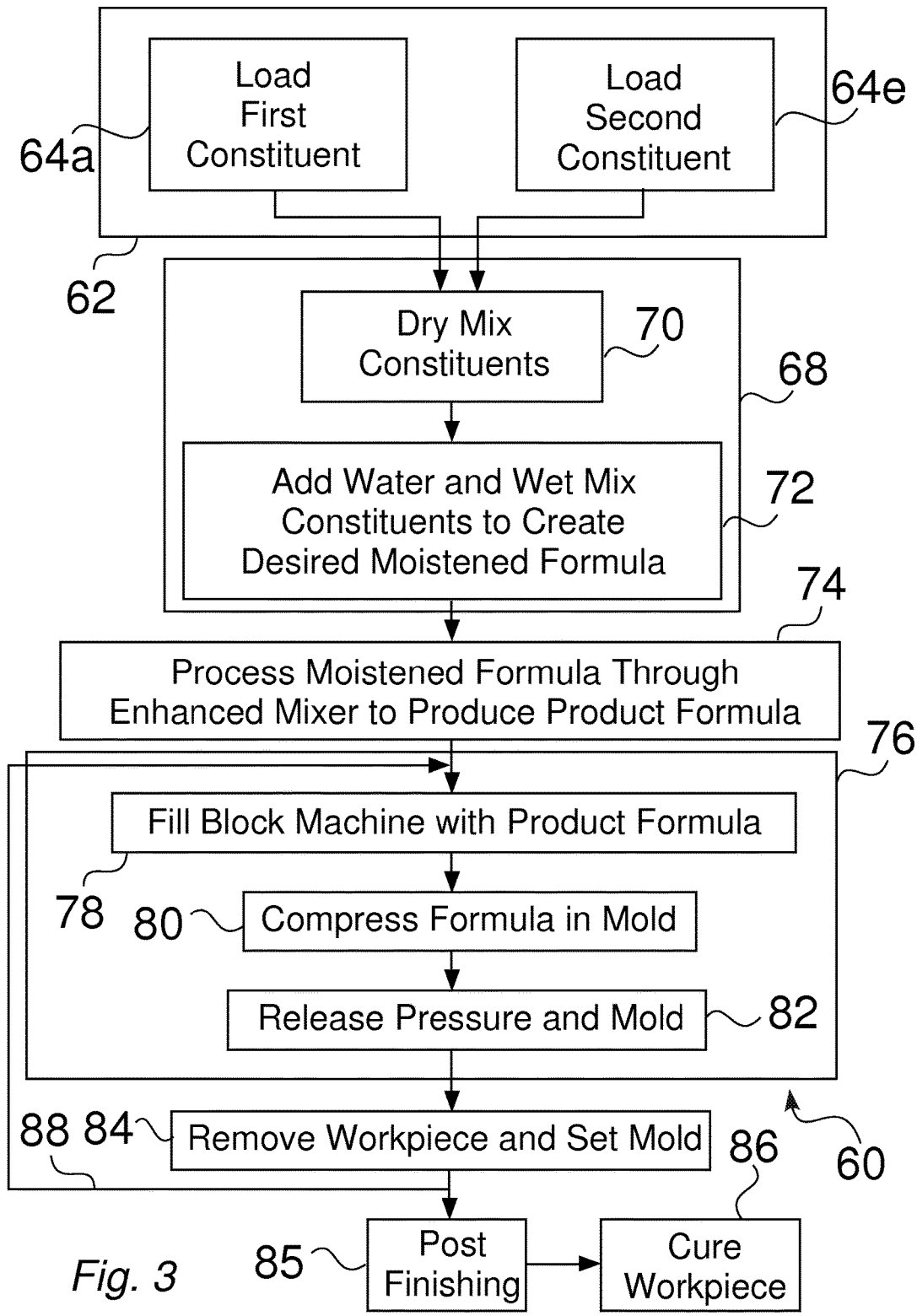
FIG. 3 is a flowchart of an exemplary process for manufacturing enhanced masonry products, including enhanced mixing and de-agglomeration of a moistened partially mixed formula, and in situ formation of enhanced masonry blocks within a dynamic block press.
Figure 25:
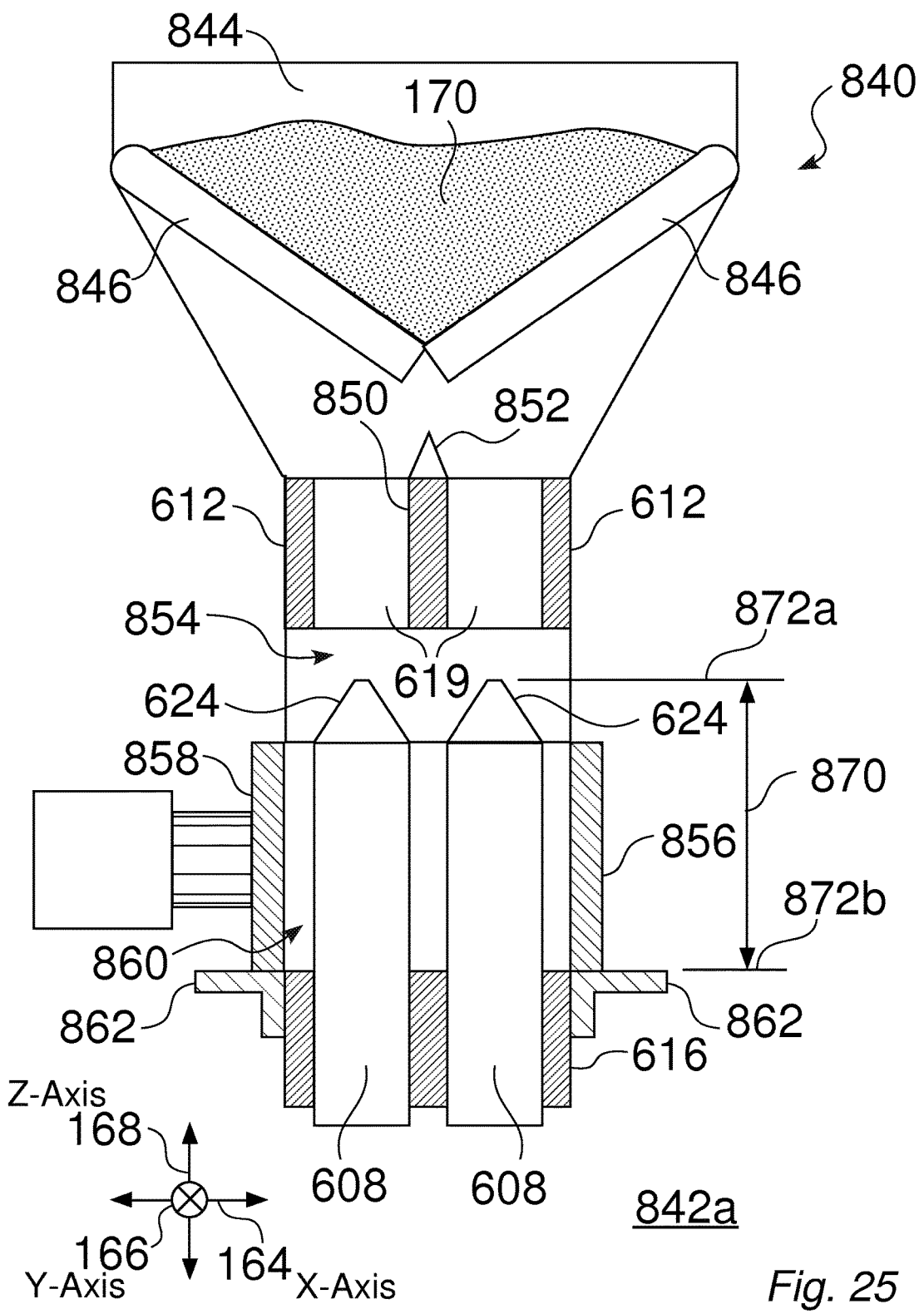
FIG. 25 shows storage of a predetermined weight of product formula within a charge hopper of a dynamic block press, which is positioned in a home position, at which point the dynamic block press operatively forms a block mold that is ready to be filled by the stored masonry formula.

FIG. 3 is a flowchart of an illustrative process 60 for manufacturing enhanced masonry products 28, such as using a high-shear mixer 18 for processing a moistened partially mixed formula 130 to produce a product formula 170, and a dynamic block press 24 for forming enhanced masonry blocks 28 within a dynamically formed block mold 860 (FIG. 25).

As seen in FIG. 3, the preparation of a masonry formula 130 can be initiated 62 by loading a first constituent mixture 108a (FIG. 4), such as including fines 44, and a second constituent mixture 108b (FIG. 4), such as including cement 46, in a primary mixing apparatus 12. A desired ratio of the constituents 108 can be mixed 68, such as by dry mixing 70 the constituents 108 together, and then producing a moistened masonry formula 130, such as by introduction 72 of water 50 and wet mixing the resultant formula 130.

While conventional mixing methods can be used to produce a pre-moistening masonry formula 130, such as for use in the production of enhanced masonry products 28, there are often shortcomings encountered with such conventional mixtures, such as incomplete mixing of all the constituents, inconsistent or large sizes of aggregates, and/or the formation of agglomerates, sometimes referred to as pilling, within the pre-moistened masonry formula 130, which can reduce the homogeneity of the resultant masonry formula 130.

Figure 11:
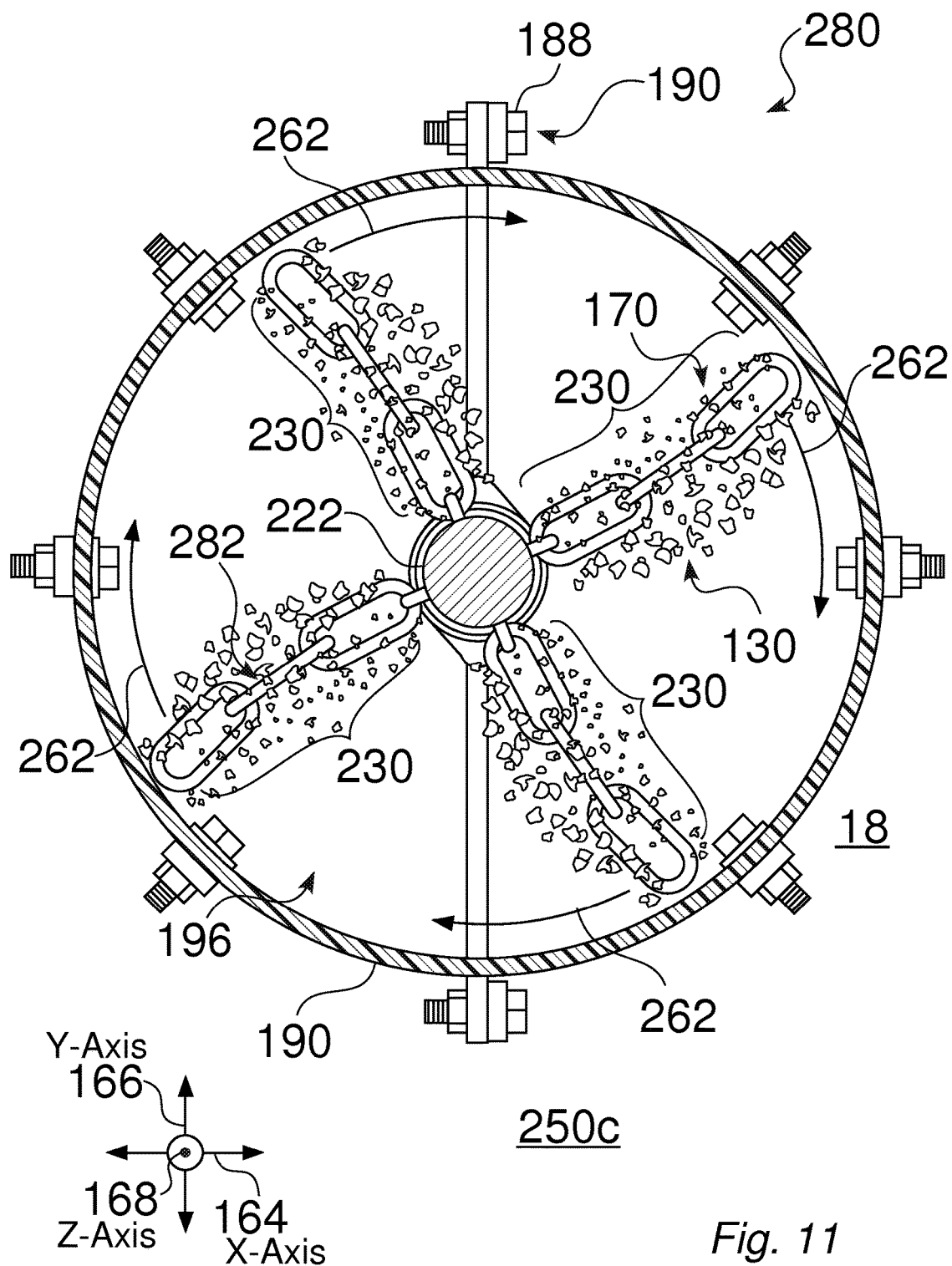
FIG. 11 is a top partial top cutaway view of an illustrative mixing shaft assembly within a mixing region of a high-shear mixer, wherein the mixing shaft assembly is in a rotating state, and wherein a moistened partially mixed formula falls downward through the mixing region, and is acted upon by rotating mixing tools.

Therefore, as seen in the illustrative process 60, the pre-moistened formula 130 can be processed 74 through an enhanced mixer 18, wherein the pre-moistened formula 130 comes into contact with high-speed mixing tools 230, such as seen in FIG. 11, thereby breaking down aggregates 42 and agglomerates, and further mixing the constituents to produce a desired product formula 170.

As further seen in FIG. 3, the product formula 170 can readily be used to form 76 enhanced masonry products 28, e.g. blocks 28. A block mold 860 (FIG. 25) that is dynamically formed within the dynamic block press 24 is filled 78 with product formula 170, which in some embodiments comprises a predetermined weight of product formula 170. In some embodiments, the predetermined weight can be calculated, determined, or adjusted, to produce a masonry block 28 of known dimensions, such as for a given product formula 170, having a known moisture content, and for a specified compression 80, to form a masonry block 28. Once the dynamically formed block mold 860 is filled 78, the product formula 170 within the block mold 860 is compressed 80, and then the pressure is released 82, as one or more portions of the block mold 860 are retracted.

As also seen in FIG. 3, the formed block workpiece 28 is then removed 84 from the dynamic block press 24, and the block mold 860 is dynamically reformed 80, whereby the dynamic block press 24 can be used to produce a subsequent masonry block 28. The formed and removed masonry block 28 is then typically transferred 30 (FIG. 1) to a curing area 32, e.g. a curing rack 32, where the formed masonry block 28 can be allowed to cure, such as for up to 30 days.

FIG. 4 illustrates an apparatus 100 that can be configured to premix 68 and moisten a masonry formula 130 for the manufacture of enhanced masonry products 28. While some embodiments of the pre-mixing apparatus 100 can be configured for the mixing conventional concrete or gunite formulas, other embodiments of the pre-mixing apparatus can specifically be configured for pre-mixing of the constituents of an enhanced masonry formula 130.

The illustrative pre-mixing apparatus 100 seen in FIG. 4 includes a constituent hopper assembly 102 that feeds into a pre-mixing assembly 118. The illustrative hopper assembly seen in FIG. 4 includes a hopper 104 having one or more hopper sections 106, e.g. 106a-106e, which are configured to receive and controllably output constituent mixtures 108, e.g. 108a-108e toward a common chute 114.

Each of the constituent mixtures 108a-108e can include one or more constituents, such as including any of aggregates 42, fines 44, cement 46, and can further include supplementary cementitious material 52 and/or other constituents 54. For example, in a hopper 104 having two hopper sections 106a and 106e, a first constituent mixture 108a can comprise a predetermined mixture of aggregate 42 and fines 44, while a second constituent mixture 108a can comprise a predetermined mixture of cement 46, supplementary cementitious material 52 and/or other constituents 54.

The illustrative pre-mixing apparatus 100 seen in FIG. 4 also includes a delivery mechanism 110, e.g. 110a-110e, for each of the hopper sections 106, such as including a controllable gate 112, e.g. 112a-112e for each of the delivery mechanisms 110, which can be controlled manually, by a local controller 14 (FIG. 1), or by a system controller 34 (FIG. 1), whereby the resultant formula includes a controlled ratio of the desired constituents.

Once the constituents 108 are initially mixed together within the chute region 114, they are advanced through the entrance 116 of the pre-mixing assembly 118, which extends through a dry mixing region 126 and a wet mixing region 128, toward an exit 132. The illustrative pre-mixing assembly 118 seen in FIG. 4 includes a lower trough 120 that generally defines a lower half of a cylindrical conduit, and an upper cover 122 that generally defines an upper half of the cylindrical conduit. An auger 127 extends longitudinally through the pre-mixing assembly 118, and is configured to rotate, to promote mixing of the constituents as they move toward the exit 132. The premixing assembly 118 also includes a water delivery assembly 124 for the controlled introduction of water 50, which is additionally mixed with the other constituents in the wet mixing region 128, to form the pre-moistened masonry formula 130, which can then be transferred 16 to the enhanced mixer 18.

Figure 5:
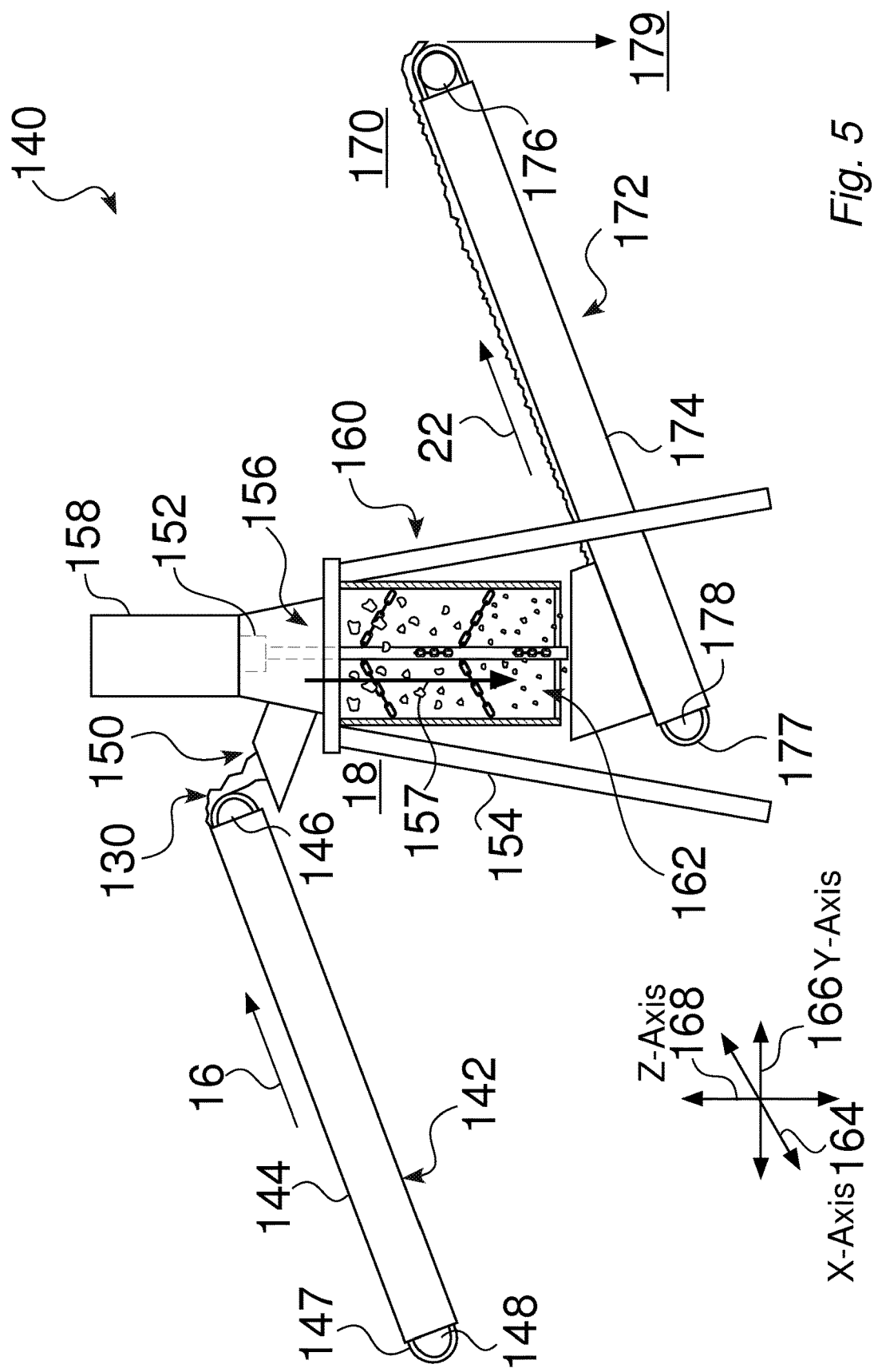
FIG. 5 illustrates the delivery of a moistened partially mixed formula into and through a high-shear mixer, wherein the mixer is configured to process the pre-moistened partially mixed formula, to produce a product formula.

FIG. 5 is a schematic diagram 140 that illustrates the transfer 16 of a moistened partially mixed formula 130 into and through an enhanced high-shear mixer 18, wherein the enhanced mixer 18 is configured for any of mixing, breaking down constituents, and de-agglomerating the pre-moistened formula 130, to produce a product formula 170.

As seen in FIG. 5, a primary mix transport assembly 142 can be used to transport 16 the pre-moistened masonry formula 130 from the primary mixer 12 to the enhanced mixer 18. For example, the primary mix transport assembly 142 seen in FIG. 5 comprises opposing rollers 146, 148 that are rotatably mounted on opposing ends of a conveyor frame 144, and a conveyor assembly 147 that is mounted between the rollers 146 and 148, wherein rotational movement of the rollers 146 and 148 results in longitudinal movement of the conveyor assembly 147, upon which the pre-moistened formula 130 can be advanced into the entrance 150 of the enhanced mixer 18.

The illustrative enhanced mixer 18 seen in FIG. 5 includes a high-shear mixing assembly 160, which can generally be aligned vertically, such as generally perpendicular to an X-axis 164 and a Y-Axis 166, and generally parallel to the Z-axis 168 as shown.

The illustrative enhanced mixer 18 seen in FIG. 5 is mounted on a frame 154, wherein a rotation mechanism 158, e.g. a motor, a hydraulic mechanism, or a power take-off (PTO), is coupled 152 to the high-shear mixing assembly 160, whereby the high-shear mixing assembly 160 can be rotated at high speed, e.g. greater than or equal to 1,000 rpm, and in some embodiments up to 2,500 rpm, as the pre-moistened formula 130 falls 157 vertically downward from the upper region 156, past the high-shear mixing assembly 160, and toward the lower exit region 162. The enhanced mixer 18 can be configured for any of mixing, breaking down constituents, and de-agglomerating the pre-moistened formula 130. The processing 74 (FIG. 3) of the pre-moistened formula 130 in the enhanced mixer 18 produces a product formula 170 (FIG. 5), which is more homogeneous than the initial pre-moistened formula 130, and substantially improves the resultant quality of the enhanced masonry blocks 28. The enhanced mixer 12 can be operated either manually, by a local controller 20, by the system controller 34, or by any combination thereof.

In the illustrative enhanced mixer 18 seen in FIG. 5, when the resultant product formula 170 falls 157 downward beyond the high-shear mixing assembly 160 through the exit region 162 of the enhanced mixer 18, the product formula 170 is collected onto a product formula transport assembly 172, which can be used to transport 22 the product masonry formula 170 from the enhanced mixer 12 to the dynamic block press 24. For example, the product formula transport assembly 172 seen in FIG. 5 comprises opposing rollers 176, 178 that are rotatably mounted on opposing ends of a conveyor frame 174, and a conveyor assembly 177 that is mounted between the rollers 176 and 178, wherein rotational movement of the rollers 176 and 178 results in longitudinal movement of the conveyor assembly 177, upon which the product formula 170 can advance toward a masonry manufacturing area 179, e.g. which can include one or more dynamic block presses 24.

Figure 6:
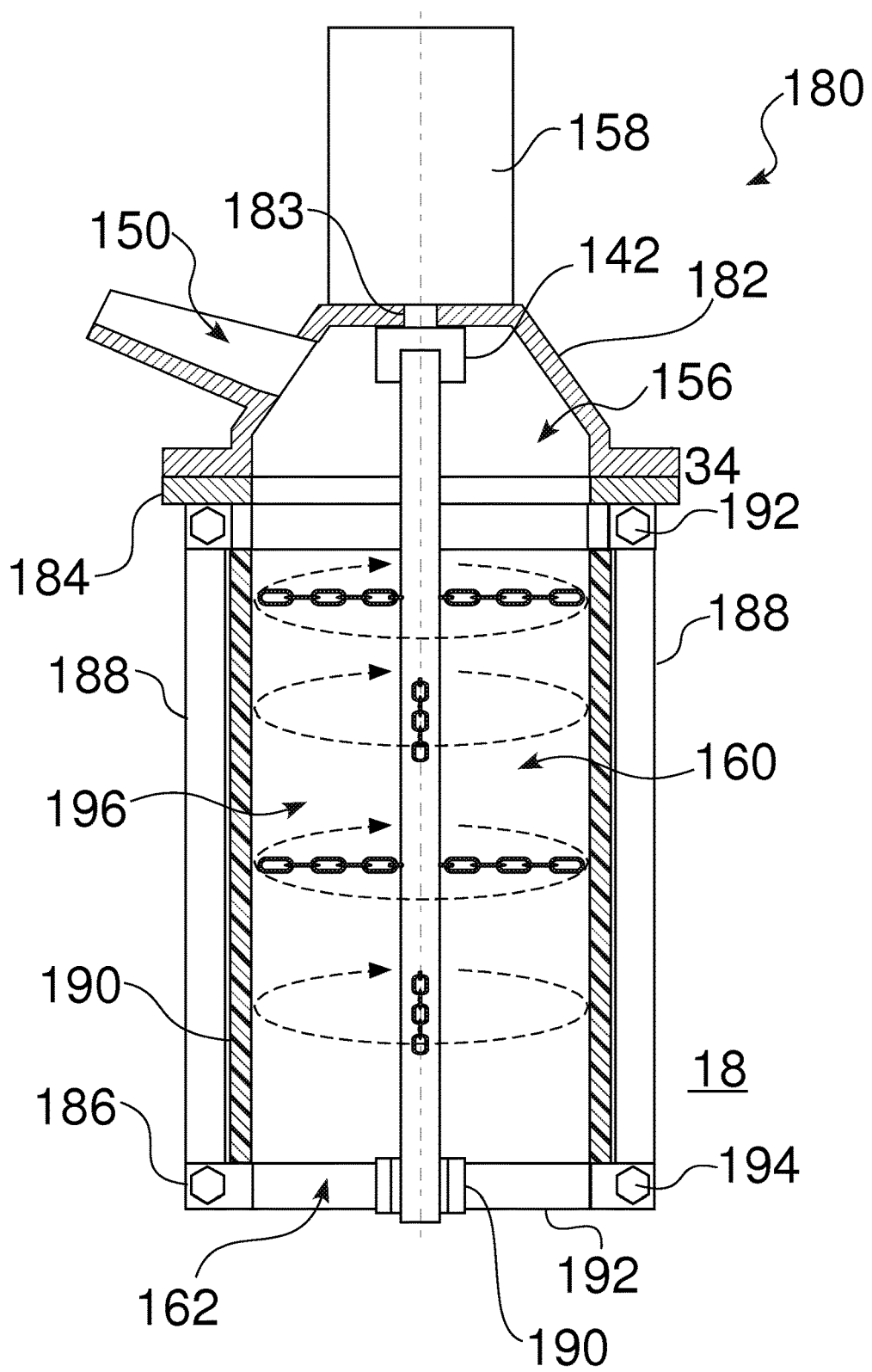
FIG. 6 is a partial side cutaway view of an illustrative embodiment of a high-shear mixer.

FIG. 6 is a partial side cutaway view 180 of an illustrative embodiment of a high shear mixer 18, which extends vertically downward from an upper region 156, to a mixing region 196, toward the exit region 162. The high-shear mixer 18 seen in FIG. 6 includes an upper housing 182 that defines the upper region 156 of the mixer 18, and includes an entrance 150 for receiving pre-moistened masonry formula 130. A rotation mechanism 158, e.g. a motor, is mounted to the housing 182, wherein the rotation mechanism 158 includes a shaft that extends downward. A coupler 162, e.g. a shaft coupler assembly 162 that conforms to ANSI 50-2 standards, is configured to couple the shaft 183 to the high-shear mixing assembly 160, which extends downward through the mixing region 196.

As further seen in FIG. 6, an outer tube 190 extends vertically from the upper housing 182 to the exit 162, wherein the outer tube 190 defines the mixing region 196 through which the high-shear mixing assembly 160 also extends. An upper ring or flange 184 is mechanically affixed to the upper housing 182, while vertical braces are mechanically affixed 192 to the upper ring 184, and extend downward to be affixed 194 a lower circumferential ring 186. A bearing support structure 192 extends inward from the lower circumferential ring 186, in which a bearing 190 is affixed, to axially confine the lower end of the high-shear mixing assembly 160.

In the illustrative embodiment of the high-shear mixer 18 seen in FIG. 6, the outer tube 190 extends from the upper circumferential ring 184 to the lower circumferential ring 186, and in some embodiments the outer tube 190 is compliant, such as to avoid or reduce buildup of pre-moistened masonry formula 130 or the resultant product formula 170. In some embodiments, the outer tube 190 can be manually or automatically acted upon by an external force, e.g. a hammer or other mechanism, such as to remove or reduce any buildup of pre-moistened masonry formula 130 or resultant product formula 170. In embodiments where the outer tube 190 is compliant, such as comprising one or more belted natural or synthetic rubber layers, the external force can deform the outer tube 190 to promote removal or reduction of a buildup of pre-moistened masonry formula 130 and/or resultant product formula 170

Figure 7:
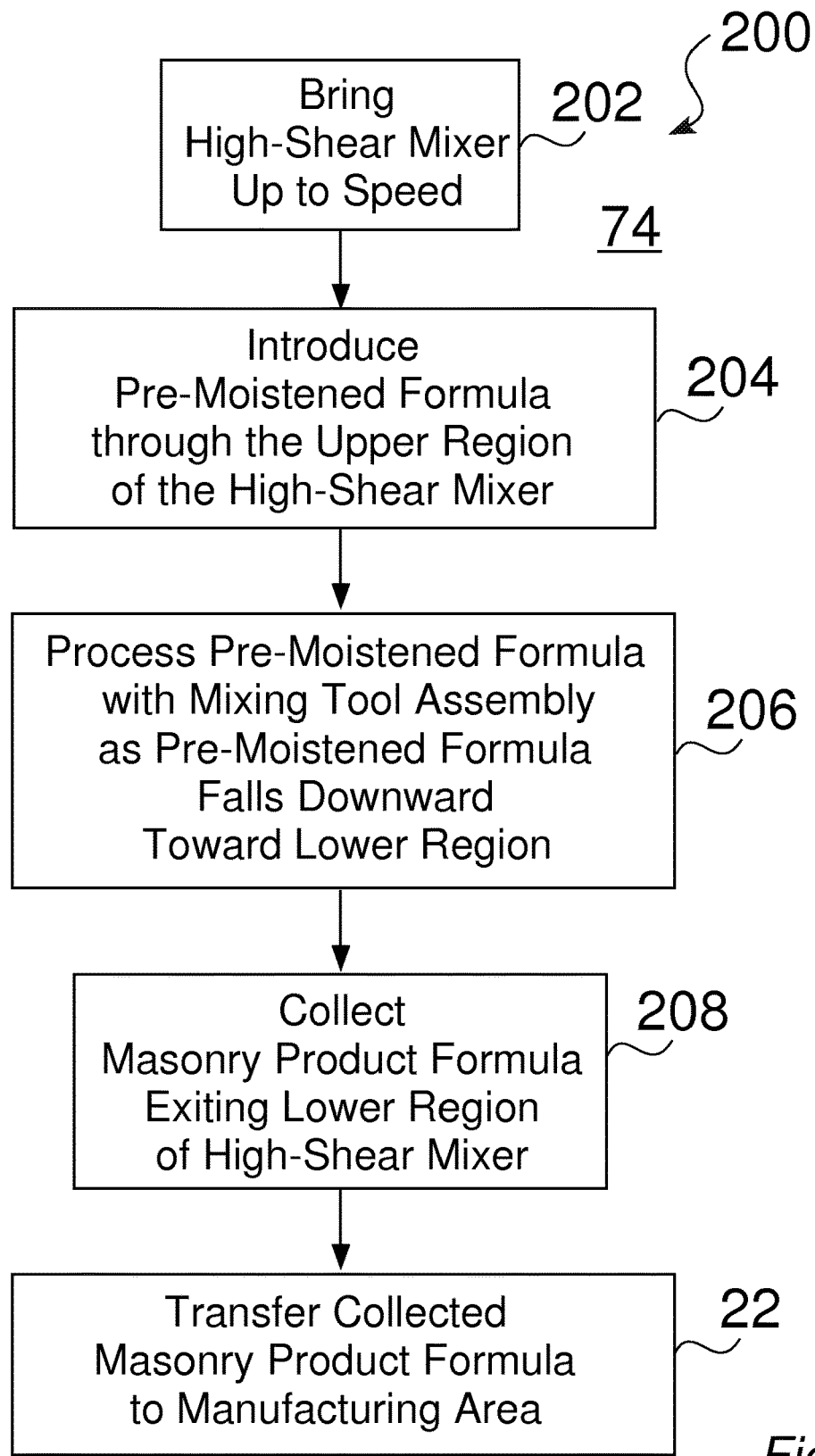
FIG. 7 is a flowchart for enhanced processing of a pre-moistened masonry formula through a high-shear mixer.

FIG. 7 is a flowchart of an illustrative process 200 for processing, e.g. 74 (FIG. 3), a pre-moistened masonry formula 130 through a high-shear mixer 18. Before the introduction of pre-moistened masonry formula 130, the high-shear mixer 18 is powered 202 up to a processing speed, e.g. up to or as much or greater than 1,000 rpm. The pre-moistened masonry formula 130, such as transferred 16 from the primary mixer 12, is introduced 204 through the entrance 150 and upper region 156 of the high-shear mixer 18. The pre-moistened masonry formula 130 is then processed 206 by the high-shear mixing assembly 160 as the pre-moistened masonry formula 130 falls downward 157 (FIG. 5). The resultant masonry product formula 170 is then collected 208 as it falls through the exit 162 of the high-shear mixer 18, and is then typically transported 22 toward the manufacturing area 179 (FIG. 5), such as including one or more dynamic block presses 24.

Figure 8:
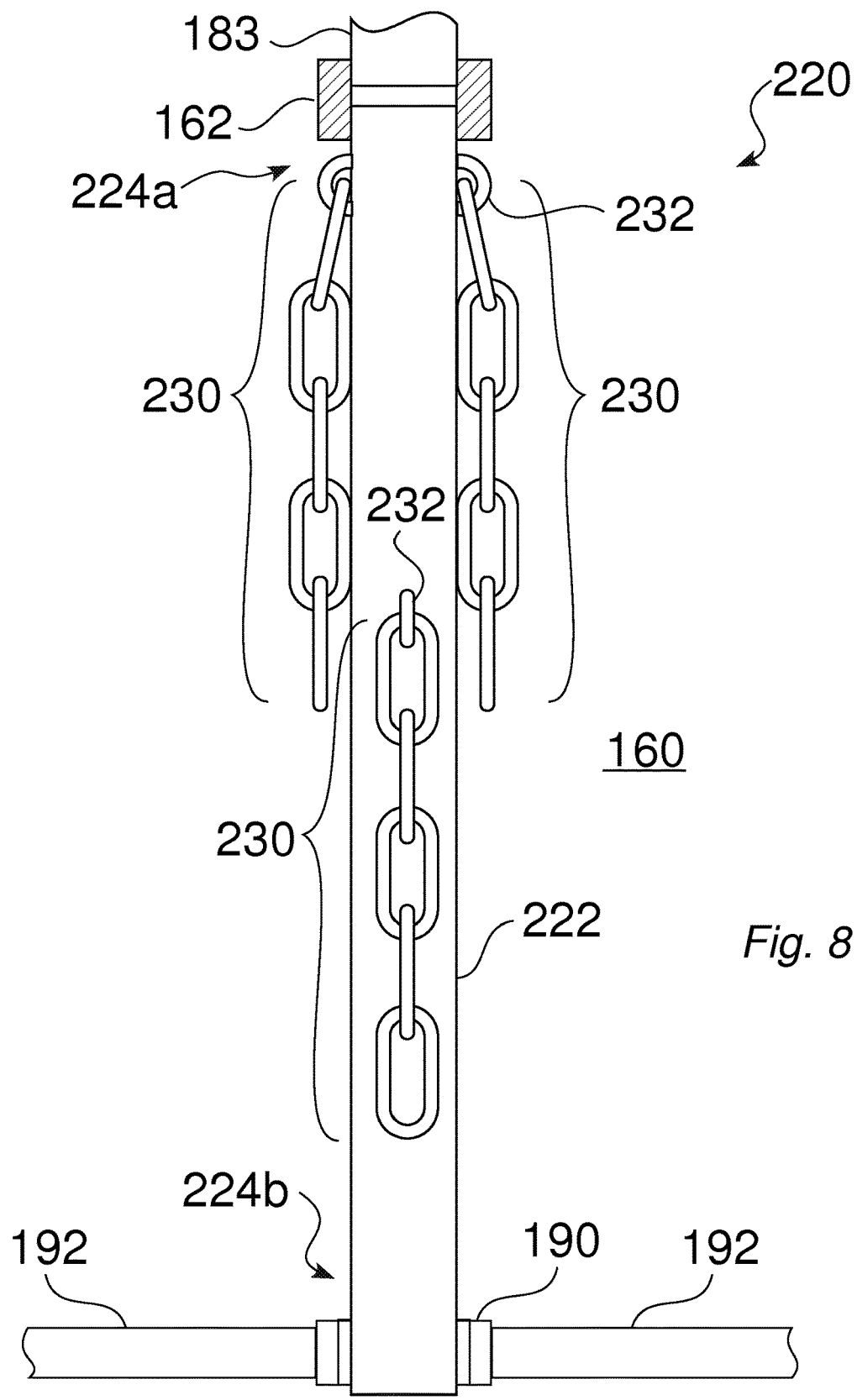
FIG. 8 is a partial side detail view of an illustrative mixing shaft assembly for a high-shear mixer, in a resting state.
Figure 9:
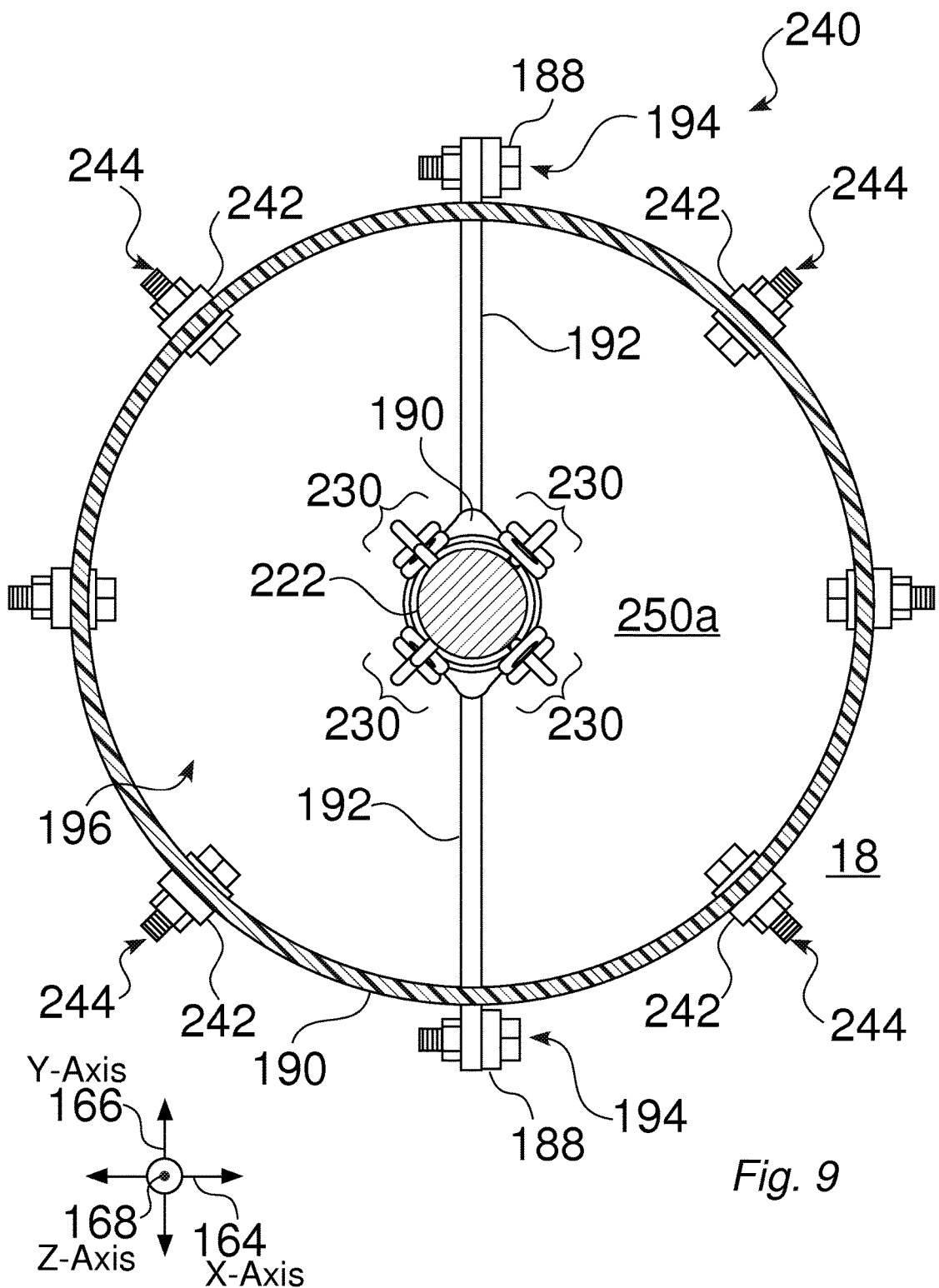
FIG. 9 is a partial top cutaway view of an illustrative mixing shaft assembly within a mixing region of a high-shear mixer, wherein the mixing shaft assembly is in a resting state.
Figure 10:
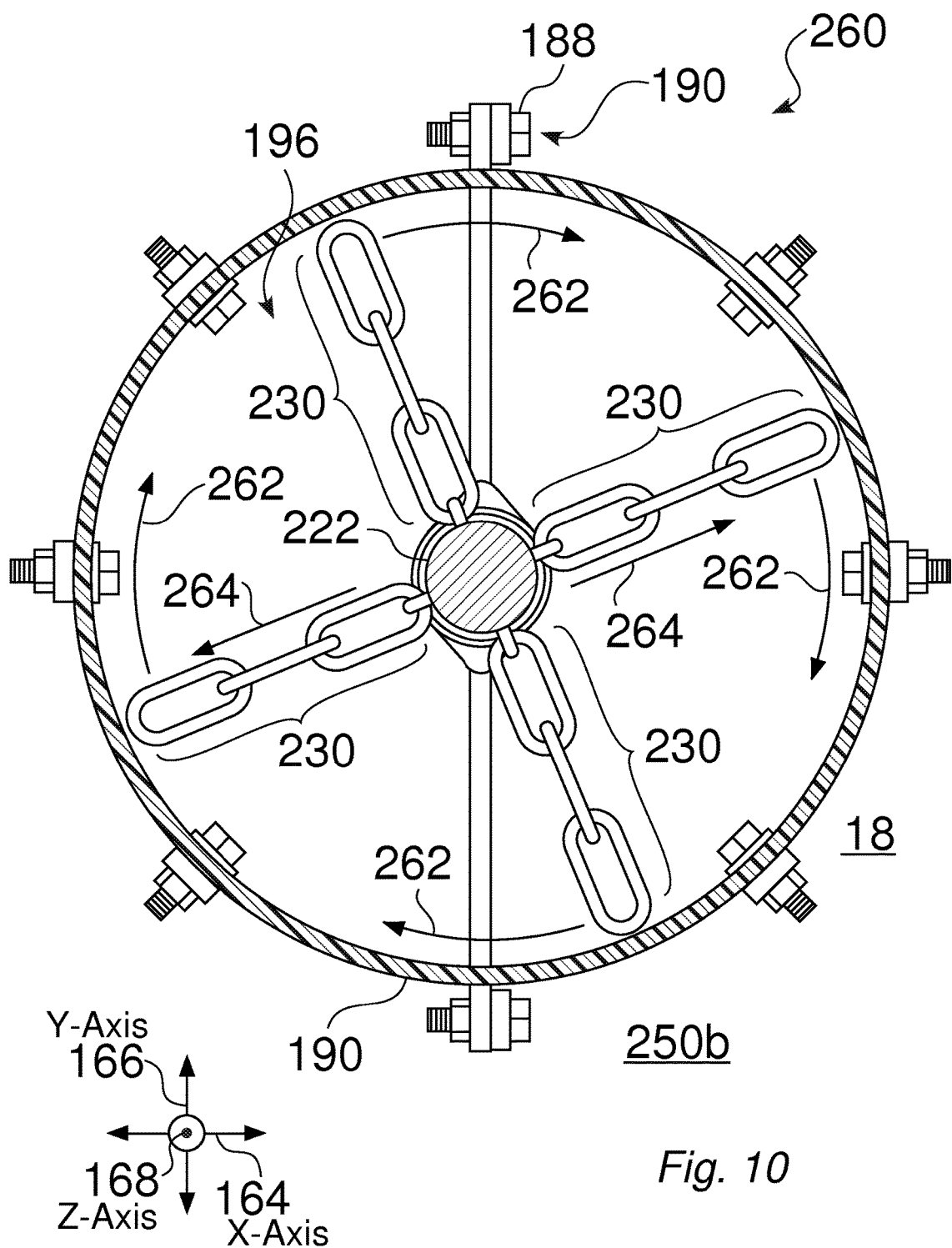
FIG. 10 is a partial top cutaway view of an illustrative mixing shaft assembly within a mixing region of a high-shear mixer, wherein the mixing shaft assembly is in a rotating state for processing a moistened partially mixed formula.

FIG. 8 is a side detail view 220 of an illustrative high-shear mixing assembly 160 for a high-shear mixer 18, in a resting state 250a (FIG. 9). FIG. 9 is a partial top cutaway view 240 of an illustrative high-shear mixing assembly 160 within a mixing region 196 of a high-shear mixer 18, wherein the high-shear mixing assembly 160 is in a resting state 250a. FIG. 10 is a partial top cutaway view 260 of an illustrative high-shear mixing assembly 160 within a mixing region 196 of a high-shear mixer 18, wherein the high-shear mixing assembly 160 is in a rotating state 250b for processing a moistened partially mixed formula 130. FIG. 11 is a top partial top cutaway view 280 of an illustrative high-shear mixing assembly 160 within a mixing region 196 of a high-shear mixer 18, wherein the high-shear mixing assembly 160 is in a rotating and loaded state 250c, wherein moistened partially mixed formula 130 falls downward through the mixing region 196, and is acted upon by the mixing tools 230.

The illustrative embodiment of the high-shear mixing assembly 160 seen in FIG. 8 includes a mixer shaft 222, which in a current embodiment comprises a ⅞" diameter cylindrical steel shaft. The mixer shaft 222 extends from an upper end 224a to a lower end 224b opposite the upper end 224a. The upper end 224a of the mixer shaft 222 is coupled or otherwise affixed to a drive shaft 183 of a drive mechanism 158 (FIG. 5, FIG. 8), while the lower end 224b of the mixer shaft 222 is axially supported by a bearing 190, which is affixed to the high-shear mixer 18 through one or more bearing supports 192. The high-shear mixing assembly 160 seen in FIG. 8 also includes one or more mixing tools 230 that extend from the mixer shaft 222, such as by connections 232.

The high-shear mixing assembly 160 seen in FIG. 8 includes a plurality of mixing tools 230 that extend from the mixer shaft 222, and can be configured to rotate outward and upward when powered through rotation of the drive mechanism 158. The illustrative mixing tools 230 seen in FIG. 8 can comprise sections of chain links 306, e.g. 306a-306d (FIG. 12), which are configured to rotate outward and upward from shaft connections 232. A wide variety of mixing tools 230 can be used to promote the mixing, breakdown of aggregates, and/or de-agglomeration of the pre-moistened formula 130. As well, the specific location, size and material used for the mixing tools 230 can be chosen for any of performance, balance, longevity, and/or other factors.

As seen in FIG. 9, the outer tube 190 can be affixed to the circumferential rings 184,186, such as by fastener assemblies 244 that extend through ring tabs 242. As seen in FIG. 10, when the mixer shaft 222 is rotated 262 up to a no-load state 250b, the mixing tools 230 can be configured to rotate 264 upward and outward, wherein pre-moistened formula 130 that is subsequently fed into the enhanced mixer 18 is acted upon within the mixing region 196 by one or more of the mixing tools 230 at the pre-moistened formula 130 travels downward 157 due to gravity G. As seen in FIG. 11, the pre-moistened formula 130 is further mixed, broken up, and de-agglomerated by the mixing tools 230 as it moves downward 157 through the mixing region 196. The illustrative mixing tools 230 seen in FIG. 11 can also be configured to provide some compliance 282 as they act upon the pre-moistened formula 130.

Figure 12:
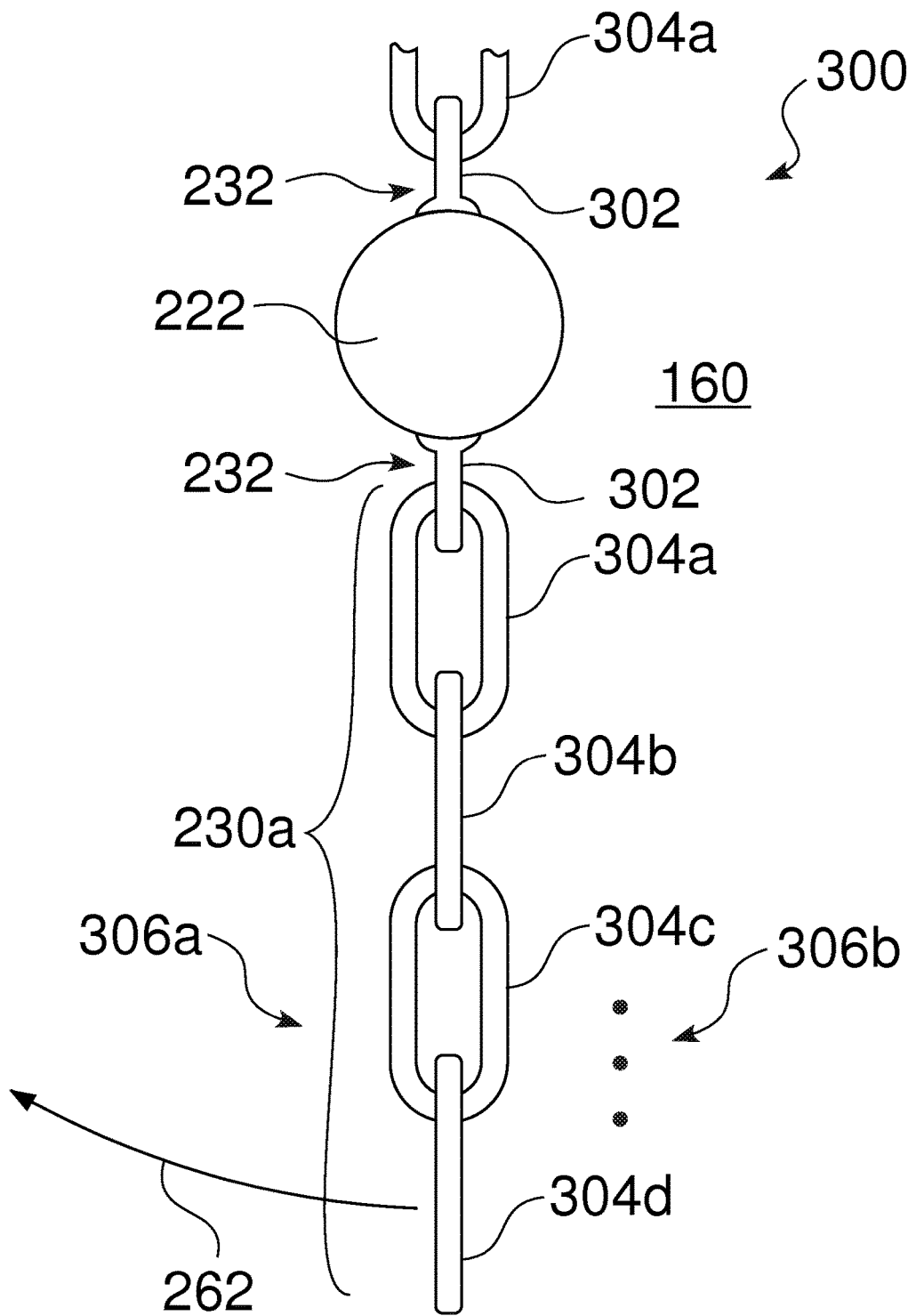
FIG. 12 is a partial detail view of an illustrative mixing shaft assembly that includes chain link mixing tools.

FIG. 12 is a partial detailed view 300 of an illustrative high-shear mixing assembly 160 that includes chain link mixing tools 230a. As seen in FIG. 12, the mixing tools 230, such as chain link mixing tools 230a, can be mounted around the circumference of the mixer shaft 222, such as to balance the mixing shaft assembly 160. In some embodiments of the illustrative high-shear mixing assembly 160, the shaft connections 232 comprise chain link portions 302 that are welded or otherwise securely affixed to the mixer shaft 222, whereby the chain link mixing tools 230a can readily rotate 264 (FIG. 10) upward and outward when the mixer shaft 222 is brought up to speed, and can also provide compliance 282 (FIG. 11) when acting upon the pre-moistened formula 130. The chain link mixing tools 230a can each include one or more chain links 304, e.g. 304a-304d, such as depending on link size, the diameter of the mixer shaft 222, and/or the diameter of the outer tube. The chain link mixing tools 230a can be comprised of any a wide variety of materials, e.g. steel, stainless steel, and can be plated, hardened, and/or tempered.

Figure 13:
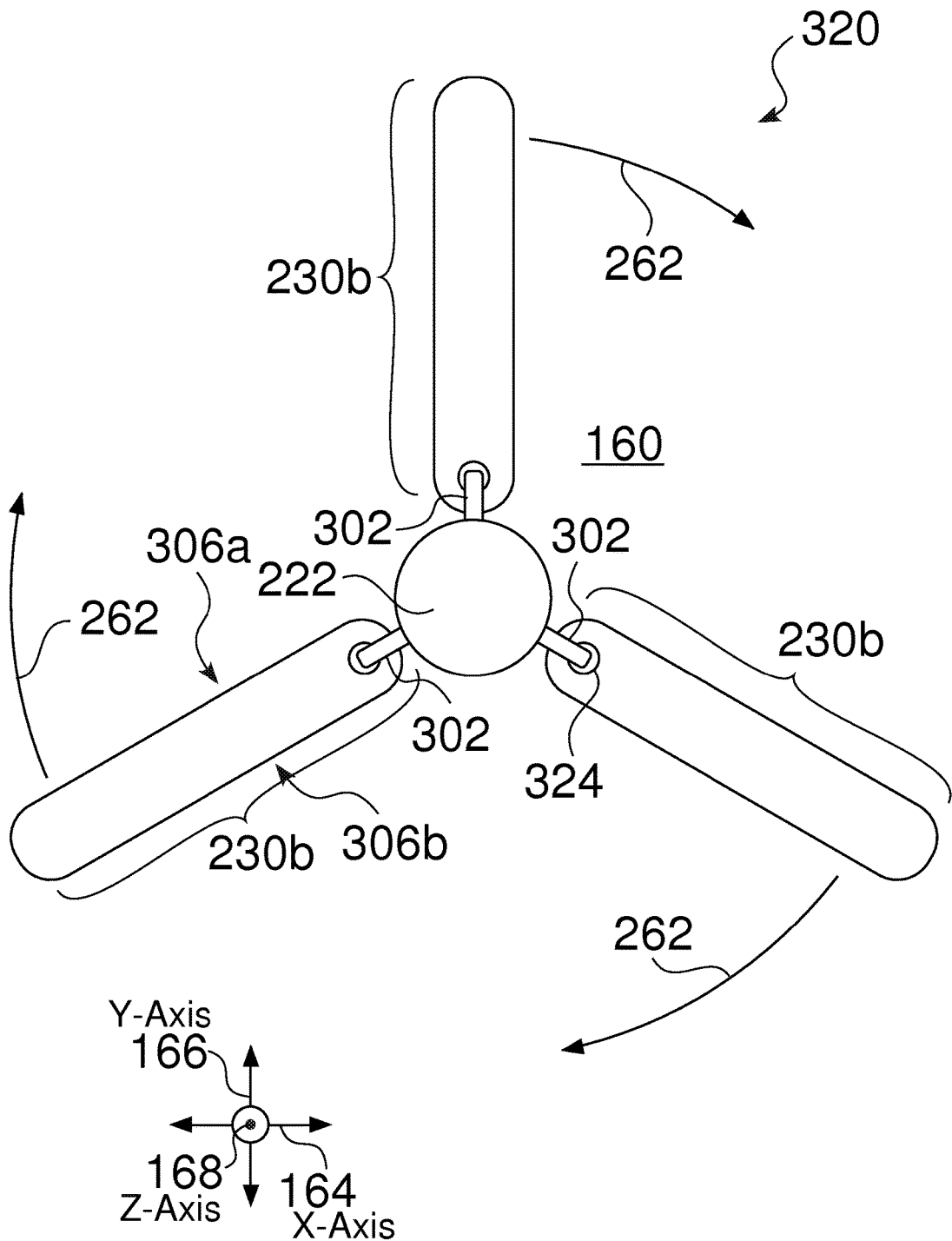
FIG. 13 is a top schematic view of an illustrative mixing shaft assembly that includes hingedly affixed mixing tools.
Figure 14:
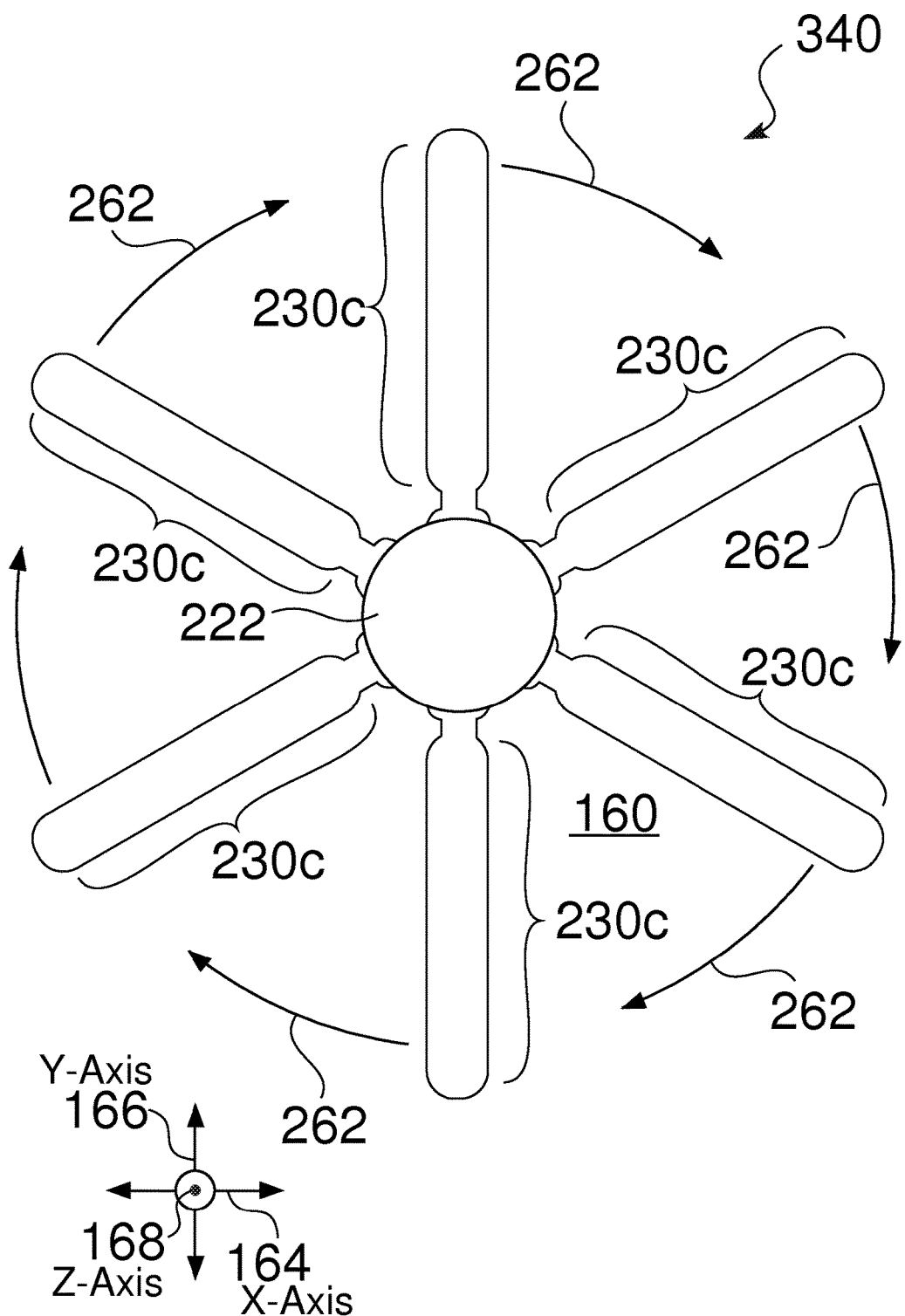
FIG. 14 is a top schematic view of an illustrative mixing shaft assembly that includes fixed mixing tools.

FIG. 13 is a detailed view 320 of an illustrative high-shear mixing assembly 160 that includes hinged affixed mixing tools 230b. FIG. 14 is a detailed view 340 of an illustrative high-shear mixing assembly 160 that includes fixed mixing tools 230c. The hingedly affixed mixing tools 230b seen in FIG. 13 include a mounting hole 324 defined therethrough at a mounting end proximate the mixer shaft 222. The illustrative mixing tools 230b seen in FIG. 13 include a leading side 306a and a trailing side 306b opposite the leading side 206b, wherein the leading side 306a is configured to impact the pre-moistened masonry formula 130 as the mixing tools 230b are rotated 262.

Figure 15:
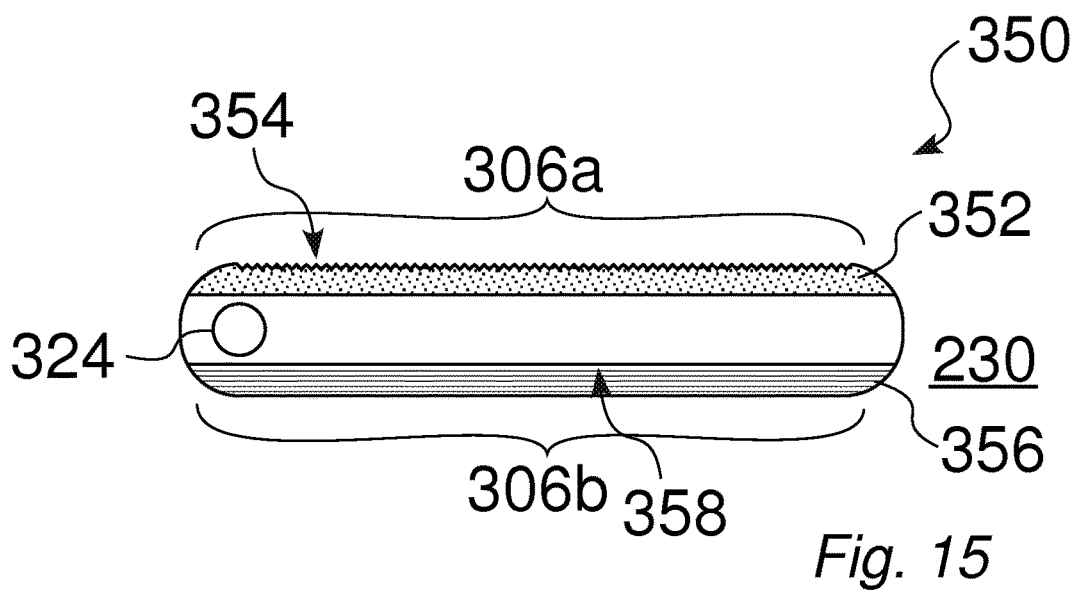
FIG. 15 is a detailed plan view of an illustrative mixing tool, which includes a leading side that can be configured for any of performance or endurance, and/or a trailing side that can be configured for any of mixing or formula guidance.

The shape, surface treatment, surface features, or other characteristics of the leading side 306a and/or the trailing side 306b of the mixing tools 230, e.g. 230b, 230c, can be chosen based on a variety of factors, such as for any of mixing, cutting, deagglomeration, longevity, cleanability, cost, and/or serviceability. For example, FIG. 15 is a detailed plan view 350 of an illustrative mixing tool 230, which includes a leading side 306a that is enhanced for any of performance or endurance, and/or a trailing side 306b that can be configured for any of mixing or guidance of the pre-moistened masonry formula 130, such as toward the leading side 306a of a subsequent mixing tool 230 that is rotating 262. As seen in FIG. 15, the leading side 306a can include any of a corresponding surface treatment 352 and/or a surface feature 354, and the trailing side 306b can include any of a corresponding surface treatment 356 and/or a surface feature 358.

Figure 16:
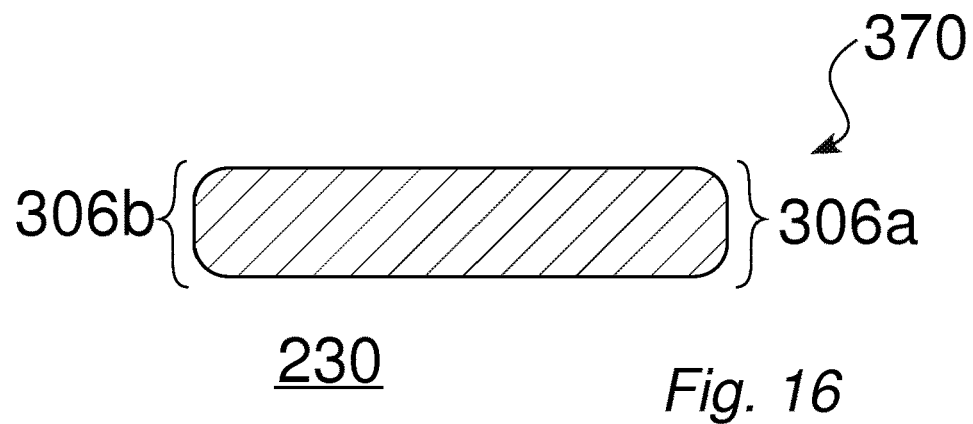
FIG. 16 is an illustrative cutaway view of a mixing tool having a symmetric cross-section between a leading side and a trailing side.
Figure 17:
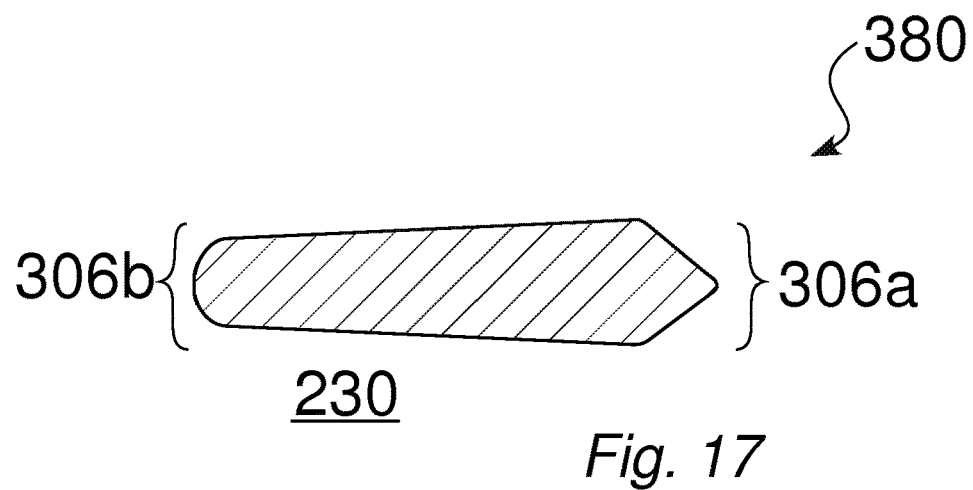
FIG. 17 is an illustrative cutaway view of a mixing tool having an asymmetric cross-section between a leading side and a trailing side.

FIG. 16 is an illustrative cutaway view 370 of a mixing tool 230 having a symmetric cross-section between a leading side 306a and a trailing side 306b. FIG. 17 is an illustrative cutaway view 380 of a mixing tool 230 having an asymmetric cross-section between a leading side 306a and a trailing side 306a. The specific shape of the leading side 306a and a trailing side 306b of the mixing tools 230 can be chosen based on a wide variety of parameters, such for any of mixing, breaking down specific aggregates or agglomerates, longevity, cost, cleanability, and/or any combination thereof.

Figure 18:
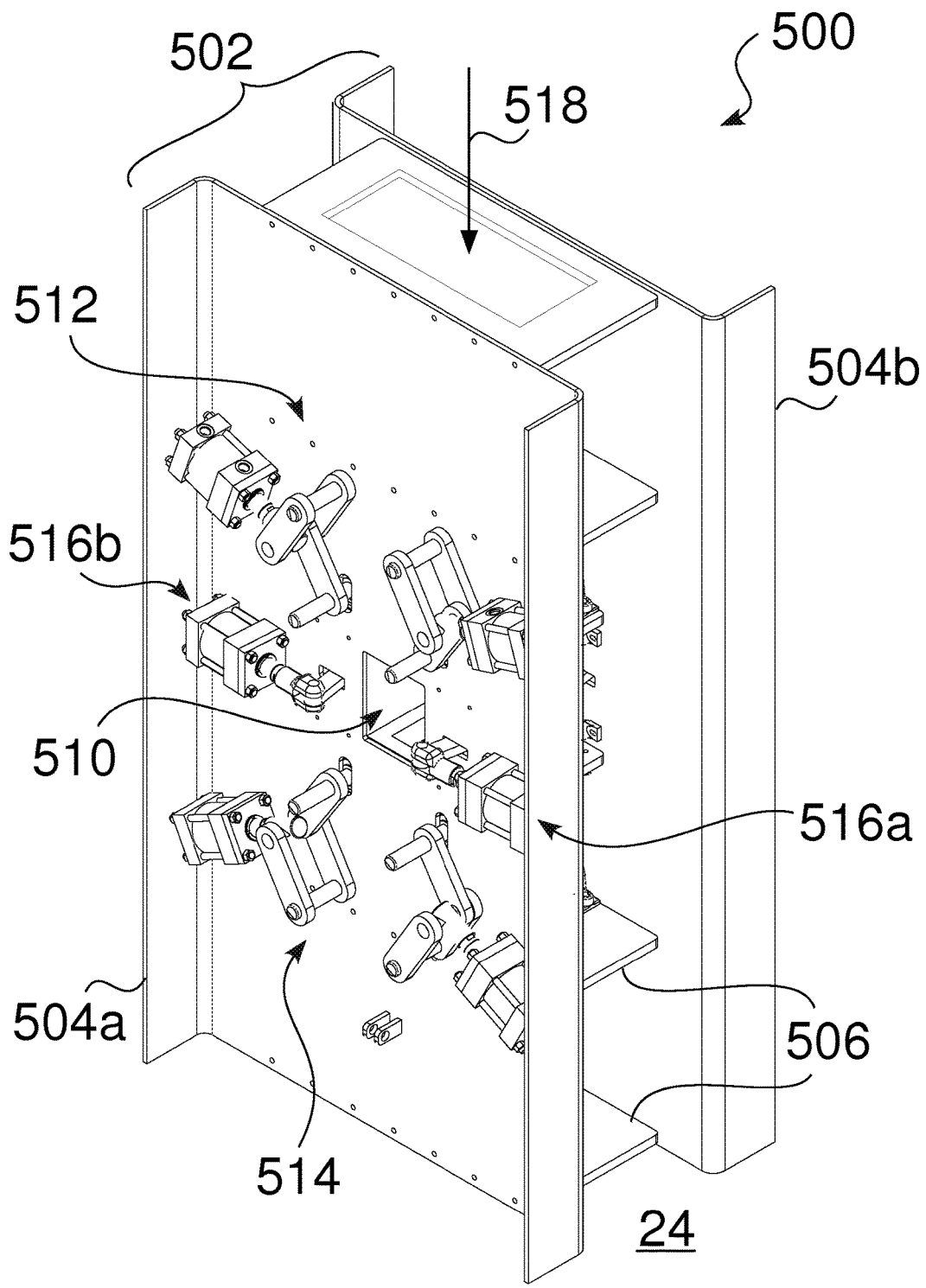
FIG. 18 illustrates an embodiment of an illustrative dynamic block press that is configured for forming enhanced masonry blocks.

FIG. 18 is a perspective view 500 of an illustrative embodiment of a dynamic block press 24 that is configured to produce enhanced masonry blocks 28. The illustrative dynamic block press 24 seen in FIG. 18 can be configured to receive product formula 170 transferred 22 from an enhanced high-shear mixer 18. The moisture content of the product formula 170 can be much lower than that of conventional concrete mixes, and the composition of the product formula 170 can be configured to be compressible, wherein the product formula 170 can be compressibly formed into enhanced masonry blocks 28 within the dynamic block press 24, such as within a dynamically formed block mold 860 (FIG. 25), wherein the enhanced masonry blocks 28 are subsequently removed from the dynamic block press 24 for optional post finishing 85, and curing 86 (FIG. 3).

The illustrative dynamic block press 24 seen in FIG. 18 includes a frame 502 that extends from a lower end 560a (FIG. 19) to an upper end 560b (FIG. 19), wherein the frame 502 can include opposing vertical frame members 504a and 504b, and a plurality of frame crossmembers 506 that extend between the vertical frame members 504a and 504b. The illustrative upper cross member 506 seen in FIG. 18, e.g. 506d (FIG. 22) has a hopper access hole 518 defined therethrough, such as for receiving product formula 170 for loading to or from a charge hopper 844 (FIG. 25). A production corridor 510 is defined between the opposing vertical frame members 504a and 504b.

The dynamic block press 24 seen in FIG. 18 also includes an upper impact plate press assembly 512, a lower impact plate press assembly 514, and opposing side plate press assemblies 516a and 516b. The illustrative dynamic block press 24 seen in FIG. 18 also includes opposing front and rear plate press assemblies 602a and 602b (FIG. 20), and can also include a core mold assembly 604 (FIG. 20), such as to produce enhanced masonry blocks 28 having one or more cores 620 (FIG. 20) defined therethrough.

In operation, the dynamic block press 24 is configured to dynamically form a block mold 860 (FIG. 25) for producing an enhanced masonry block 28 therein. The dynamic block press is configured to then produce an enhanced masonry block 28, by receiving 808 (FIG. 24) a desired weight or volume of product formula 170 within the dynamically formed block mold 860, controllably compress, e.g. 810 (FIG. 24), the product formula 170 within the block mold 860, through movement of one or more of the press assemblies, controllably release 812 the pressure applied to the formed block 28 by retracting, e.g. 814 and/or 816 (FIG. 24), one of more portions of the block mold 860, and release the block 28 for removal 818 (FIG. 24) from the dynamic block press 24, and reset 804 (FIG. 24) the dynamic block press 24, wherein the dynamic block press 24 is ready for production of a subsequent block 28.

Figure 19:
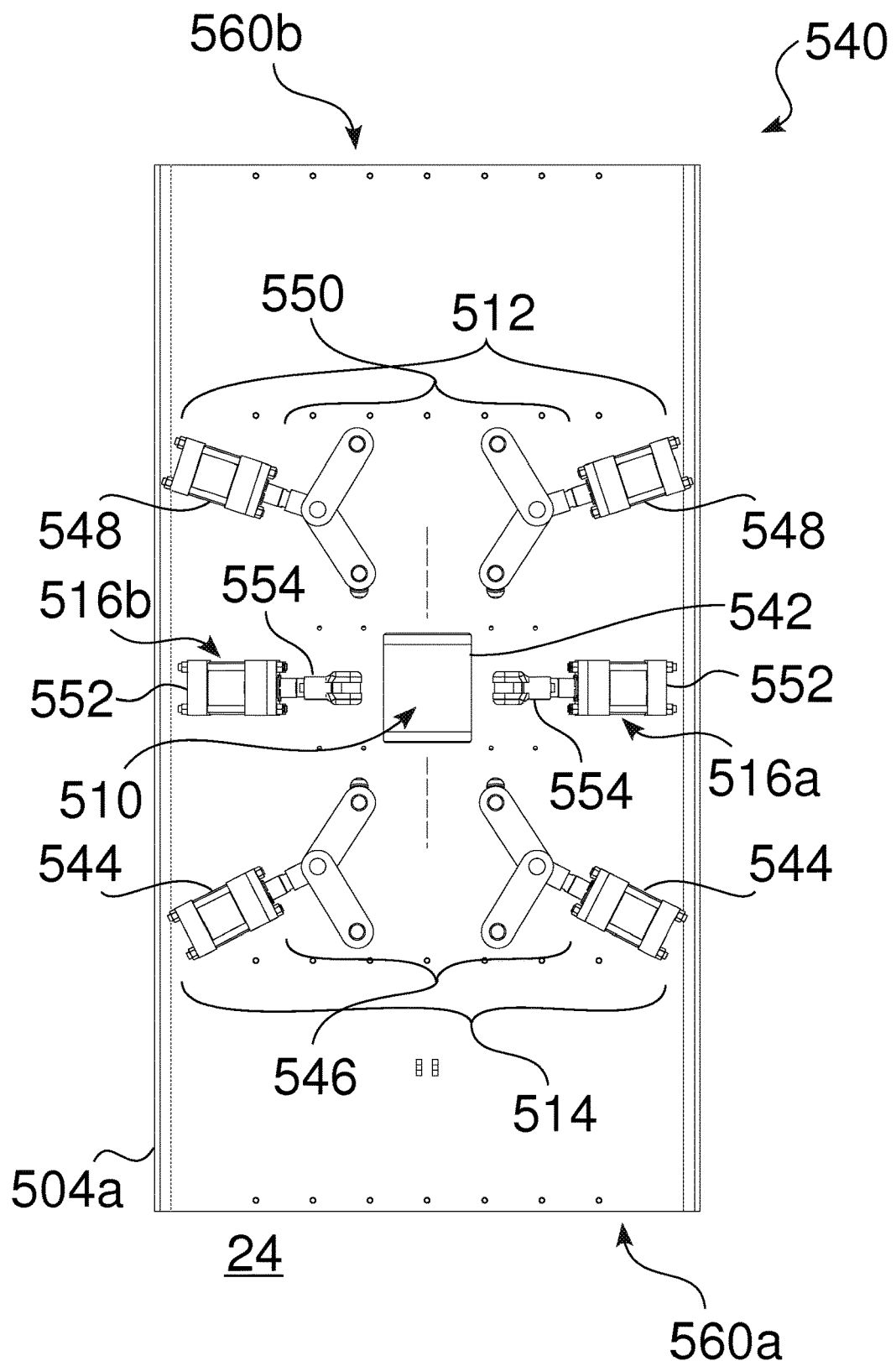
FIG. 19 is a front view of an illustrative dynamic block press.

FIG. 19 is a front view 540 of an illustrative embodiment of a dynamic block press 24, which provides further details of the upper impact plate press assembly 512, the lower impact plate press assembly 514, and the opposing side press assemblies 516a and 516b. A production corridor aperture 542 is defined through the opposing vertical frame members 504a and 504b, wherein the production corridor 510 extends between the opposing vertical frame members 504a and 504b to define the production corridor 510. The illustrative lower impact plate press assembly 514 seen in FIG. 19 includes hydraulic actuators 544 affixed between one or both vertical frame members 504, e.g. 504a and/or 504b, and also includes lower impact plate linkage 546. Similarly, the illustrative upper impact plate press assembly 512 seen in FIG. 19 includes hydraulic actuators 548 affixed between one or both vertical frame members 504, e.g. 504a and/or 504b, and also includes upper impact plate linkage 550. Each of the illustrative side press assemblies 516a and 516b seen in FIG. 19 similarly include one or more hydraulic actuators 552 and corresponding actuator linkages 554.

Figure 20:
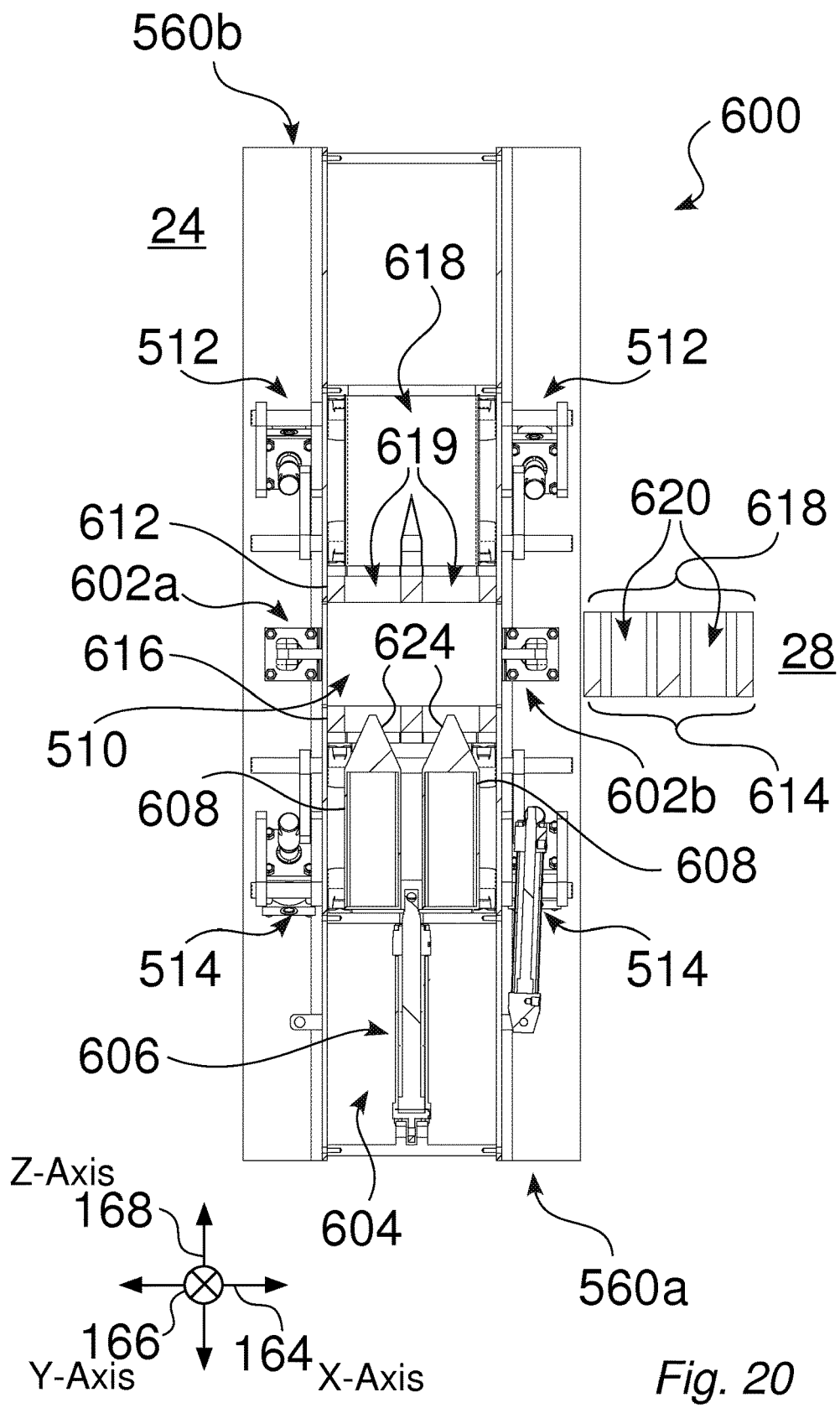
FIG. 20 is a partial side cutaway view of an illustrative dynamic block press.
Figure 21:
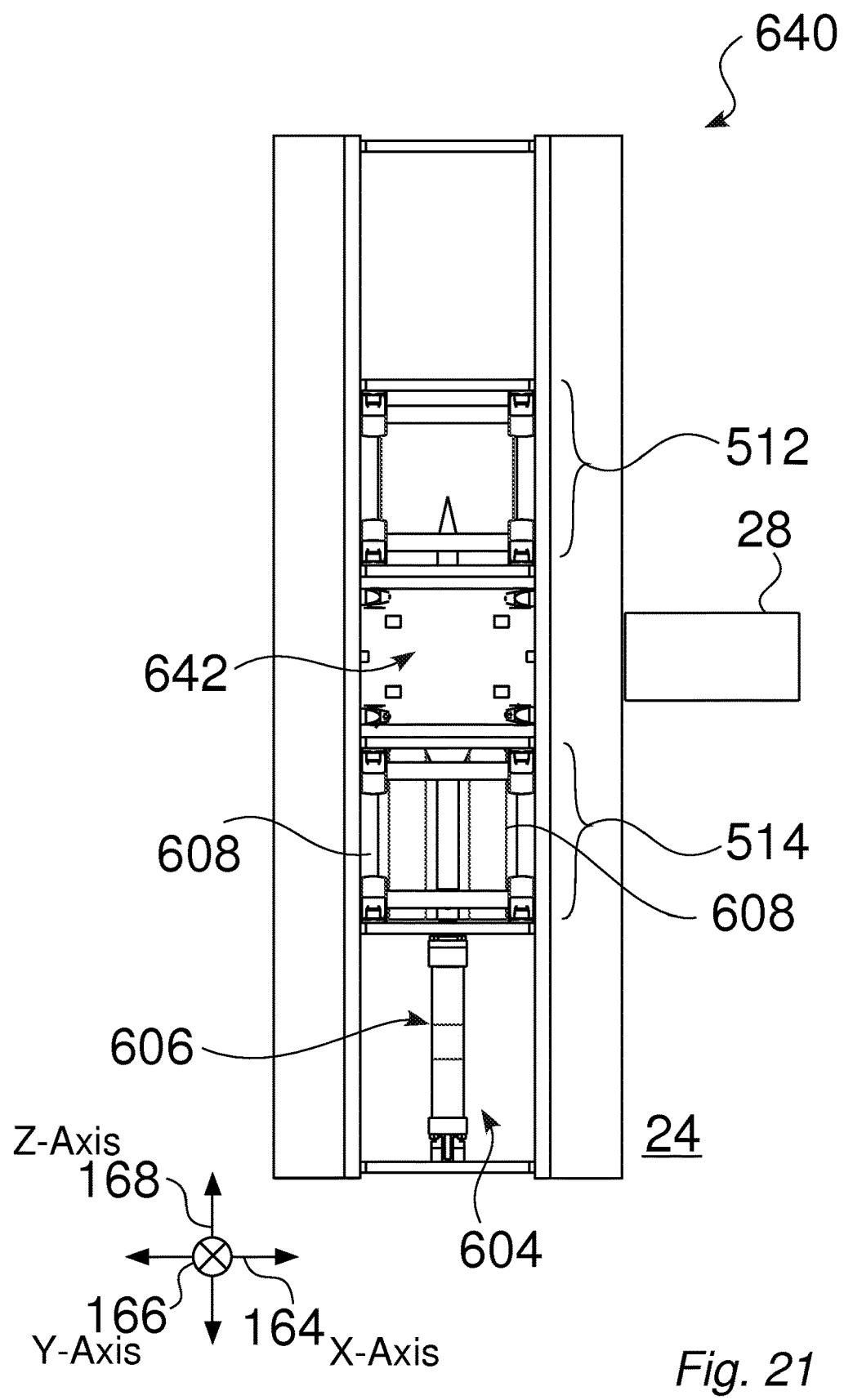
FIG. 21 is a side view of an illustrative dynamic block press.

FIG. 20 is a partial side cutaway view 600 of an illustrative dynamic block press 24. FIG. 21 is a side view 640 of an illustrative dynamic block press 24. The illustrative upper impact plate press assembly 512 seen in FIG. 20 includes an upper impact plate 612 having a lower surface 1086a (FIG. 37), which forms the upper surface of the dynamically formed block mold 860, which is configured to define the upper surface 618 of an enhanced masonry block 28. As well, the illustrative lower impact plate press assembly 614 seen in FIG. 20 includes a lower impact plate 616 having an upper surface 1082b (FIG. 37), which forms the lower surface of the dynamically formed block mold 860, which is configured to define the bottom surface 614 of an enhanced masonry block 28. The illustrative dynamic block press 24 seen in FIG. 20 also includes opposing front and rear press assemblies 602a and 602b, which respectively form the front surface 1064a (FIG. 36) and rear surface 1066a (FIG. 36) of the dynamically formed block mold 860, to define the front surface 1004a (FIG. 35) and rear surface 1004b (FIG. 35) of an enhanced masonry block 28.

The illustrative masonry block 28 seen in FIG. 20 also includes core holes 620 defined therethrough, which can conform to industry standards for the enhanced block 28 to be formed. For example, the enhanced block 28 can effectively match all key dimensions to that of a standard concrete masonry unit (CMU).

The illustrative dynamic block press 24 seen in FIG. 20 includes a mold core assembly 604 to define the one or more cores 620 within the enhanced block 28, wherein the mold core assembly 604 includes a mold core actuator 606 affixed between the frame 502 and one or more mold cores 608, whereby the mold cores 608 are vertically movable 870 (FIG. 25), such as between an upper mold core position 872a (FIG. 25), and a lower retracted position 872b (FIG. 25), whereby a formed enhanced masonry block 28 can be moved 818 (FIG. 24) out of the production corridor 510 when the mold cores 608 are in the lower retracted position 872b.

The illustrative dynamic block press 24 seen in FIG. 20 can also include a product formula chute 618, such as to direct product formula 170 from the charge hopper 844 (FIG. 25), through chute holes 619 defined in the upper impact plate 612, and toward the dynamically formed block mold 860.

The illustrative mold cores 608 seen in FIG. 20 are also configured to divert the product formula 170 into the dynamically formed block mold 860, such as by tapered or pyramid-shaped upper regions 624. For example, while the mold cores 608 are shown in an illustrative lower retracted position 872b (FIG. 25) in FIG. 20, when the mold cores 608 are moved vertically upward to form the cores 620 of the enhanced masonry block 28, the upper tapered portions 624 of the mold cores 608 extend further vertically, e.g. beyond the production corridor 510, and can be configured to divert the product formula 170 as it is loaded downward through the chute 618 and the upper plate 612. As well, the upper tapered portions 624 of the mold cores 608 can prevent the product formula 170 from settling on top of the mold cores 608.

Figure 22:
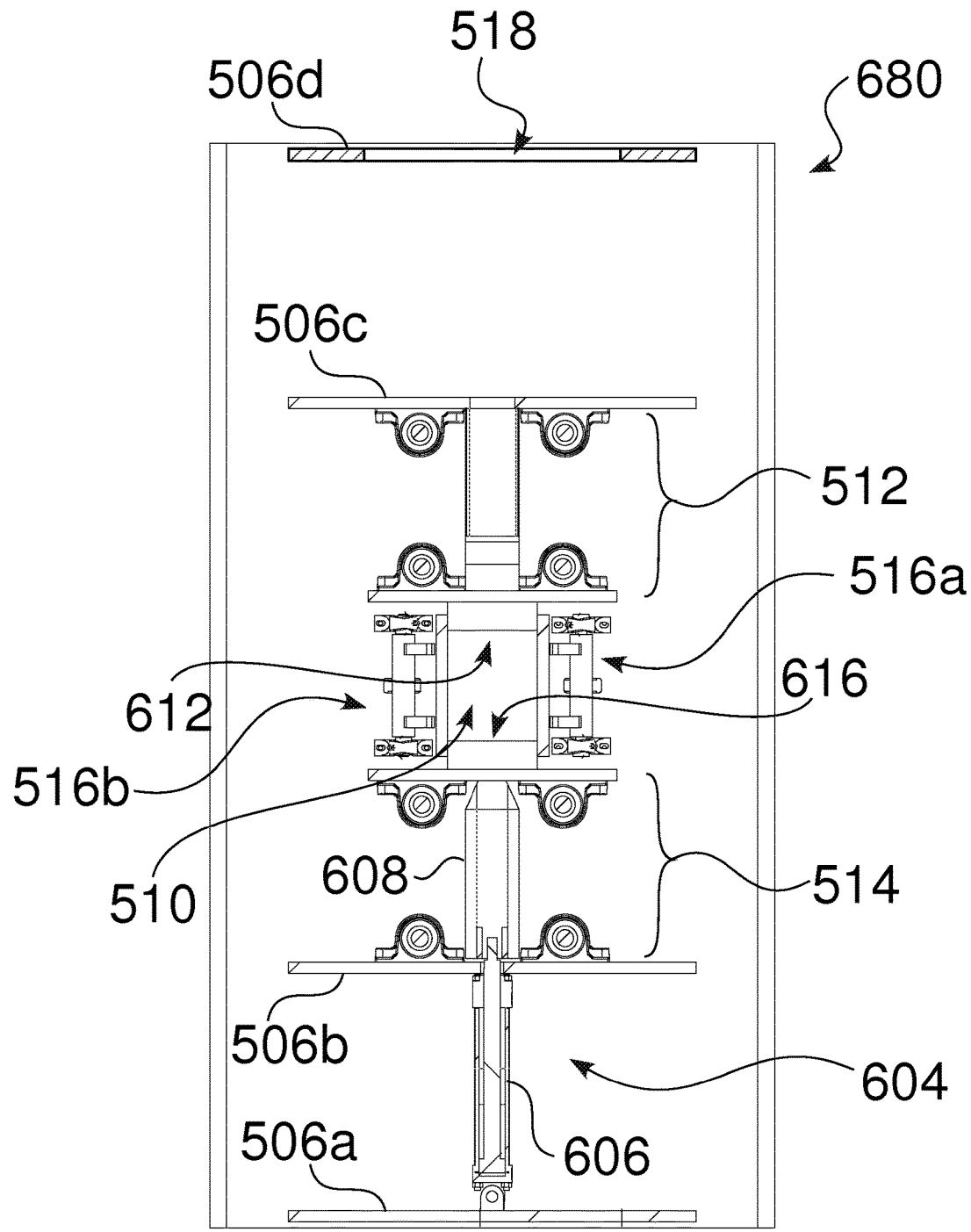
FIG. 22 is a partial front cutaway view of an illustrative dynamic block press.

FIG. 22 is a front cutaway view 680 of an illustrative dynamic block press 24, which shows further details of a lower impact plate assembly 514, including that of a lower impact plate 612. For example, the lower impact plate assembly 514 seen in FIG. 22 is affixed to a crossmember 506, e.g. 506b, and is vertically movable, such as through action of one or more actuators 544 (FIG. 19). The lower impact plate assembly 514 can also include a scissor assembly, a knuckle joint, a lever, or other mechanism 546 (FIG. 19) to increase the force available for compression and/or compactions of the enhanced masonry block 28 with the upper surface 1082b (FIG. 37) upper impact plate 612.

Similarly, the illustrative upper impact plate assembly 512 seen in FIG. 22 is affixed to a crossmember 506, e.g. 506c, and is vertically movable, such as through action of one or more actuators 548 (FIG. 19). The upper impact plate assembly 514 can also include a scissor assembly, a knuckle joint, a lever, or other mechanism 550 (FIG. 19), such as to increase the force available for compression and/or compaction downward on the upper surface 618 (FIG. 20) of the enhanced masonry block 28, with the lower surface 1086a (FIG. 37) upper impact plate 612.

Figure 23:
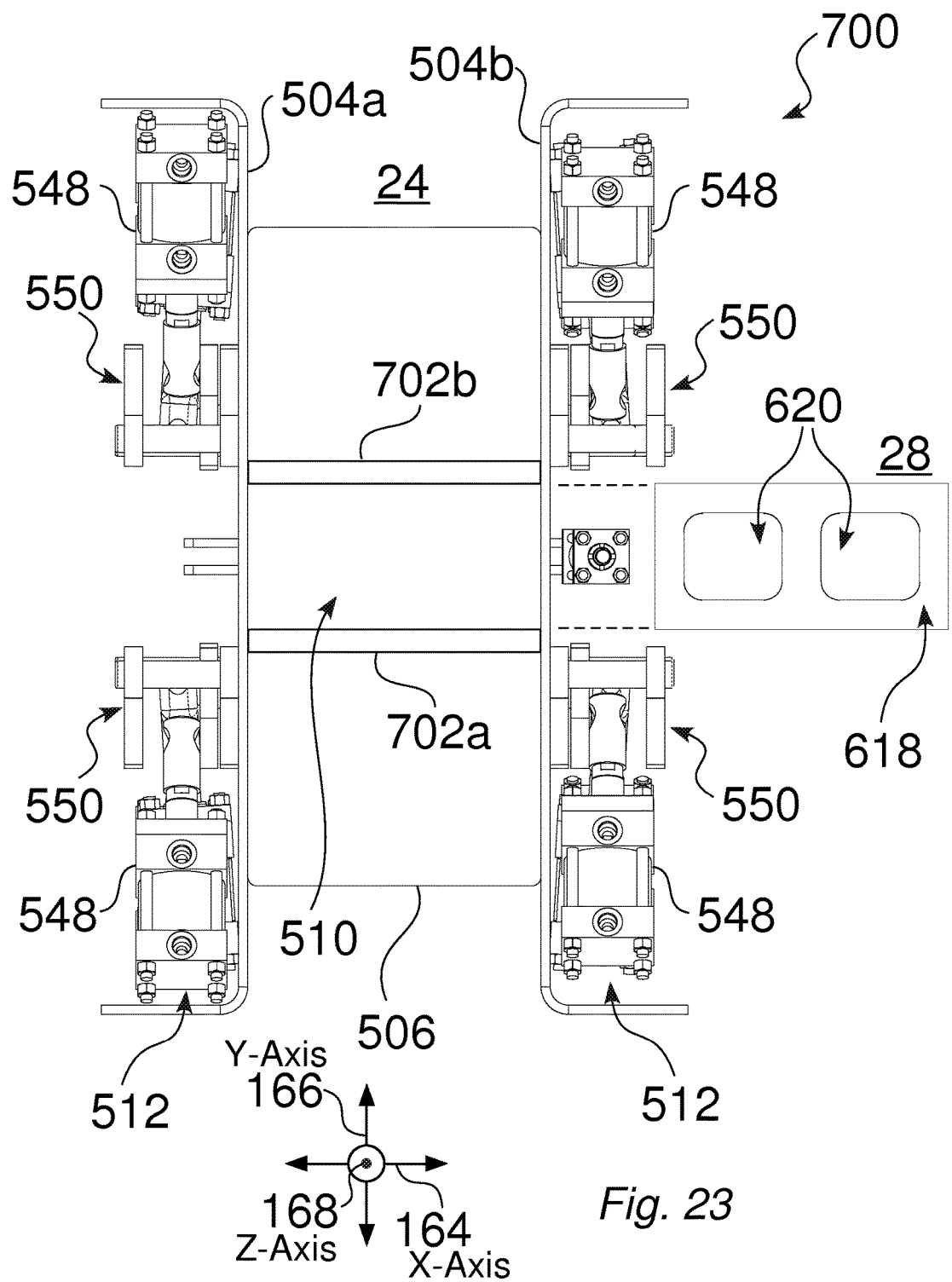
FIG. 23 is a partial top cutaway view of an illustrative dynamic block press.

FIG. 23 is a partial top cutaway view 700 of an illustrative dynamic block press 24, which shows further details of an upper impact plate assembly 512, such as including actuators 548, and/or other movement and compression mechanisms 550. For example, the illustrative dynamic block press 24 seen in FIG. 23 includes actuators 548 and movement and compression mechanisms 550 associated with both frame members 504a and 504b, to control vertical movement, e.g. 924 (FIG. 28), 974 (FIG. 31) of the upper impact plate 612. The illustrative dynamic block press 24 seen in FIG. 23 also includes opposing side mold plates 702a and 702b, which are configured to form the sides 1002a and 1002b (FIG. 34) of the enhanced masonry block 28, and can be configured to move inward, such as to form the dynamically formed block mold 860, and outward, such as to allow removal of a formed block 28, through side press assemblies 516a, 516b (FIG. 18). In some embodiments of the dynamic block press 24, one or both of the inner walls 1068a,1070a of the side plates 702a and 702b can include patterning, embossing, or other details, with which to form the sides 1002a, 1002b of the enhanced masonry block 28. Such enhancements can be implemented with lateral movement of the side plates 702a and 702b.

Figure 24:
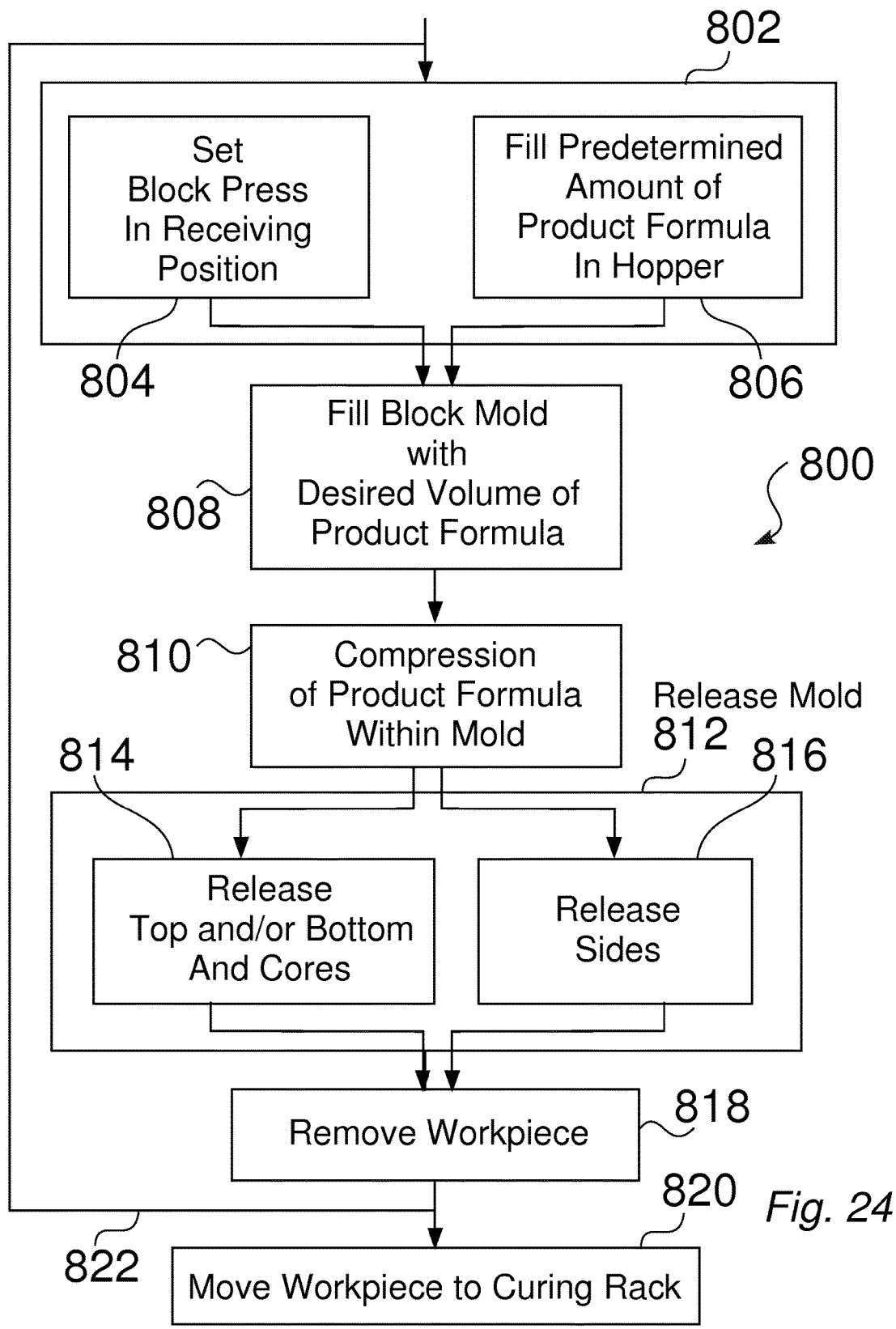
FIG. 24 is a flowchart of an illustrative process for manufacturing an enhanced masonry block with a dynamic block press.

FIG. 24 is a flowchart of an illustrative process 800 for manufacturing an enhanced masonry block 28 with a dynamic block press 24. For example, the illustrative dynamic block press 24 seen in FIG. 18 can be configured in a home position 842a (FIG. 25), wherein the dynamic block press 24 is set 804 to dynamically form a block mold 860 for receiving product formula 170, and wherein a predetermined amount of the product formula 170 can be filled 806 within a charge hopper 844. The dynamically formed mold 860 is filled 808 with the predetermined amount of the product formula 170, and is then compressed 810 within the dynamically formed block mold 860, such as by downward movement of the upper impact plate 612, and/or by upper movement of the lower impact plate 616. The dynamically formed block mold 860 is then released 812, such as by the release 814 of the upper impact plate 612, the lower impact plate 616, the cores 608 (if used), the release 816 of the side plates 702a,702b, the end plates 856,858, or any combination thereof. Once released, the formed masonry block 28 is removed 818 from the dynamic block press 24, and can be moved 820 to a curing area 32, e.g. a curing rack or pallets. The dynamic block press 24 can then return 822 to be reset 804, wherein the dynamically formed block mold 860 is ready to receive product formula 170 for production of a subsequent enhanced masonry block 28.

FIG. 25 is a partial cutaway view 840 of an illustrative dynamic block press 24 in a home position 842a, wherein a dynamically formed block mold 860 is formed through movement and positioning of the dynamic block press 24. The dynamically formed block mold 860 seen in FIG. 25 is established by the lower impact plate 616, the front plate 856, the rear plate 858, the side plates 702a,702b, and the mold cores 608.

The illustrative dynamic block press 24 seen in FIG. 25 is set to controllably deliver a predetermined weight of product formula 170 downward into the dynamically formed block mold 860. The dynamic block press 24, such as through a controller 26 or a system controller 34, can be configured to sense the predetermined weight of product formula, e.g. 40.5 to 42 pounds, within the charge hopper 844. In some embodiments, the setpoint for the predetermined weight be set or changed. The illustrative charge hopper 844 seen in FIG. 25 includes a dispensing mechanism 846, which can be configured to release a predetermined weight of product formula 170 downward toward the dynamically formed block mold 860. The upper impact plate 612 includes chute holes 619 defined therethrough, and can also include a central region 850, such as to correspond to the design of an enhanced masonry block 28 to be produced. The upper impact plate 612 can further include one or more upper features 852, such as to prevent buildup of product formula 170, and to promote delivery of the predetermined weight of product formula 170. The illustrative dynamic block press 24 seen in FIG. 25 also includes a lower chute region 854, which can be configured to divert the product formula 170 into the dynamically formed block mold 860.

Figure 26:
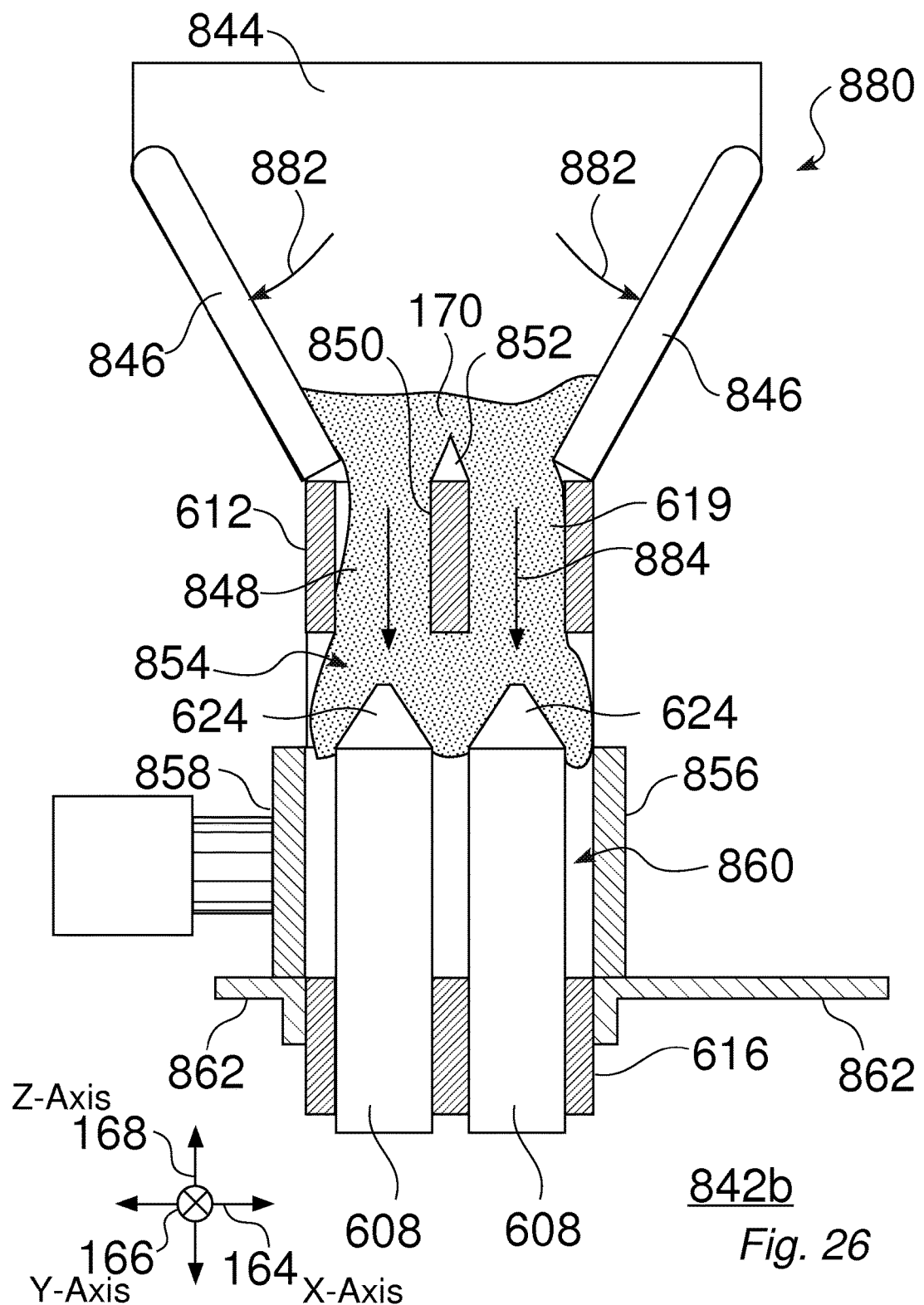
FIG. 26 shows a controlled delivery of a predetermined weight of product formula downward into a dynamically formed block mold of a dynamic block press.

FIG. 26 is a partial cutaway view 880 of an illustrative dynamic block press 24 in a filling position 842*b*, wherein the dynamically formed block mold 860 is filled with a predetermined weight of product formula 170. For example, when a dispensing mechanism 846 is opened 882, the product formula 170 falls downward 884, through the chute holes 619 of the upper impact plate 612, through the lower chute region 854, and into the dynamically formed block mold 860. The upper portions 624 of the mold cores 608 can be configured divert the product formula 170 as it is loaded downward through the lower chute region 854 and into the dynamically formed block mold 860. As well, the upper tapered portions 624 of the mold cores 608 can be configured to reduce or eliminate settling of the product formula 170 on the top of the mold cores 608, reduce or eliminate fouling between the mold cores 608 and corresponding chute holes 619 in the upper impact plate 612, and/or maximize delivery of the product formula 170 into the dynamically formed block mold 860.

In some embodiments of the chute hopper 844, the dispensing mechanism 846 is configured to opened 882 when the pre-determined weight of the product formula 170 is sensed, wherein the load of product formula 170 falls downward 884 through the chute holes 619 and lower chute 854 into the positioned mold 860, such as through the chute holes 619 that act as delivery tubes, and can be diverted by the pyramid elements 624. The drop 884 can provide some level of the consolidation for the product formula 170 within the dynamically formed mold 860, such as for a dynamic block press 24 having a drop distance of about 2 to 3 feet.

Figure 27:
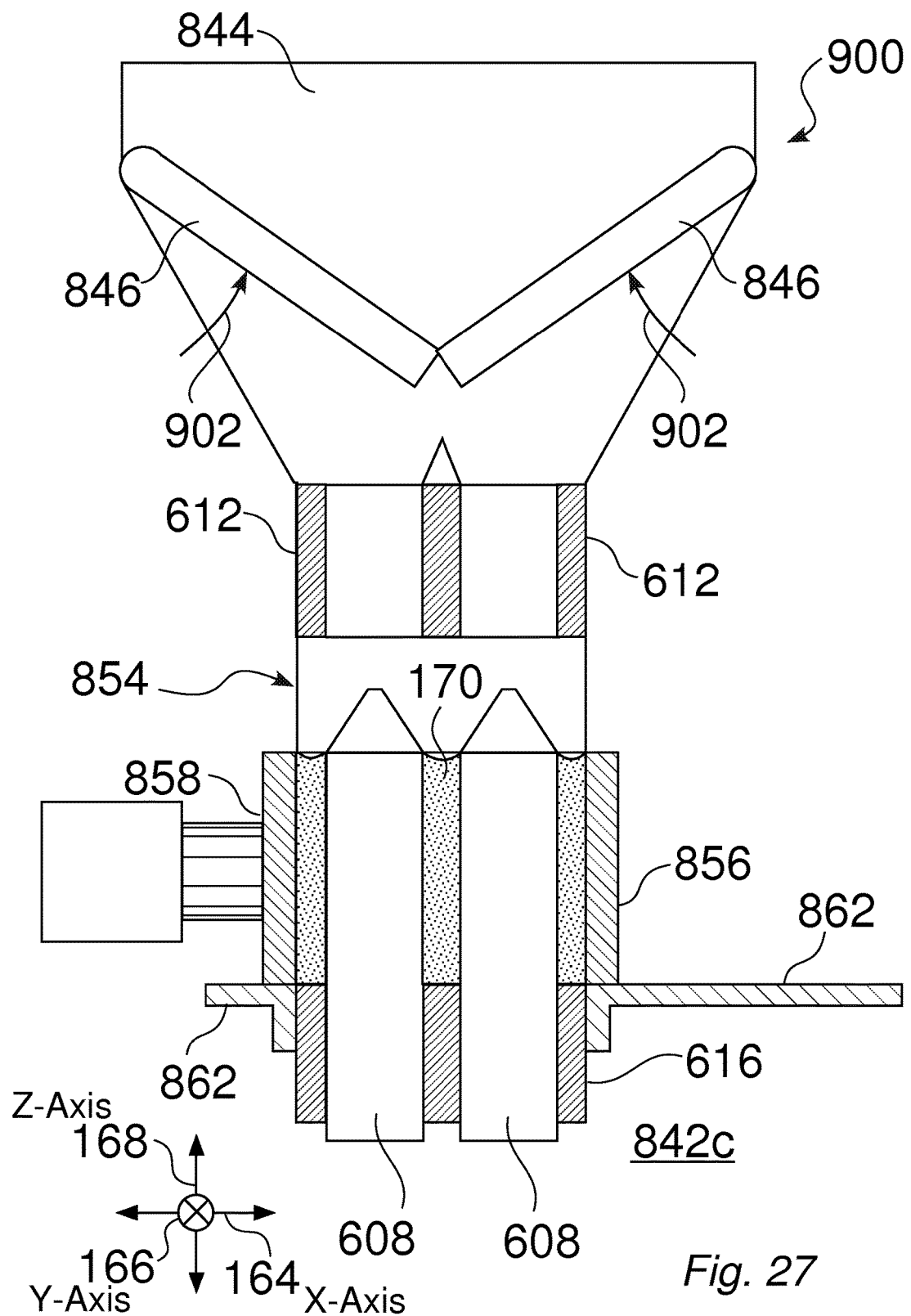
FIG. 27 shows a illustrative dynamically formed block mold in a filled state, while the charge hopper closes and fills again with a subsequent load of product formula.

FIG. 27 is a partial cutaway view 900 of an illustrative dynamic block press 24 in a filled state 842*c*, wherein the predetermined amount of product formula 170 has been delivered into the dynamically formed block mold 860, and is ready for subsequent processing. The illustrative dispensing mechanism 846 seen in FIG. 27 is closed 902, and is ready to receive another load of product formula 170 for subsequent production.

Figure 28:
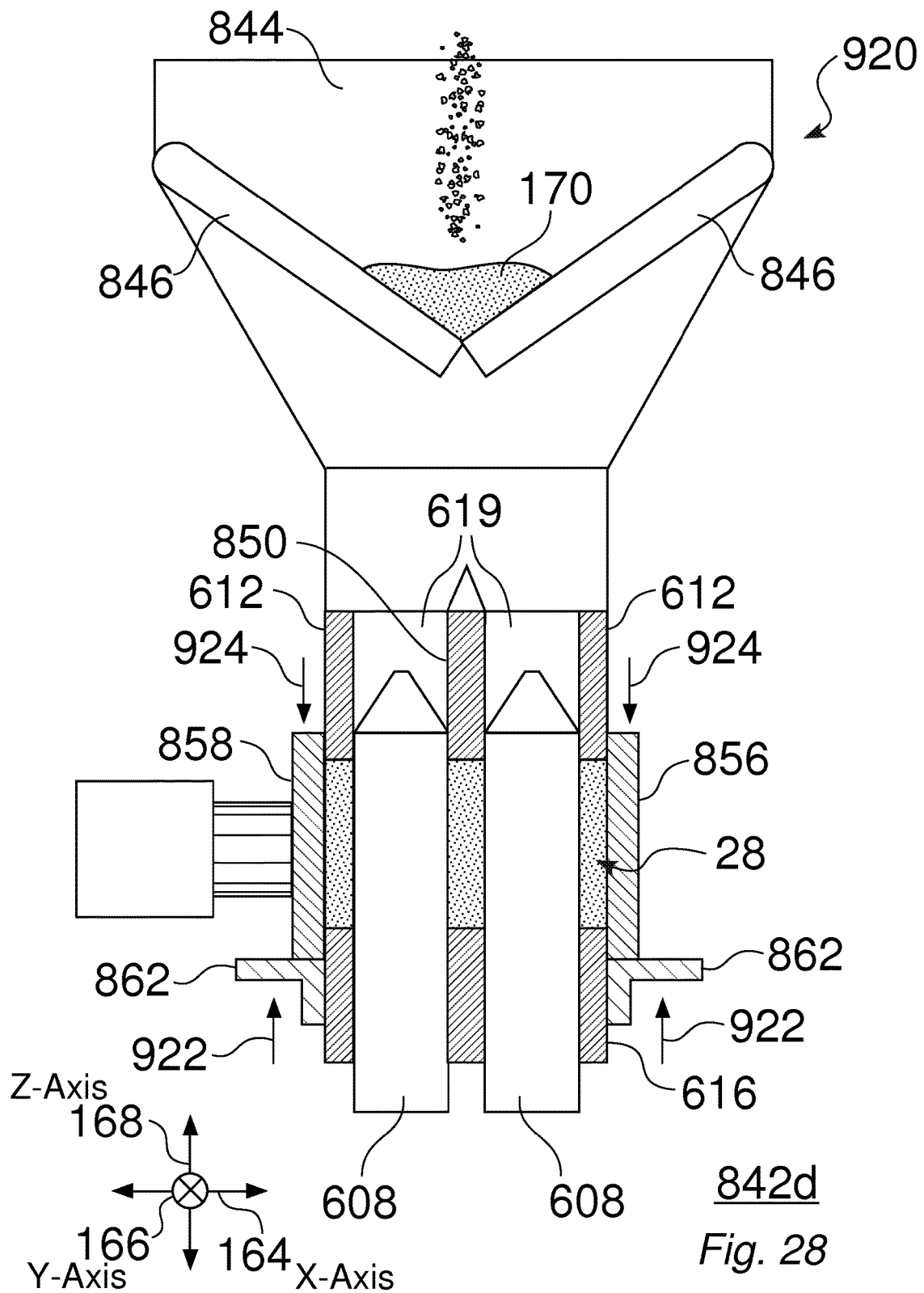
FIG. 28 is an partial cutaway view of an illustrative block press during a compression operation, wherein a predetermined amount of product formula is compressed within a dynamic formed block mold to form a masonry block.

FIG. 28 is a partial cutaway view of an illustrative dynamic block press 24 during a compression operation 842*d*, wherein the predetermined amount of product formula 170 within the dynamically formed block mold 860 is compressed, e.g. 922 and/or 922. For example, the illustrative lower impact plate 616 seen in FIG. 28 can move vertically upward 922, and/or the illustrative upper impact plate 612 can move vertically downward 924. In contrast to conventional concrete and cement mixtures, which are incompressible, the product formula 170 can readily be configured to be compressible, and the resultant qualities of the enhanced blocks 28 can be enhanced by the compression operation 842*d*. Furthermore, the resultant qualities of enhanced blocks 28, such as compressive strength 1202 (FIG. 49, FIG. 50) that are manufactured with the product formula 170 as processed 74 are improved over that of a similar pre-moistened formula 130 that has not been processed 74.

As also seen in FIG. 28, the charge hopper 844 can be filled with product formula 170 during the compression operation 842*d*, such as received 22 from the high-shear mixer 18.

Figure 29:
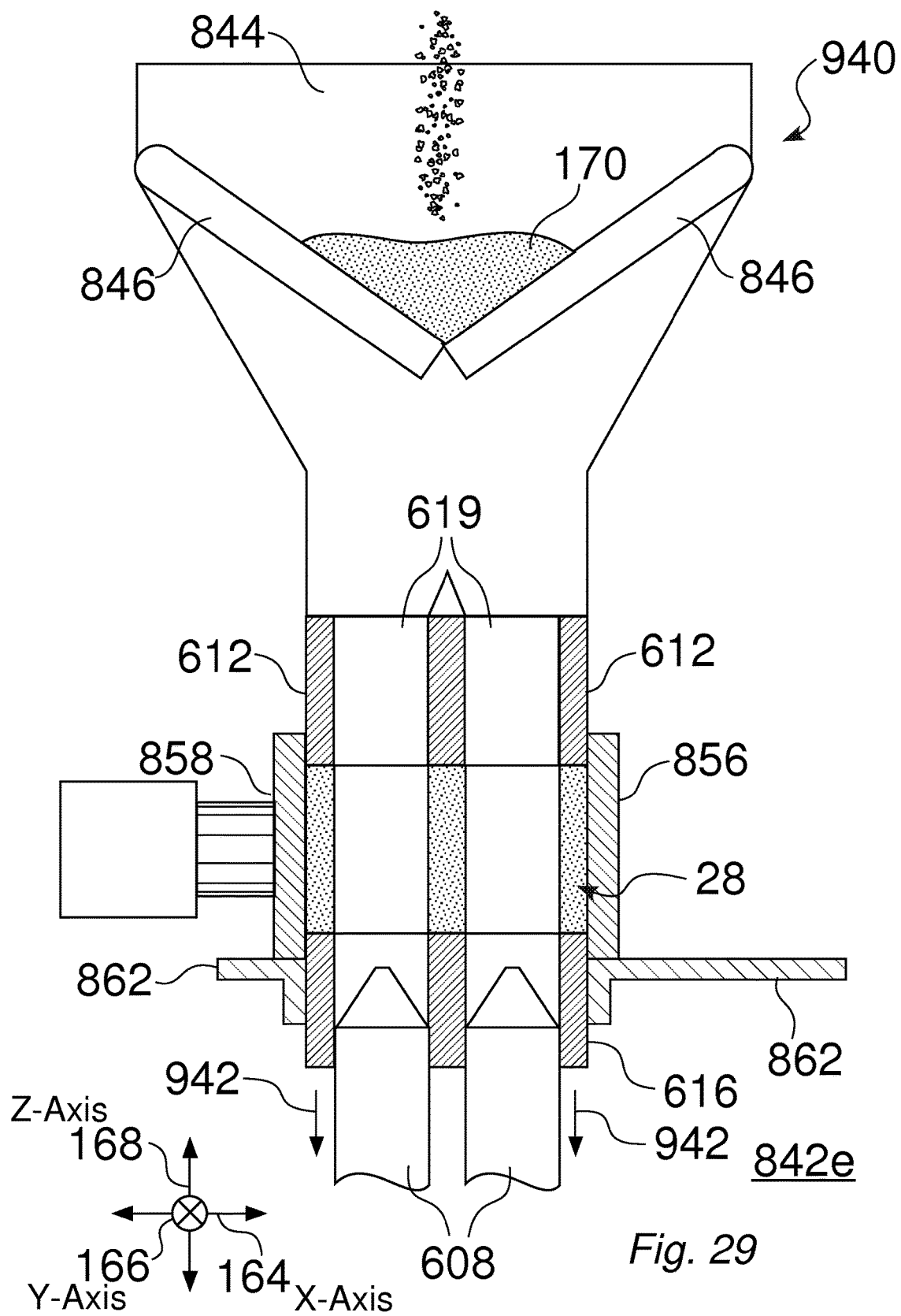
FIG. 29 is a partial cutaway view of an illustrative dynamic block press during a core retraction operation.

FIG. 29 is a partial cutaway view 940 of an illustrative dynamic block press 24 during a core retraction operation 842*e*, wherein the mold cores 608 are moved vertically downward 942, revealing the formed block cores 620. In the illustrative operation 842*e* seen in FIG. 29, the mold cores 608 are the first elements of the dynamically formed block mold 860 to be retracted 942, whereby the compressed product formula 170 is uncompressed as the mold cores 608 are moved downward 942. While the dynamic block press 24 can be configured to release any portion of the impact plates 612,616, side plates 702*a*,702*b*, end plates 856,858, or mold cores 608 (if used) as desired, the initial release 942 of the mold cores 608 for the illustrative masonry block 28 seen in FIG. 29 can be beneficial, such as to allow slight expansion of the product formula 170 into the block core region 620, while retaining dimensional qualities of the exterior of the block 28. As also seen in FIG. 29, the charge hopper 844 can continue to be filled with product formula 170 during a core retraction operation 842*e*.

Figure 30:
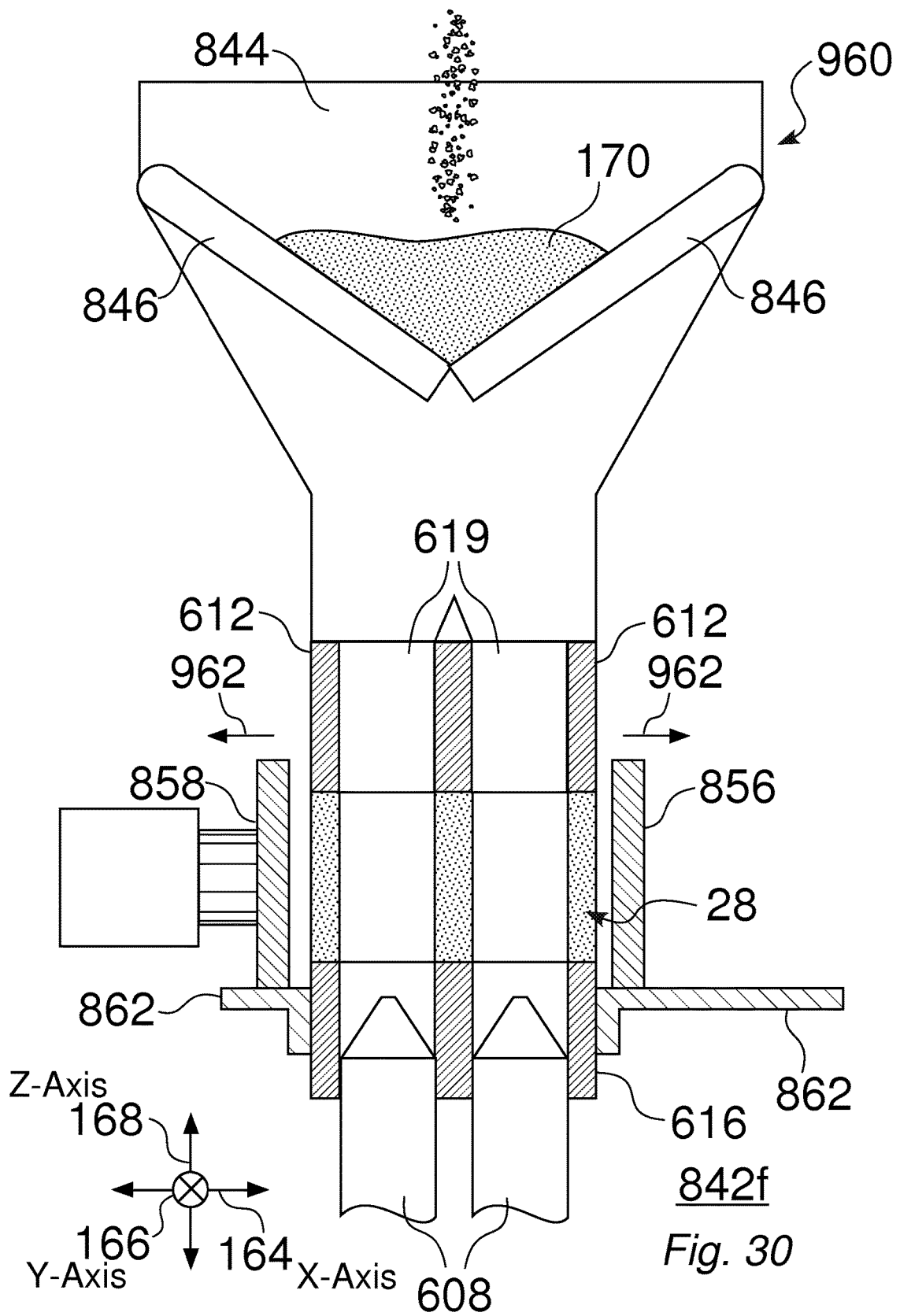
FIG. 30 is a partial cutaway view of an illustrative dynamic block press during a side plate retraction operation.

FIG. 30 is a partial cutaway view 960 of an illustrative dynamic block press 24 during a plate retraction operation 842*f*, wherein the front plate 856 and/or the rear plate 858 can be retracted horizontally 962 away from the formed block 28, such as with respect to the X-axis 164. Similarly, one or both of the side plates 702*a*, 702*b* can be retracted horizontally 962 away from the formed block 28, such as with respect to the Y-axis 168. As further seen in FIG. 30, the formed masonry block 28 is supported by the lower impact plate 616, and the charge hopper 844 can continue to be filled if necessary with more product formula 170.

Figure 31:
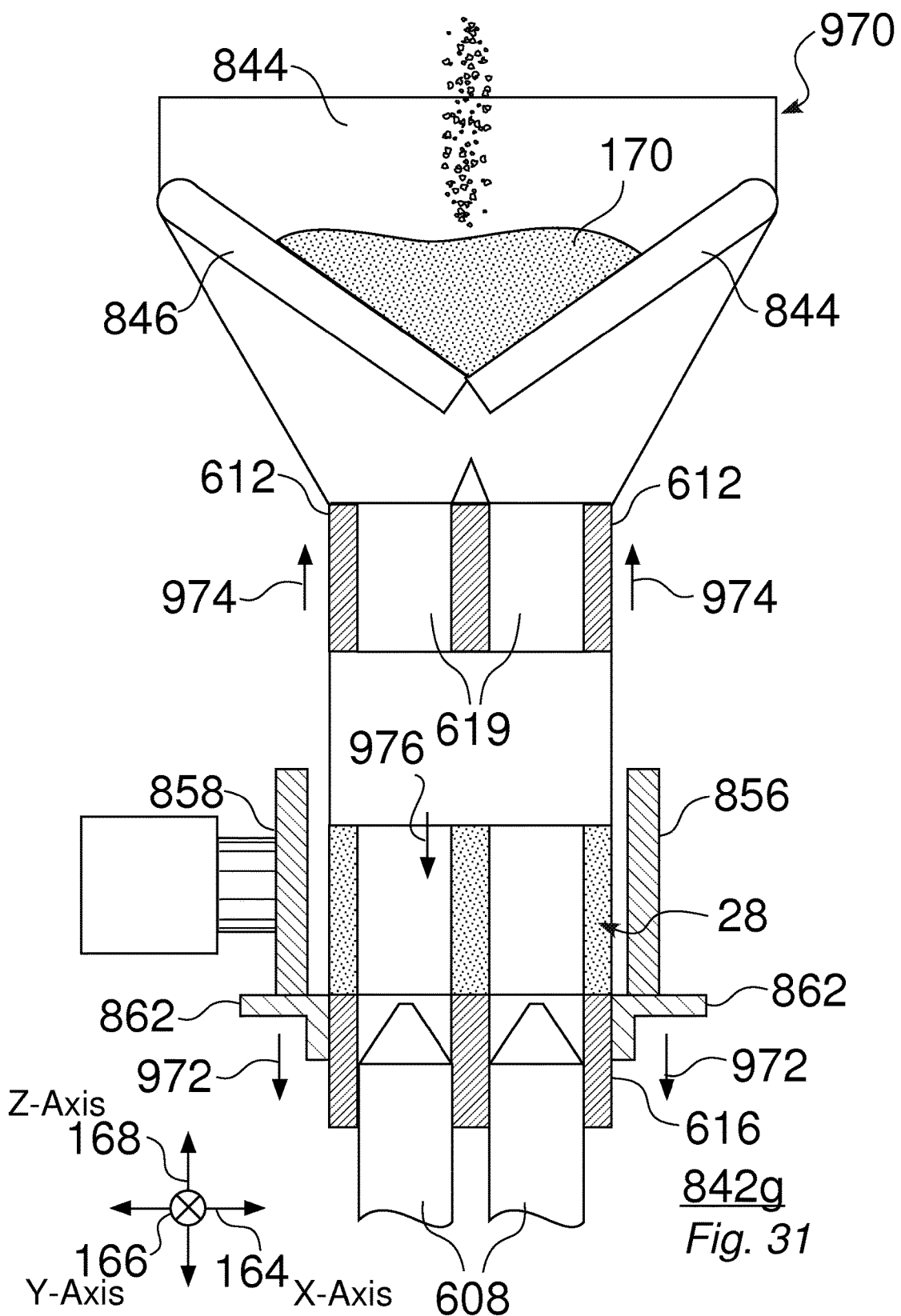
FIG. 31 is a partial cutaway view of an illustrative dynamic block press during an impact plate retraction operation.

FIG. 31 is a partial cutaway view 970 of an illustrative dynamic block press 24 during an impact plate retraction operation 842*g*, wherein the upper impact plate 612 is retracted vertically upward 974 away from the formed block 28, such as with respect to the Z-axis 168. The lower impact plate 616 seen in FIG. 31 can move vertically downward 972, wherein the upper surface 1082*b* (FIG. 37) of the lower impact plate 616 can positioned to be coplanar with a surrounding surface 862 of the production corridor 510. As also seen in FIG. 31, the formed block 28, which rests on the lower impact plate 616, also moves downward on the lower impact plate 616, wherein the lowered masonry block 28, which is supported by the lower impact plate 616, can subsequently be moved horizontally 982 (FIG. 32), such as manually or by a block removal mechanism 984, out of the production corridor 510. As further seen in FIG. 31, the charge hopper 844 can continue to be filled with more product formula 170, for production 76 (FIG. 3) of a subsequent masonry block 28.

Figure 32:
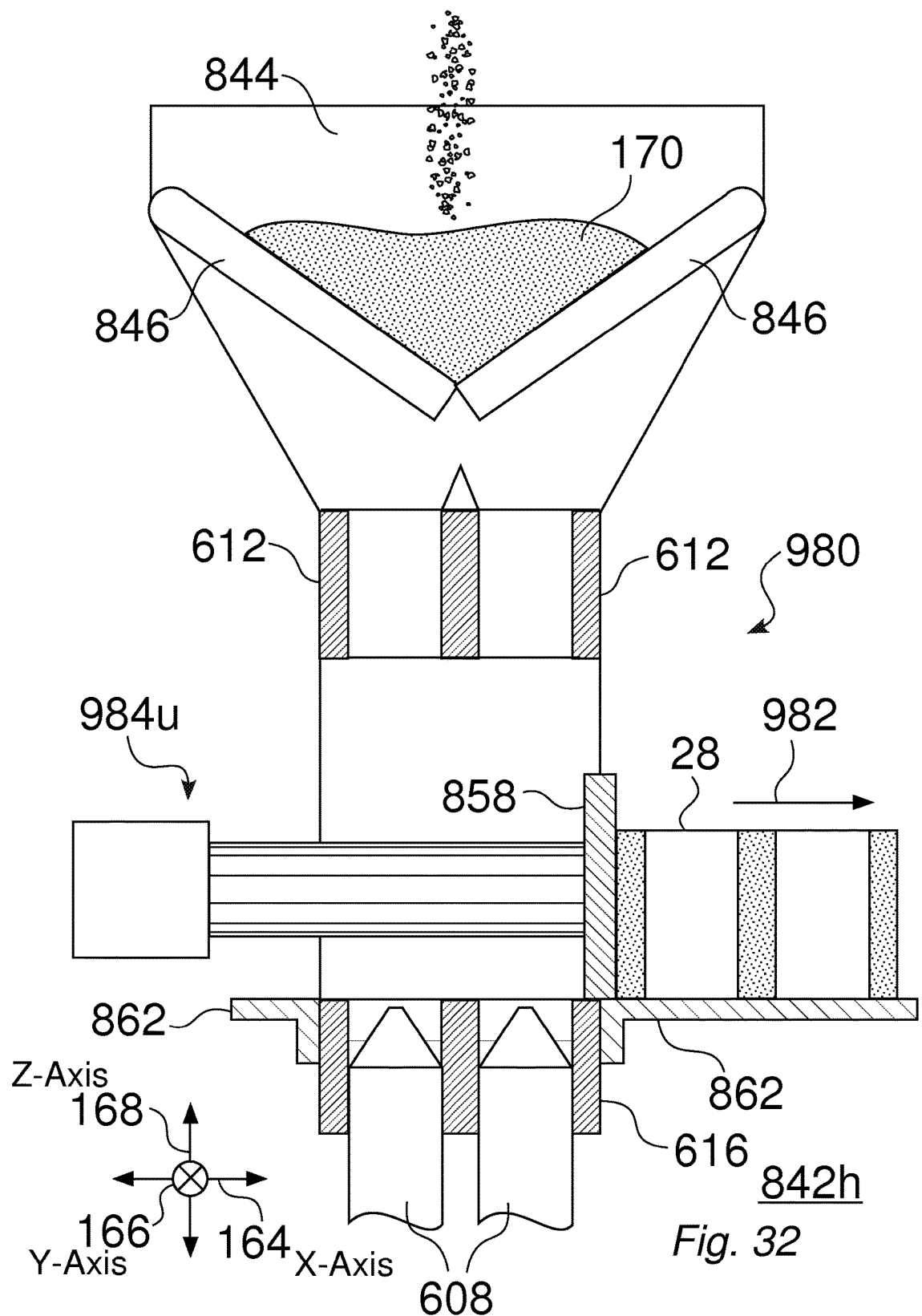
FIG. 32 is a partial cutaway view of an illustrative dynamic block press during a block removal operation.

FIG. 32 is a partial cutaway view 980 of an illustrative dynamic block press 24 during a block removal operation 842*h*, wherein the formed masonry block 28 is moved out of the production corridor 510 of the dynamic block press 24, such as with respect to the X-axis 164. In some embodiments, the front impact plate 856 can be moved away from the production corridor 510, such as by the front plate actuator 602*b* (FIG. 20), to allow access for manual or automated 944 removal 942 of the masonry block 28. As seen in FIG. 32, the charge hopper 844 can continue to be filled with more product formula 170, such as until such time that the pre-determined weight of product formula 170 is reached, for production 76 (FIG. 3) of a subsequent masonry block 28.

Figure 33:
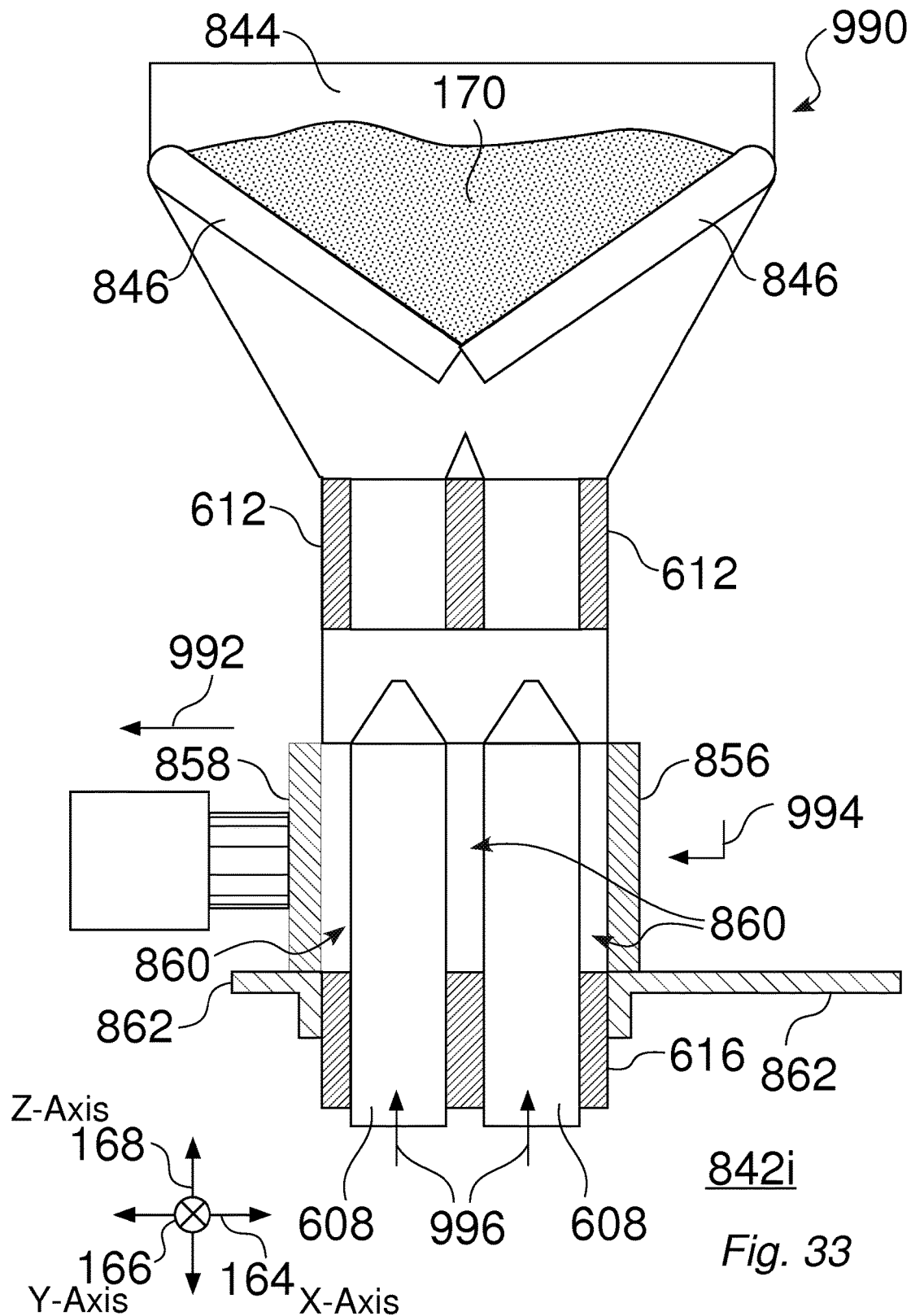
FIG. 33 is a partial cutaway view of an illustrative dynamic block press during return operation.

FIG. 33 is a partial cutaway view 990 of an illustrative dynamic block press 24 during a return operation 842*i* wherein, upon removal 982 of a previously formed masonry block 28, the plates 856, 858, 702*a*,702*a*, and the cores 608, can be moved 822 (FIG. 24) (e.g., plate 858 movement 992, plate 856 movement 994, and core 608 movement 996), to reform 804 (FIG. 24) the dynamically formed block mold 860, thus returning the dynamic block press 24 to a home position 842*a* (FIG. 25), where the dynamic block press 24 is ready to receive 808 (FIG. 24) the next pre-determined weight of product formula 170 from the charge hopper 844, to repeat the process 800 (FIG. 24).

Figure 34:
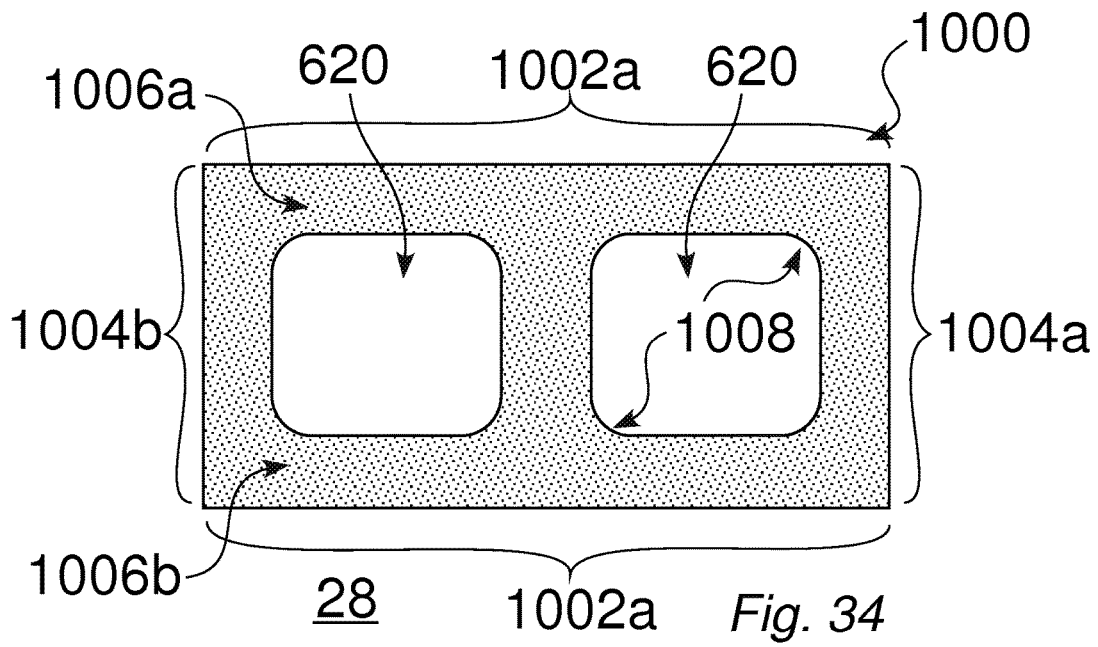
FIG. 34 is a top view of an illustrative enhanced masonry block.

FIG. 34 is a top view 1000 of an illustrative enhanced masonry block 28. FIG. 35 is a partial side cutaway view 1040 of an illustrative enhanced masonry block 28. While the illustrative dynamic block press 24 is disclosed herein with respect to the production of a rectangular enhanced masonry block 28 having two cores 620, it should be understood that the dynamic block press 24 can readily be adapted to produce a wide variety of enhanced masonry products 28, such as with or without cores 620, cores 620 having alternate shapes, and/or masonry blocks 28 having any of mortar grooves, scored or concave flutes, textured, patterned, embossed, or split-face details, breaker details, or any combination thereof. As well, the dynamic block press 24 can readily be adapted to produce enhanced masonry products 28 having one or more non-planar exterior surfaces.

The illustrative enhanced masonry block 28 seen in FIG. 34 and FIG. 35 is generally rectangular, with opposing sides 1002a and 1002b, and opposing ends 1004a and 1004b, which extend vertically from a bottom surface 614 to a top surface 618. The illustrative cores 620 seen in FIG. 34 and FIG. 35 are defined vertically through the formed masonry block 28, extending vertically from the bottom surface 614 to the top surface 618, and can include radii 1008 or other internal features. The illustrative enhanced masonry block 28 seen in FIG. 34 and FIG. 35 includes side sections 1006a and 1006b, respective front and rear lateral sections 1042a and 104b, and a central lateral section 1044 that extends between the side sections 1006a and 1006b, between the cores 620.

While the specific size and shape of the enhanced masonry block 28 can be configured to be identical to that of other blocks, e.g. concrete masonry units (CMUs), the enhanced masonry block 28 can readily be configured in a wide variety of shapes and sizes as desired, such as based on different applications, desired performance, architectural needs, or any combination thereof.

FIG. 36 is a top view 1060 of an illustrative block mold 860 that is dynamically formed within a dynamic block press 24. FIG. 37 is a partial side cutaway view 1080 of an illustrative block mold 860 that is dynamically formed within a dynamic block press 24. While the illustrative block mold 860 seen in FIG. 36 and FIG. 37 can be configured to form the enhanced masonry block 28 seen in FIG. 34 and FIG. 35, it should be understood that the dynamic block press 24 can be configured to produce a wide variety of enhanced masonry blocks 28, and is not limited to the illustrative embodiment shown.

In the illustrative dynamic mold seen in FIG. 36 and FIG. 37, the core holes 619 defined through the upper impact plate 612 and the core holes 1084 defined the lower impact plate 616 correspond to the profile of the cores 608, which correspondingly define the bottom surface 614 and the upper surface 618 of the enhanced masonry block 18.

As seen in FIG. 36 and FIG. 37, the dynamically formed block mold 860 extends vertically from the upper surface 1082b of the lower plate 616, to the lower surface 1086a of the upper impact plate 612.

Figure 38:
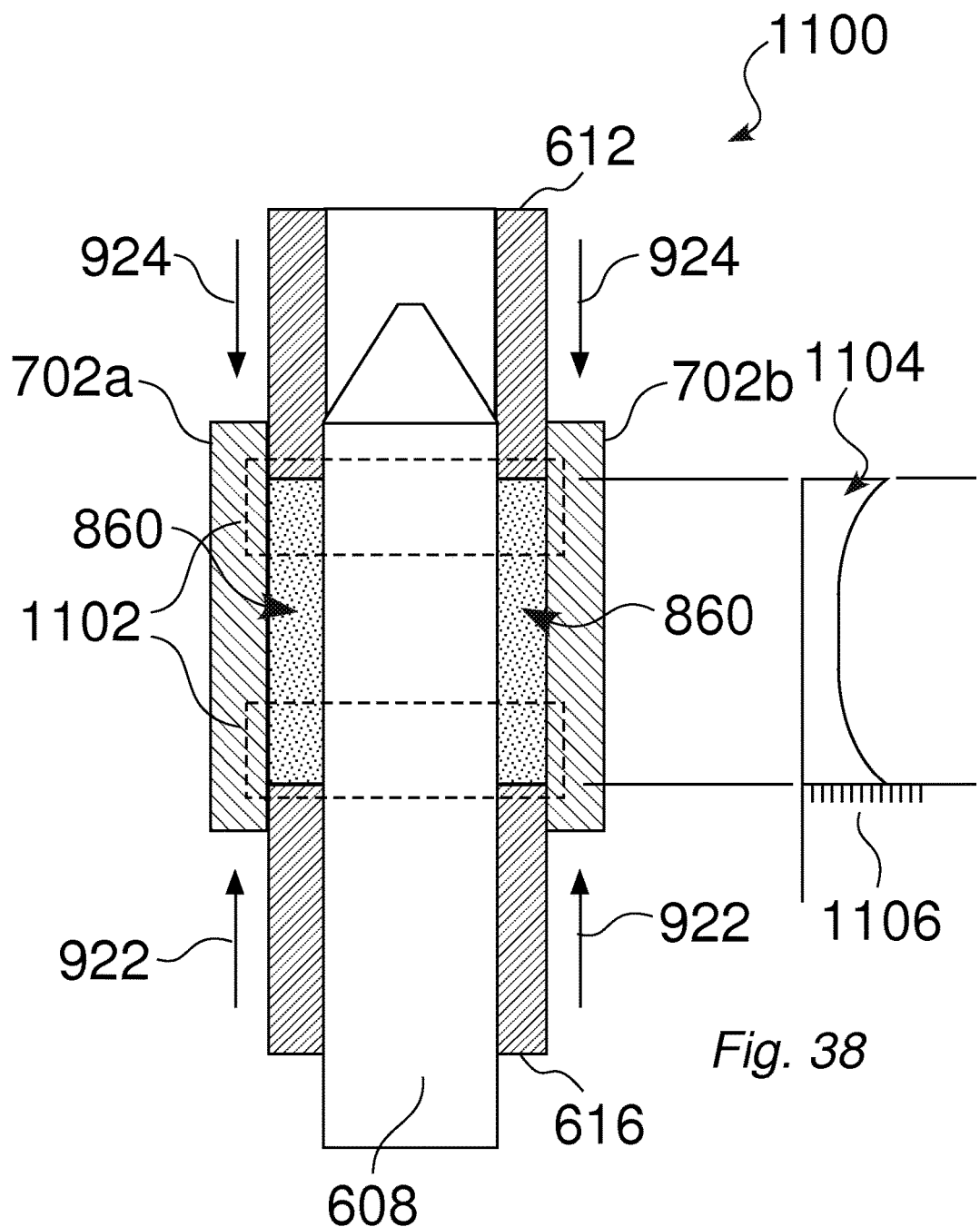
FIG. 38 shows vertical compression to improve qualities of an illustrative masonry block.

FIG. 38 is a partial schematic view 1100 that shows illustrative vertical compression to improve the quality and/or performance of an enhanced masonry block 28. For example, as seen in FIG. 28 and FIG. 38, the dynamic block press 24 can be configured to create local compression zones 1102 in the product formula 170 within the dynamically formed block mold 860, through vertical upward movement 922 of the lower impact plate 616, and/or vertical downward movement 924 of the upper impact plate 612. While the entire product formula 170 with the formed block 28 can be compressed 1106, as seen in the corresponding chart 1104 that shows relative compression across the height 1046 (FIG. 35) of the formed masonry block 18, the local compression zones 1102 can be subjected to a greater localized compression, which can be configured to create greater localized compressive strength, resistance to damage, quality for the edges, and/or longevity for the enhanced masonry block 28, such as before and/or after curing 86, and during any of storage, transport, installation, and/or use.

Figure 39:
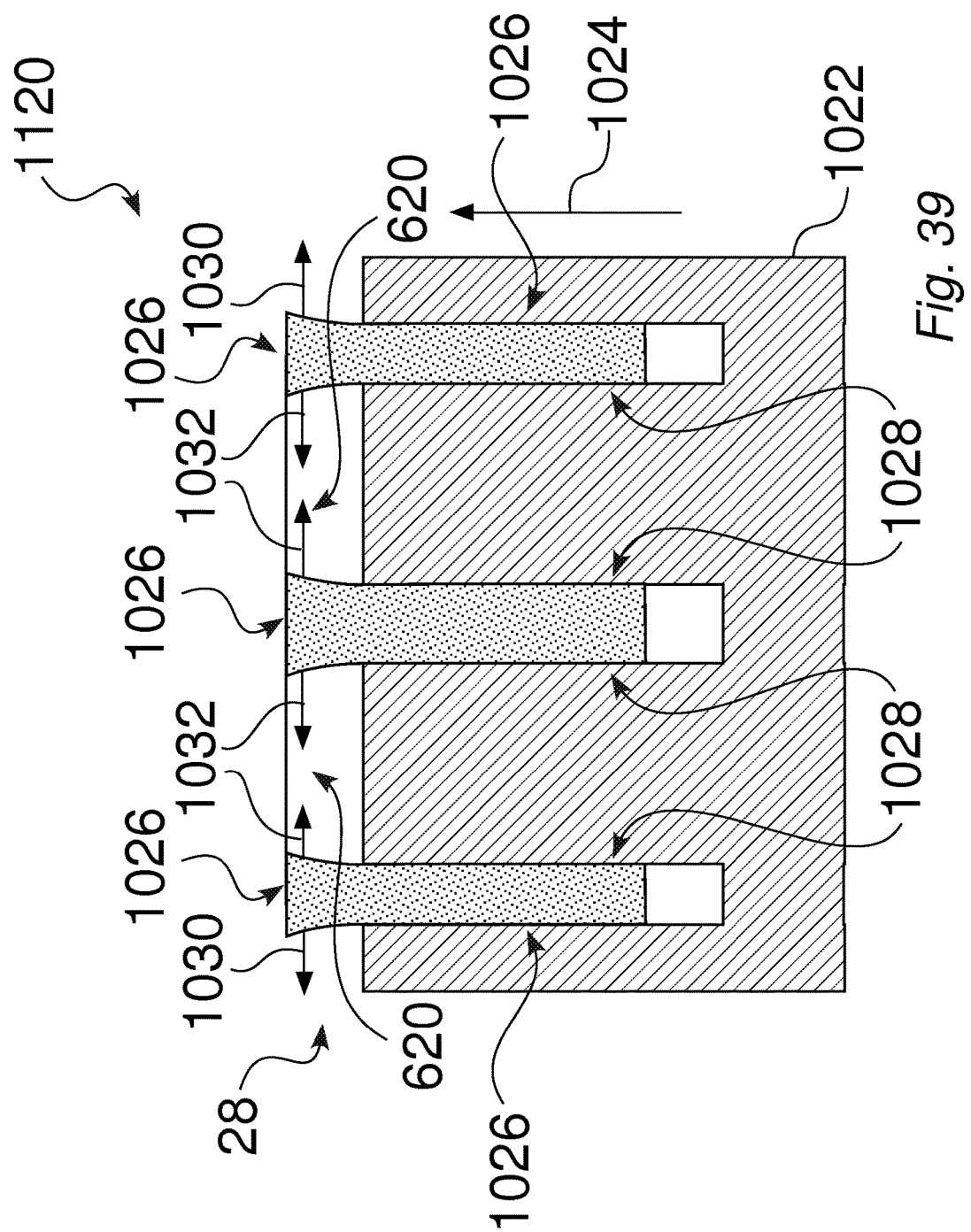
FIG. 39 illustrates potential problems that can be associated with improper release of internal stress in a compressed masonry block.

FIG. 39 is a schematic view 1120 that illustrates potential problems associated with improper release of internal stress in a formed masonry block 28. As discussed above, the enhanced masonry blocks 28 can be formed within a dynamic block press 24, and can be manufactured from a unique product formula 170 that has a lower moisture content than conventional concrete blocks, which can be compressed 80 (FIG. 3) during manufacture. The order in which such pressure is released from a compressed masonry block 28, such as with a dynamic block press 24, can affect the resultant masonry block 28. For example, as schematically shown in FIG. 39, a formed masonry block 28, which is separated vertically 1024 from a mold 1022 having vertical exterior mold sides 1026 and interior mold sides 1028, can result in localized outward expansion 1030, such as locally increasing the exterior dimension of the masonry block 28, and/or inward expansion 1032, toward cores 620, such as locally decreasing the interior dimension of the cores 610 of the block.

When first loaded or compressed, e.g. 922, 924 (FIG. 38), a masonry block can be considered to be a "green" state, wherein the product formula 170 can be susceptible to breakage. The product formula 170 can also be elastic, such as based on its clay content, wherein the higher percentage of clay used, the more elasticity the product formula 170 has. As pressure is released from the illustrative mold 1022 seen in FIG. 39, the compressed product formula 170, which is often still elastic, can expand as shown, and if not properly released, can deform, which can result in angled sides and/or breakage.

Figure 40:
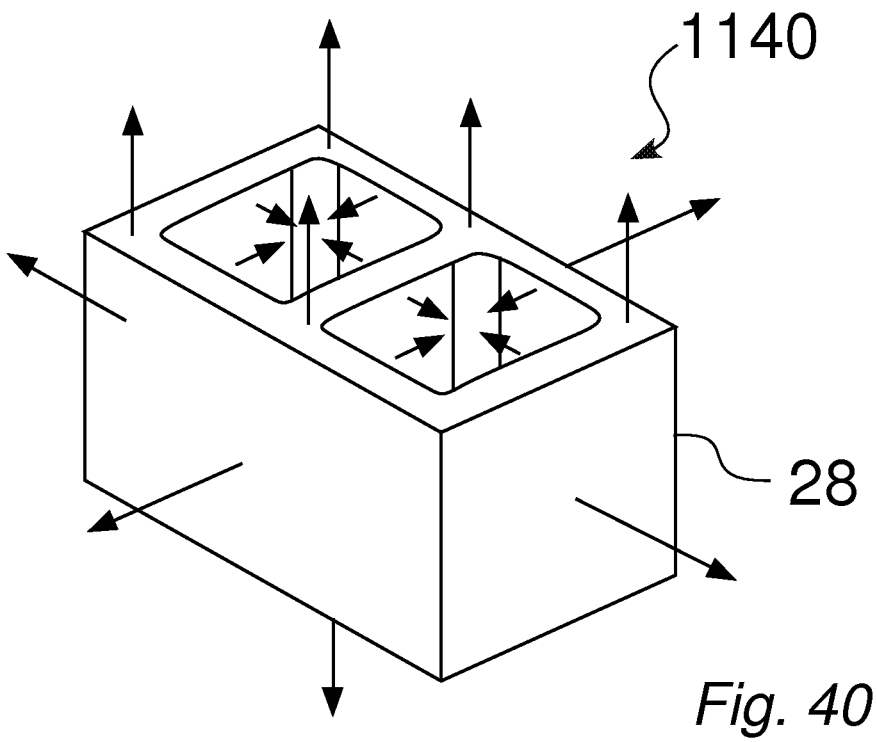
FIG. 40 shows an illustrative release along one or more dimensions to improve the quality of a compressed masonry block.

The dimensional tolerances of a masonry block product 28 can be important, such as to comply with required product dimensions and tolerances, e.g. ASTM dimensional stacking tolerances. Therefore, the configuration of the dynamic block press 24, and the order of operations, can be important to produce enhanced masonry blocks 28 having desired characteristics. For example, FIG. 40 shows a controlled release 1140 on one or more dimensions, to improve quality of an enhanced masonry product 28. In some embodiments, the dynamic block press 24 can be configured to simultaneously release the internal pressure of a compressed masonry block 28 across all dimensions.

Figure 41:
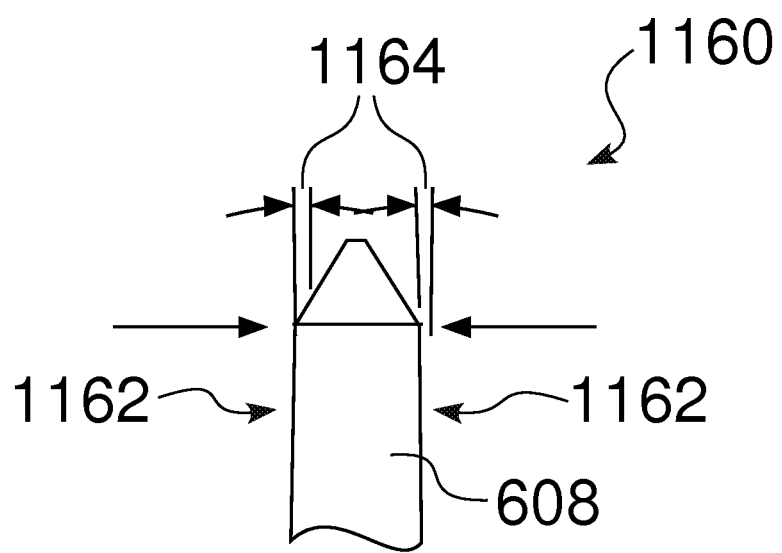
FIG. 41 is a partial detail view of an illustrative block core that includes tapered sides.

FIG. 41 is a partial cutaway view 1160 showing an illustrative core mold 608 that includes sides 1162 that are tapered 1164. As discussed above with respect to FIG. 40, the order and direction of the release of pressure from a compressibly formed enhanced masonry block 28 can affect the resultant quality. The tapered core 608 seen in FIG. 41 can moved vertically downward 942 (FIG. 29) from the dynamically formed block mold 860 to significantly reduce or eliminate sliding movement between the block cores 608 and a corresponding block core 610 when the block cores are retracted 942 from the production corridor 510, such as seen in FIG. 29, before release of the sides and/or impact plates 612, 616. When the tapered mold cores 608 are moved vertically downward 942 before the other components of the dynamic mold core 106, the pressure of the formed masonry block 28 can simultaneously be released across the entire height 1046 of the masonry block 28, such as to provide consistent and minimal expansion into the block core region 620, which can retain desired qualities of the masonry block 28, such as to reduce imperfections in one or more portions of the enhanced masonry block 28.

FIG. 42 is a partial cutaway view 1200 of a filling operation 808, 842b for an illustrative embodiment of a dynamic block press 24 that includes one or more block cores 608a that are configured to provide compression of a product formula 170 while dynamically forming a dynamic block mold 860. In the illustrative dynamic block press 24 seen in FIG. 42, a tapered core 608a is shown at a lower home position 1202 when product formula 170, such as including a predetermined weight of product formula 170, is introduced into the dynamic block mold 860. The illustrative dynamic block mold 860 seen in FIG. 42 does not fully define the dynamic block mold 860 during the initial filling process 808.

FIG. 43 is a partial cutaway view 1220 of a compression operation 810, e.g. 810a, wherein a tapered block core 808a is moved 1222 vertically upward, thereby further defining the block mold 860, while moving and compressing 1224 the product formula 170, such as outward and/or upward, such as to improve the quality and/or performance of an enhanced masonry block 28. For example, the illustrative compression 1224 can be configured to create local compression zones extending outward from the block core 608a, such as to increase the overall compression of the product formula 170. As further seen in FIG. 43, some embodiments of the dynamic block press 24 can be configured to apply one or more forces 1224 through the block core 608, e.g. 608a, such as any of a compressive force, a linear impact force, a directional force, an oscillatory force, a vibrational force, or any combination thereof. In some embodiments of the dynamic block press 24, the applied force 1224 can be configured for promoting compression, reducing voids, improving compressive strength, improving surface qualities, or any combination thereof of the formed masonry block or unit 28.

FIG. 44 is a partial cutaway view 1240 of an operational state for an illustrative dynamic block press 24, wherein a tapered block core 808a is moved 1242 further vertically upward to fully define the dynamic block mold 860, such as at an upper limit of travel 1244 for the a tapered block core 806a.

FIG. 45 is a partial cutaway view 1260 that shows illustrative vertical compression to improve the quality and/or performance of an enhanced masonry block 28. For example, as seen in FIG. 45, the dynamic block press 24 can be configured to create local compression zones 1102 in the product formula 170 within the dynamically formed block mold 860, through vertical upward movement 922 of the lower impact plate 616, and/or vertical downward movement 924 of the upper impact plate 612. The local compression zones 1102 can be subjected to a greater localized compression, which can be configured to create greater localized compressive strength, resistance to damage, quality for the edges, and/or longevity for the enhanced masonry block 28, such as before and/or after curing 86, and during any of storage, transport, installation, and/or use.

Figures 46, 47:
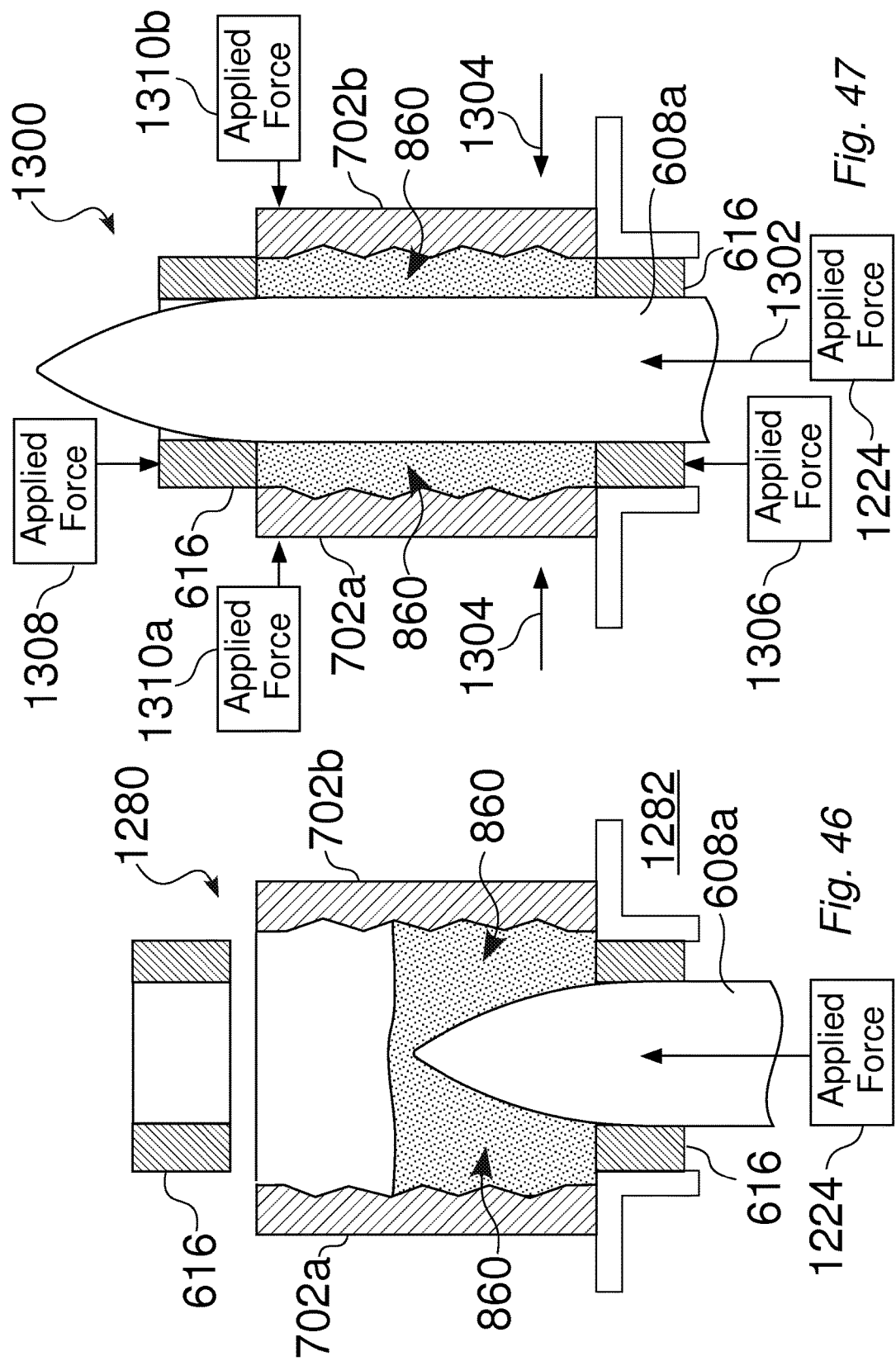
FIG. 46 is a first partial cutaway view of an illustrative dynamic block press that can be configured to provide lateral compression of a product formula within a dynamic block mold.
FIG. 47 is a second partial cutaway view of an illustrative dynamic block press that can be configured to provide lateral compression of a product formula within a dynamic block mold.

FIG. 46 and FIG. 47 provide respective partial cutaway views 1280 and 1300 of an illustrative dynamic block press 24, which can be configured to include one or more side plates 702a,702b, endplates 856,858, or any combination thereof. The illustrative dynamic block press 24 seen in FIG. 46 and FIG. 47 can include patterning, such as to define an enhanced masonry block 28 having a patterned exterior. The illustrative dynamic block press 24 seen in FIG. 46 can be configured to initially position one or more side plates 702a,702b and/or endplates 856,858 in a laterally outer position 1282, wherein subsequent inward lateral movement 1302 (FIG. 47) can serve to further dynamically form the block mold 860, and/or provide inward compression 1302 of the product formula 170. The dynamic block press 24 can be configured to provide inward compression 1304 before or after other compression operations, e.g. 1304 or without other compression operations. As further seen in FIG. 47, some embodiments of the dynamic block press 24 can be configured to apply one or more forces, e.g. 1224, 1306, 1308, 1310 (e.g. 1310a, 1310b), such as any of a compressive force, a linear impact force, a directional force, an oscillatory force, a vibrational force, or any combination thereof. In some embodiments of the dynamic block press 24, one or more of the applied forces, e.g. 1224, 1306, 1308, 1310 (e.g. 1310a, 1310b) can be configured for promoting compression, reducing voids, improving compressive strength, improving surface qualities, or any combination thereof of the formed masonry block or unit 28.

Figure 48:
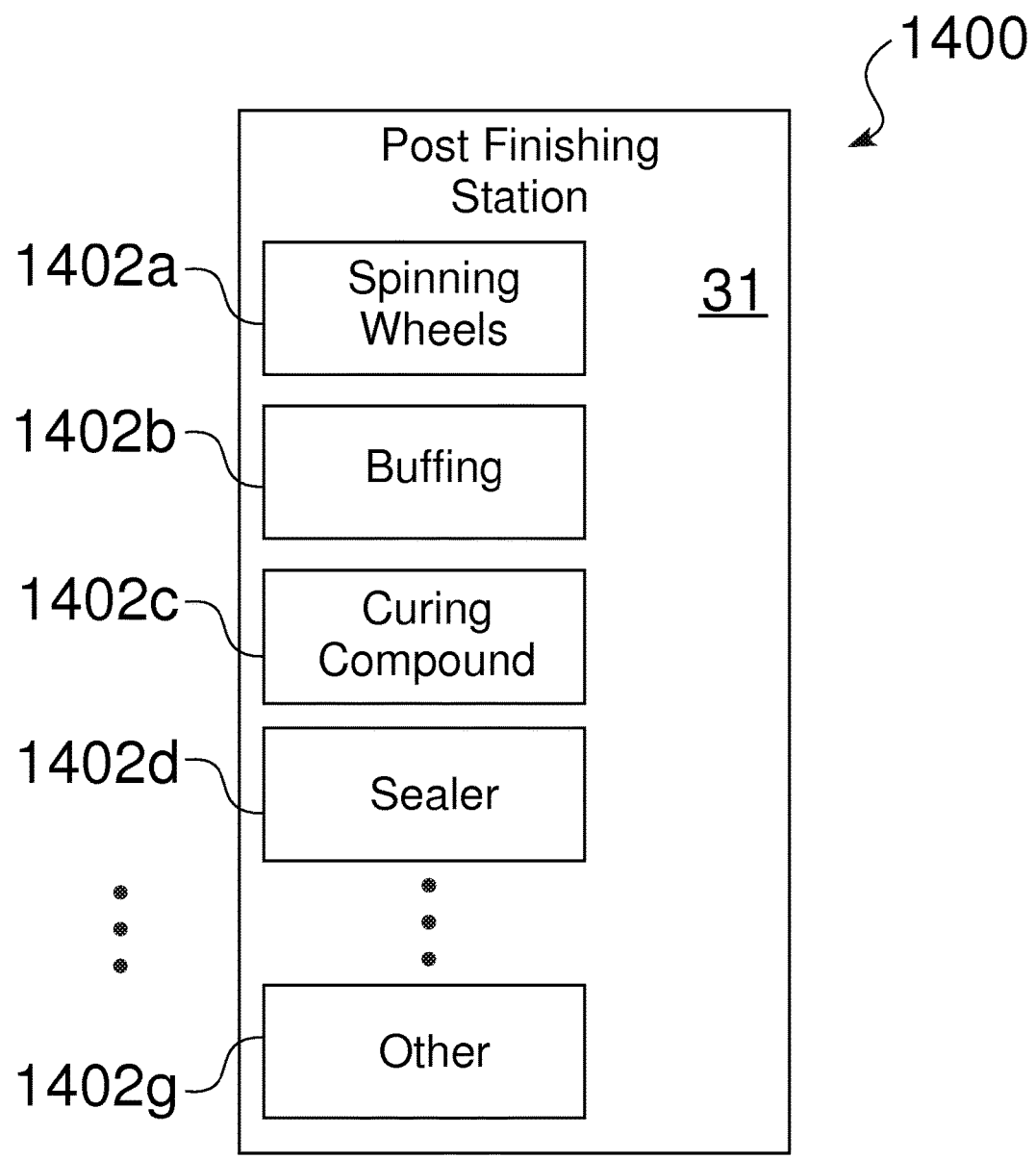
FIG. 48 is a schematic block view of an illustrative post-production finishing station, which can be used in conjunction with the enhanced masonry fabrication system.

FIG. 48 is a schematic block view 1400 of an illustrative post-production finishing station 31, which can be used in conjunction with the enhanced masonry fabrication system 10. For example, the formed masonry blocks 28 can be processed at the post-production finishing station 31 before transfer to a curing area 32. The illustrative post-production finishing station 31 seen in FIG. 47 can include one or more sub-stations and/or operations 1402, e.g. 1402a-1402g, in any order as desired, such as spinning wheels 1402a, buffing 1402b, curing compound application 1402c, sealer application 1402d, and/or other post-production finishing operations 1402g.

Figure 49:
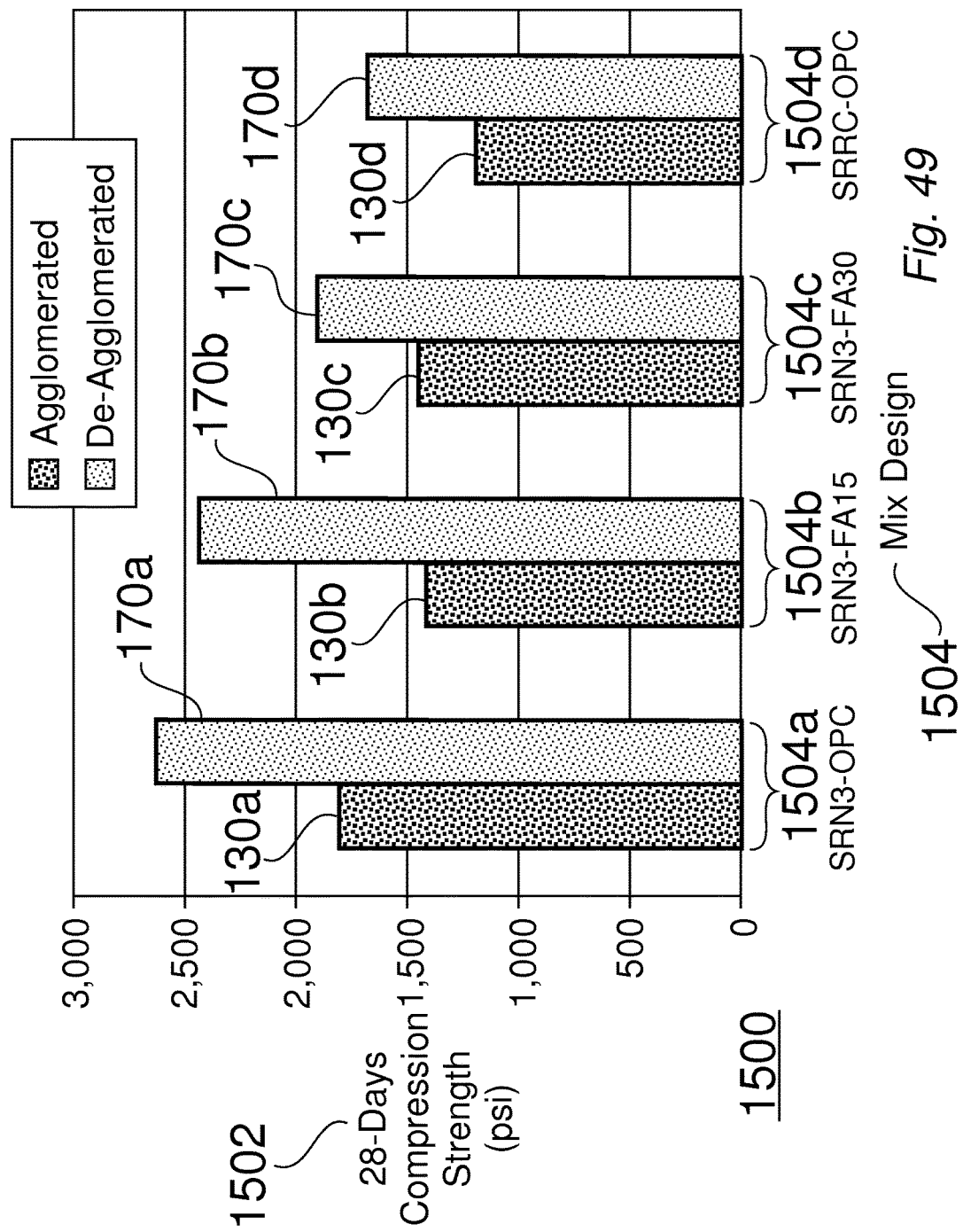
FIG. 49 is a chart showing relative compressive strength, after a 28 day cure time, for enhanced masonry blocks manufactured from different product formulas, with and without processing in a high-shear mixer.

FIG. 49 is a chart 1500 showing relative compressive strength, after a 28 day cure time, for illustrative enhanced masonry blocks 28 manufactured from different enhanced masonry formulas 170, with and without enhanced mixing 74 (FIG. 3).

FIG. 50 is a table 1600 that shows the influence of enhanced mixing and de-agglomeration 74 (FIG. 3) for the relative compressive strength, after a 28 day cure time, of masonry blocks 28 manufactured from different illustrative product formulas.

Figure 51:
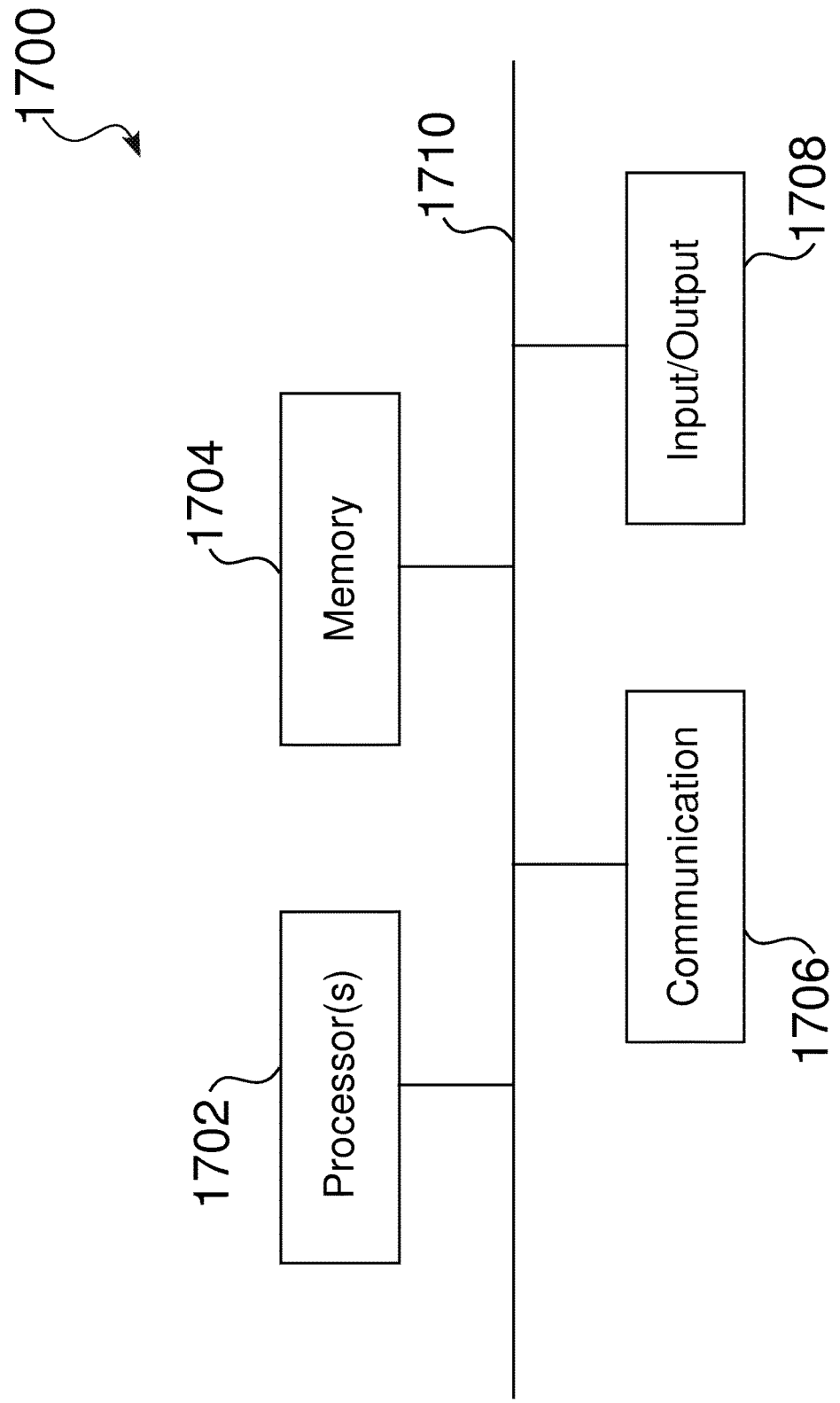
FIG. 51 is a high level block diagram showing an illustrative processing device that can represent any of the systems described herein.

FIG. 51 is a high level block diagram showing an illustrative processing device 1700 that can be a part of any of the systems described above, such as for the pre-mixing controller 14, the high-shear mixer controller 20, the dynamic block press controller 26, or a system controller 34 for manufacturing the enhanced masonry blocks or other products 28. Any of these systems can be or include two or more processing devices such as represented in FIG. 51, which can be coupled to each other via a network or multiple networks.

In the illustrated embodiment, the processing system 1700 includes one or more processors 1702, memory 1704, a communication device 1706, and one or more input/output (I/O) devices 1708, all coupled to each other through an interconnect 1710. The interconnect 1710 may be or include one or more conductive traces, buses, point-to-point connections, controllers, adapters and/or other conventional connection devices. The processor(s) 1702 may be or include, for example, one or more general-purpose programmable microprocessors, microcontrollers, application specific integrated circuits (ASICs), programmable gate arrays, or the like, or a combination of such devices. The processor(s) 1702 control the overall operation of the processing device 1700. Memory 1704 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1704 may store data and instructions that configure the processor(s) 1702 to execute operations in accordance with the techniques described above. The communication device 1706 may be or include, for example, an Ethernet adapter, cable modem, Wi-Fi adapter, cellular transceiver, Bluetooth transceiver, or the like, or a combination thereof. Depending on the specific nature and purpose of the processing device 1700, the I/O devices 1708 can include devices such as a display (which may be a touch screen display), audio speaker, keyboard, mouse or other pointing device, microphone, camera, etc.

The enhanced masonry manufacturing system 10 and associated methods can readily be scaled for a wide variety of work environments. For example, enhanced masonry manufacturing system 10 can include any number of primary mixers 12, enhanced mixers 18, hoppers 844, dynamic block presses 24, post-production finishing stations 31, curing areas 30, or any combination thereof. As well, the dynamic block press 24 can be configured to fabricate one or more enhanced masonry blocks 28. Furthermore, the specific hardware and stations can be used independently. In addition, the specific hardware and stations can readily be moved and transported, such as to provide in situ fabrication of enhanced masonry units, blocks, or other masonry products, wherein locally available materials can be used as constituents within pre-moistened masonry formula 130 and product formula 170.

Unless contrary to physical possibility, it is envisioned that (i) the methods/steps described above may be performed in any sequence and/or in any combination, and that (ii) the components of respective embodiments may be combined in any manner.

The mixing and/or masonry product manufacturing techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g. read-only memory (ROM); random access memory (RAM); magnetic disk storage media; optical storage media; flash memory devices; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for manufacturing a masonry block, comprising:
  receiving a pre-moistened masonry formula through an upper end of a high-shear mixing assembly that extends vertically downward from the upper end to a lower end opposite the upper end, while the high-shear mixing assembly is rotated at a rotation speed equal to or greater than 1,000 revolutions per minute (rpm), wherein the pre-moistened masonry formula has a moisture content of less than or equal to 12 percent;
  de-agglomerating the pre-moistened masonry formula with the high-shear mixing assembly by mixing constituents and breaking down aggregates and agglomerates in the pre-moistened masonry formula, to produce a de-agglomerated product formula as the pre-moistened masonry formula falls downward from the upper end and exits the high-shear mixing assembly through the lower end, wherein the de-agglomerated product formula is subsequently compressible;
  receiving the de-agglomerated product formula at a block press that includes:
    a charge hopper; and
    a plurality of mold elements, wherein the plurality of mold elements include:
      a lower impact plate,
      an upper impact plate, and
      a plurality of side plates;
  wherein the de-agglomerated product formula is received in the charge hopper, and wherein the charge hopper is configured to controllably load a predetermined amount of the product formula;
  moving one or more of the mold elements to dynamically form a block mold for receiving the predetermined amount of the de-agglomerated product formula;
  filling the formed block mold with the predetermined amount of the de-agglomerated product formula;
  compressing the de-agglomerated product formula within the dynamically formed block mold to form a masonry block;
  controllably moving one or more of the mold elements to release internal pressure of the formed masonry block across one or more dimensions; and
  removing the formed masonry block from the released block mold.

2. The method of claim 1, further comprising:
  moving one or more of the mold elements to dynamically reform the block mold for receiving a subsequent predetermined amount of the de-agglomerated product formula.

3. The method of claim 1, wherein the compressing the de-agglomerated product formula includes any of moving the lower impact plate upward with respect to the block mold, or moving the upper impact plate downward with respect to the block mold.

4. The method of claim 1, wherein controllably moving one or more of the mold elements to release the internal pressure on the formed masonry block includes moving at least one of the mold elements horizontally.

5. The method of claim 1, wherein controllably moving one or more of the mold elements to release the internal pressure on the formed masonry block includes moving at least one of the mold elements vertically.

6. The method of claim 1, further comprising:
moving the removed formed masonry block to a curing area.

7. The method of claim 1, wherein the plurality of mold elements includes a mold core for defining a block core through the formed masonry block.

8. The method of claim 7, wherein controllably moving one or more of the mold elements to release the internal pressure of the formed masonry block includes moving the mold core downward.

9. The method of claim 1, wherein the dynamically forming the block mold includes positioning a mold core to define at least a portion of a block core of the block mold.

10. The method of claim 9, further comprising:
moving the mold core upward for any of dynamically defining the block mold, or compressing the de-agglomerated product formula within the block mold.

11. The method of claim 10, further comprising:
applying a force to the de-agglomerated product formula through the mold core.

12. The method of claim 11, wherein the applied force includes any of a compressive force, a linear impact force, a directional force, an oscillatory force, a vibrational force, or any combination thereof.

13. The method of claim 1, further comprising:
applying a force to the de-agglomerated product formula within the formed block mold, wherein the applied force includes any of a compressive force, a linear impact force, a directional force, an oscillatory force, a vibrational force, or any combination thereof.

14. A method for manufacturing a masonry block, comprising:
premixing constituents to produce a pre-moistened compressible masonry formula having a moisture content of less than or equal to 12 percent in a first mixer;
transporting the pre-moistened compressible masonry formula from the first mixer to a second mixer, the second mixer including:
  a mixing chamber extending from an upper end to a lower end, wherein the mixing chamber includes an inlet at the upper end and an outlet at the lower end;
  a mixer shaft extending downward from a first end to a second end;
  one or more tools attached to the shaft between the first end and the second end; and
  a rotation mechanism coupled to the first end of the mixer shaft;
receiving the pre-moistened compressible masonry formula through the inlet, while the mixer shaft and the attached tools are rotating with a rotation speed equal to or greater than 1,000 revolutions per minute (rpm);
processing the pre-moistened compressible masonry formula with the attached tools by mixing the constituents and breaking down aggregates and agglomerates in the pre-moistened compressible masonry formula, to produce a de-agglomerated product formula as the pre-moistened compressible masonry formula falls downward from the upper end and exits the outlet of the mixing chamber through the lower end, wherein the de-agglomerated product formula is subsequently compressible;
receiving the de-agglomerated product formula at a block press that includes:
  a charge hopper; and
  a plurality of mold elements, wherein the plurality of mold elements include:
    a lower impact plate,
    an upper impact plate, and
    a plurality of side plates;
wherein the de-agglomerated product formula is received in the charge hopper, and wherein the charge hopper controllably loads a predetermined amount of the de-agglomerated product formula;
moving one or more of the mold elements to dynamically form a block mold for receiving the predetermined amount of the de-agglomerated product formula;
with the charge hopper, filling the formed block mold with the predetermined amount of the de-agglomerated product formula;
compressing the de-agglomerated product formula within the dynamically formed block mold to form a masonry block;
controllably moving one or more of the mold elements to release internal pressure of the formed masonry block across one or more dimensions; and
controllably moving one or more of the mold elements to remove the formed masonry block from the block mold.

15. The method of claim 14, wherein the predetermined amount of the de-agglomerated product formula is a predetermined weight of the de-agglomerated product formula.

16. The method of claim 14, further comprising:
moving one or more of the mold elements to dynamically reform the block mold for receiving a subsequent predetermined amount of the de-agglomerated product formula.

17. The method of claim 14, wherein the compressing the de-agglomerated product formula includes any of moving the lower impact plate upward with respect to the block mold, or moving the upper impact plate downward with respect to the block mold.

18. The method of claim 14, wherein controllably moving one or more of the mold elements to release the internal pressure on the formed masonry block includes moving at least one of the mold elements horizontally.

19. The method of claim 14, wherein controllably moving one or more of the mold elements to release the internal pressure on the formed masonry block includes moving at least one of the mold elements vertically.

20. The method of claim 14, further comprising:
moving the removed formed masonry block to a curing area.

21. The method of claim 14, wherein the plurality of mold elements includes a mold core for defining a block core through the formed masonry block.

22. The method of claim 21, wherein controllably moving one or more of the mold elements to release the internal pressure of the formed masonry block includes moving the mold core downward.

23. The method of claim 21, wherein the dynamically forming the block mold includes positioning the mold core to define at least a portion of a block core of the block mold.

24. The method of claim 23, further comprising:
moving the mold core upward for any of dynamically defining the block mold, or compressing the de-agglomerated product formula within the block mold.

25. The method of claim 24, further comprising:
applying a force to the de-agglomerated product formula through the mold core.

26. The method of claim 25, wherein the applied force includes any of a compressive force, a linear impact force, a directional force, an oscillatory force, a vibrational force, or any combination thereof.

27. The method of claim 14, further comprising:
applying a force to the de-agglomerated product formula within the dynamically formed block mold, wherein the applied force includes any of a compressive force, a linear impact force, a directional force, an oscillatory force, a vibrational force, or any combination thereof.

* * * * *